(12) United States Patent
Nakanishi et al.

(10) Patent No.: US 10,507,781 B2
(45) Date of Patent: Dec. 17, 2019

(54) AIRBAG

(71) Applicant: TOYODA GOSEI CO., LTD., Kiyosu-shi, Aichi-ken (JP)

(72) Inventors: Hiroyuki Nakanishi, Kiyosu (JP); Wataru Miura, Kiyosu (JP); Ryotaro Ishida, Kiyosu (JP); Naohiko Ishiguro, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 93 days.

(21) Appl. No.: 15/691,997

(22) Filed: Aug. 31, 2017

(65) Prior Publication Data

US 2018/0086298 A1    Mar. 29, 2018

(30) Foreign Application Priority Data

Sep. 28, 2016  (JP) ................. 2016-190159
Feb. 2, 2017   (JP) ................. 2017-017990
Jun. 23, 2017  (JP) ................. 2017-123178

(51) Int. Cl.
*B60R 21/203*  (2006.01)
*B60R 21/261*  (2011.01)

(52) U.S. Cl.
CPC .......... *B60R 21/203* (2013.01); *B60R 21/261* (2013.01)

(58) Field of Classification Search
CPC ............ B60R 21/203; B60R 21/233; B60R 2021/23308
See application file for complete search history.

(56) References Cited

U.S. PATENT DOCUMENTS 3,752,501 A       8/1973  Daniel et al.
2019/0193671 A1*  6/2019  Hotta .............. B60R 21/233

FOREIGN PATENT DOCUMENTS

JP    S48-50437 U    7/1973
JP    H11-245759 A   9/1999
JP    4572770 B2  *  11/2010
JP    2017213995 A *  12/2017

OTHER PUBLICATIONS

Kai et al. JP H11-245759A Air bag device for Driver's Seat, machine English translation, ip.com (Year: 1999).*

* cited by examiner

*Primary Examiner* — Karen Beck
(74) *Attorney, Agent, or Firm* — Posz Law Group, PLC

(57) ABSTRACT

An airbag includes a driver side portion having an outer peripheral wall to receive a driver at the time of completion of inflation; and a steering wheel side portion. The steering wheel side portion is provided with an inflow opening to allow inflation gas to flow in, and an attaching seat which is disposed on a peripheral edge of the inflow opening and attached to the central portion of the steering wheel; a support inflation portion protruding from a front side of the attaching seat toward a front side of the steering wheel is arranged on the steering wheel side portion; and a support surface portion. The support surface portion is abutted to and supported by a front surface side of the steering wheel and is arranged on a region on a rear surface side of the support inflation portion from a base portion to a tip end portion.

16 Claims, 68 Drawing Sheets

(XXXVIIA-XXXVIIA PART)

(XXXVIIB-XXXVIIB PART)

AIRBAG

CROSS-REFERENCE TO RELATED APPLICATION(S)

This application is based upon and claims the benefit of priority from Japanese Patent Application No. 2016-190159, filed on Sep. 28, 2016, Japanese Patent Application No. 2017-017990, filed on Feb. 2, 2017, and Japanese Patent Application No. 2017-123178, filed on Jun. 23, 2017,the entire contents of which are incorporated herein by reference.

BACKGROUND

1. Field of the Invention

The present invention relates to an airbag which is used in a driver seat airbag device for being mounted on a steering wheel for vehicular steering, and, in particular, relates to an airbag applicable to a steering wheel (deformed steering wheel) having a shape in which a length dimension toward at least a front portion side of both of front and rear sides is shorter than a length dimension toward both of right and left sides, as a length dimension from a central portion of the steering wheel.

2. Description of the Related Art

A device which is mounted on a non-circular steering wheel having no front portion side of a ring portion gripped at the time of steering, in other words, a steering wheel having a shape in which a length dimension toward a front portion side is shorter than length dimensions toward both of right and left sides, as a length dimension from a central portion of the steering wheel, is known as the driver seat airbag device in the related art. In an airbag to be used, an outer bag for bridging a front portion side of a separated ring portion is disposed on a lower surface on a front portion side of an inner bag for receiving a driver (for example, see JP-A-11-245759 (see FIG. 7)).

However, in the airbag in the related art, in a case where the outer bag is required to have a length dimension in a right and left direction exceeding a separated distance of the ring portion and a space (separated part) of the front portion side of the steering wheel becomes larger, a lower surface side of the outer bag is not supported by an upper surface side of the steering wheel, the airbag (inner bag) is folded when receiving a driver so that the front portion side is deflated, and thus it is difficult to stably receive a driver heading for the steering wheel.

SUMMARY

The present invention is to solve the above problems, and to provide an airbag capable of stably receiving and protecting a driver at the time of completion of inflation even though the airbag is mounted on a steering wheel having a short length dimension from a central portion toward a front portion side.

According to an aspect of the present invention, there is provided an airbag including: a driver side portion which is stored and held in a central portion of a steering wheel for vehicular steering and has an outer peripheral wall configured to receive a driver at the time of completion of inflation; and a steering wheel side portion which has an outer peripheral edge connected to an outer peripheral edge of the driver side portion and is supported by the steering wheel, wherein: the steering wheel side portion is provided with an inflow opening to allow inflation gas to flow in, in the vicinity of the center, and an attaching seat which is disposed on a peripheral edge of the inflow opening and attached to the central portion of the steering wheel; a support inflation portion protruding from a front side of the attaching seat toward a front side of the steering wheel is arranged on the steering wheel side portion at the time of completion of inflation; and a support surface portion abutted to and supported by a front surface side of the steering wheel at the time of tilting the driver side portion in a forward direction when the airbag receives a driver is arranged on a region on a rear surface side of the support inflation portion from a base portion to a tip end portion.

Since a front support inflation portion is disposed on a front side of the central portion of the steering wheel, even if a front edge side of the driver side portion is inclined so that the front edge side is deflated downward, the front support inflation portion allows a support surface portion to be abutted to a front surface side of the central portion of the steering wheel and thus it is possible to prevent the front edge side of the airbag from being deflated downward, when the airbag according to the present invention completes inflation in a state of being mounted on the steering wheel and receives a driver. For the reason, the airbag can accurately receive a driver heading for the steering wheel by the driver side portion disposed so as to face the driver without inclining.

Therefore, the airbag according to the present invention can stably receive and protect a driver at the time of completion of inflation even if the airbag is mounted on the steering wheel having a short length dimension from the central portion toward the front portion side is mounted.

In the airbag of the present invention, a rear support inflation portion protruding from a rear side of the attaching seat toward a rear side of the steering wheel may be arranged on the steering wheel side portion at the time of completion of inflation, and a rear support surface portion abutted to and supported by the front surface side of the steering wheel at the time of tilting the driver side portion in a backward direction when the airbag receives a driver may be arranged on a region on a rear surface side of the rear support inflation portion from a base portion to a tip end portion.

In such a configuration, since a rear support inflation portion is disposed on a rear side of the central portion of the steering wheel, even if a rear edge side of the driver side portion is inclined so that the rear edge side is deflated downward, the rear support inflation portion allows a rear support surface portion to be abutted to a rear surface side of the central portion of the steering wheel and thus it is possible to prevent the rear edge side of the airbag from being deflated downward, when inflation is completed in a state where the airbag is mounted on the steering wheel and a driver is received. For the reason, the airbag can accurately receive a driver heading for the steering wheel by the driver side portion disposed so as to face the driver without inclining. That is, in the airbag having such a configuration, even if the steering wheel to be mounted has a configuration in which a length dimension from the central portion toward the both sides of the front portion side and the rear portion side is shorter than a length dimension from the central portion toward right and left sides, it is possible to stably receive and protect a driver heading for the steering wheel at the time of completion of inflation.

In the airbag of the present invention, the steering wheel side portion at the time of completion of inflation may include: general sections which are disposed on both of right and left sides between the front and rear support inflation portions and supported on an upper surface side of the steering wheel; and extension sections which are extended from the general section to an upper sides of the front and rear support inflation portions.

In such a configuration, each of the front and rear support inflation portions is formed so as to partially protrude from a space between the extension section and the attaching seat, and it is possible to reduce the volume of the airbag and to rapidly inflate the airbag.

In the airbag of the present invention, a second support inflation portion configured to support each of the front and rear support inflation portions, at the time of relative approaching to the extension section side when the front and rear support inflation portions are abutted to the corresponding front surface side or rear surface side of the steering wheel, may be arranged on the extension section of the steering wheel side portion at the time of completion of inflation.

In such a configuration, the second support inflation portion supporting each of the front and rear support inflation portions is formed so as to partially protrude from a space between the extension section and the support inflation portion, and it is possible to prevent the volume of the airbag from being increased and to improve supporting force of the front and rear support inflation portions.

In the airbag of the present invention, the steering wheel side portion may be formed of a bag material having flexibility, the bag material may include: an attaching seat part for forming the attaching seat; a general section part extending from the attaching seat part in a right and left direction and forming the general section; and a protrusion section part which extends from the attaching seat part in a forward and backward direction and forms each of the front and rear support inflation portions, each of the front and rear support inflation portions may have a folding section along the right and left direction on the tip end portion and may be formed of a sheet-shaped part joining overlapped right and left edges extending from the folding section to each other, each of the front and rear protrusion section parts may have the sheet-shaped part disposed on the attaching seat side and a tip end part disposed on a tip end side; tip edges of the front and rear tip end parts and tip edges of the right and left general section parts may constitute a driver side joining portion joined to the outer peripheral edge of the driver side portion; and parts opposing in front and rear edges of right and left side edges extending from both ends of the tip edge to the sheet-shaped part on an inner side and the front and rear side edges of the general section part, in outer peripheral edges of the front and rear tip end parts, may constitute joining sections for forming a steering wheel side portion joining to each other.

In such a configuration, in each of the sheet-shaped parts in the front and rear protrusion section parts of the bag material constituting the steering wheel side portion, the folding section is folded, and overlapped right and left edges are joined to each other to form the support inflation portion. Then, in outer peripheral edges of the tip end parts of the front and rear protrusion section parts, the joining sections opposing in front and rear of the right and left side edges extending from the tip edge in the right and left direction to the sheet-shaped part and the front and rear side edges of the general section part are joined to each other, and thus the steering wheel side portion can be formed. Thereafter, in the steering wheel side portion, the driver side joining portion including the tip edges of the front and rear tip end parts and the tip edges of the right and left general section parts is joined to the outer peripheral edge of the driver side portion, a front face and a rear face are inverted using the inflow opening so as not to expose a seam allowance, and thus the airbag can be manufactured.

Therefore, in such a configuration, the airbag having the front and rear support inflation portions can be formed by planar sewing of overlapping predetermined joining sites, and it is possible to easily manufacture the airbag having the front and rear support inflation portions.

In such a configuration where each of the front and rear sheet-shaped parts is provided with the two folding sections so that the two support inflation portions are formed, it is possible to form the airbag including the front and rear support inflation portions and the second support inflation portion.

In the airbag of the present invention, each of the tip edges of the front and rear tip end parts may be provided with a recessed groove joining edges opposed in the right and left direction to each other at the center of the right and left direction, and parts of the front edges extending from the recessed groove in the right and left direction may constitute the driver side joining portion.

In such a configuration, in a case where the recessed grooves are joined so as to be closed, the support inflation portion can protrude from the front and rear edges of the steering wheel side portion, the support inflation portion having a large volume can be formed, and great counterforce can be secured by using the support inflation portion having a large volume abutted to and supported by the steering wheel. Therefore, even if a driver having great kinetic energy moves to the front edge side and the rear edge side of the airbag, the driver side portion of the airbag can accurately receive the driver by facing the driver without inclining.

In a case where the bag material which forms the steering wheel side portion and has flexibility is formed from a single sheet including the attaching seat part, the right and left general section parts, and the front and rear protrusion section parts, the outer peripheral wall of the airbag having the front and rear support inflation portions can be formed by using two sheets of the bag materials having a predetermined shape together with the bag material which forms the steering wheel side portion, the number of components of the airbag can be reduced, the components are easily managed, the number of the sites subjected to joining work can be reduced, and it is possible to easily manufacture the airbag.

The airbag of the present invention may further includes: a primary inflation portion which first allows inflation gas to flow in to be inflate; and a secondary inflation portion which completes inflation by allowing the inflation gas to flow in from a supply port of the primary inflation portion, wherein: the primary inflation portion includes a base portion which is configured to inflate by allowing inflation gas from the inflow opening to flow in and provided with the supply port, and a tip end portion which forms the support inflation portion by extending from the base portion; and the secondary inflation portion forms an outer peripheral wall of the airbag excluding an outer peripheral wall of the support inflation portion.

In such a configuration, in a case where inflation gas flows into the airbag, the primary inflation portion is inflated, and the secondary inflation portion is inflated by the inflation gas supplied through the supply port of the primary inflation portion. Since the support inflation portion also completes the inflation at the time of completion of inflation of the primary inflation portion, before completing inflation of the secondary inflation portion, the support surface portion of the support inflation portion is rapidly disposed in a predetermined position opposing to the front surface side or the rear surface side of the steering wheel. For the reason, even if the secondary inflation portion completes inflation and then a driver is received, the support surface portion of the support inflation portion is already disposed in an appropriate position, the support inflation portion is rapidly abutted to and supported by the front surface side or the rear surface side of the steering wheel, the front edge side or the rear edge side of the driver side portion is accurately and stably prevented from being deflated. As a result, the airbag can receive and protect a driver heading for the steering wheel in a more stable state.

In the airbag of the present invention, a strap having flexibility may be configured to be pulled in a direction in which the support surface portion in the support inflation portion at the time of completion of inflation is pressed against the front surface side of the steering wheel, and arranged so as to couple the support inflation portion to a part of an outer peripheral wall of the airbag on a rear side of the support inflation portion.

In such a configuration, when inflation is completed in a state of mounting on the steering wheel and a driver is received, the support surface portion of the support inflation portion is already pressed against the front surface side of the steering wheel by the strap, and the airbag easily receives counterforce from the front surface side of the steering wheel. For the reason, without occurrence of falling off of the front edge side, the airbag can rapidly receive and protect a driver heading for the steering wheel having a short front portion side in a stable state. The strap has flexibility, and thus is folded and stored in a storage part with the airbag without hindrance during the folding storage of the airbag.

In the airbag of the present invention, in the support inflation portion at the time of completion of inflation, the vicinity of the approximately center of the support surface portion in at least a vertical direction may be abutted to and supported by the front surface side of the steering wheel.

In such a configuration, since the support inflation portion at the time of completion of inflation causes not only the vicinity of the base portion side but also the vicinity of the approximate center in a vertical direction to be abutted to and supported by the front surface side of the steering wheel, it is likely to rapidly receive stable counterforce from the front surface side of the steering wheel, and without occurrence of falling off of the front edge side of the airbag, it is possible to stably and accurately receive and protect a driver heading for the steering wheel by the driver side portion facing a driver. In the airbag of the present invention, the support inflation portion at the time of completion of inflation may protrude downward from a front edge of the steering wheel side portion, the support surface portion of the support inflation portion at the time of completion of inflation may have a bent section along a right and left direction on a front side of the attaching seat, and have an approximately planar shape extending downward from a front portion side of the attaching seat, and the bent section at the time of completion of inflation may be arranged in the vicinity of an intersection part between a front surface and an upper surface of a front portion side of the steering wheel.

In such a configuration, the support inflation portion at the time of completion of inflation is inflated so as to extend downward from the bent section between the support inflation portion and the front side of the attaching seat, and in this case, the bent section is arranged in the vicinity of an intersection part between a front surface and an upper surface of a front portion side of the steering wheel, and thus in the support surface portion having an approximately planar shape extending downward from the bent section, an intermediate part in the vertical direction or the tip end side as well as an upper edge side (base portion side) on the bent section side is likely to be abuttably disposed on the front surface side of the steering wheel. For the reason, even if a driver is received so as to deflate the front edge side of the airbag, immediately, the support surface portion of the support inflation portion receives counterforce from the front surface side of the steering wheel abutted in a wide area, the front edge side of the airbag is prevented from being deflated, and the airbag can accurately receive and protect a driver heading for the steering wheel having a short front portion side by the driver side portion facing a driver. Since the support inflation portion protrudes downward from the front edge of the steering wheel side portion and has a large volume, the support inflation portion can secure great counterforce, and even if a driver having great kinetic energy moves so as to be inclined to the front edge side of the airbag, the driver side portion of the airbag can accurately receive a driver by facing a driver without inclining.

In the airbag of the present invention, the steering wheel side portion at the time of completion of inflation may include: a general section which is disposed on both of right and left sides and a rear side of the attaching seat and supported by an upper surface side of the steering wheel; and the support inflation portion, the support inflation portion may be configured such that the front surface side is connected to a front edge side of the steering wheel side portion, the steering wheel side portion may be formed of a bag material having flexibility, the bag material may include: an attaching seat part for forming the attaching seat; a general section part extending from the attaching seat part to the both of right and left sides and the rear side and forming the general section; and a protrusion section part extending from the attaching seat part to the front side and forming the support inflation portion, the support inflation portion may have a folding section along the right and left direction on the tip end portion and may be formed of a sheet-shaped part joining overlapped right and left edges extending from the folding section to each other, the protrusion section part may have the sheet-shaped part disposed on the attaching seat side and a tip end part disposed on a tip end side, a tip edge of the tip end part and tip edges of the right and left general section parts may constitute a driver side joining portion joined to the outer peripheral edge of the driver side portion, parts opposing in front and rear of right and left side edges extending from both ends of the tip edge to the sheet-shaped part on an inner side and the front edge on the front side of the general section part, in outer peripheral edges of the tip end part, may constitute joining sections for forming the steering wheel side portion joining to each other, the tip edge of the tip end part may be provided with a recessed groove joining edges opposed in the right and left direction to each other at the center of the right and left direction, and parts of the tip edges extending from the recessed groove in the right and left direction may constitute the driver side joining portion, and a joining site of the joining section for forming the steering wheel side portion to the driver side portion may be arranged in the vicinity of an upper part of a direction along a steering shaft of the steering wheel on the front surface side of the steering wheel, in a side view observed from the right and left direction at the time of completion of inflation.

In such a configuration, the support surface portion of the support inflation portion and the joining section forming a steering wheel side portion are arranged so that the steering wheel side portion of the airbag at the time of completion of inflation is along the front surface side of the steering wheel, in a direction along the steering shaft of the steering wheel. That is, since the support surface portion of the support inflation portion of the steering wheel side portion can be abutted to and supported by the front surface side of the steering wheel, even if the front edge side of the driver side portion is inclined so as to be deflated downward when inflation is completed in a state of being mounted on the steering wheel and a driver is received, the support inflation portion causes the support surface portion to be abutted to the front surface side of the steering wheel, and the airbag can immediately secure counterforce. For the reason, the airbag can rapidly and accurately receive a driver heading for the steering wheel having a short front portion side by the driver side portion disposed so as to face a driver without inclining.

Furthermore, in such a configuration, the recessed grooves of the tip end part in the protrusion section part of the bag material constituting the steering wheel side portion are joined so as to be closed, the tip edge of the tip end part has an arc shape corresponding to the front edge of the driver side portion, and in the sheet-shaped part of the protrusion section part, the folding section is folded, and overlapped right and left edges are joined to form the support inflation portion having a large volume on a front side. Then, in an outer peripheral edge of the tip end part of the protrusion section part, the joining sections opposing in front and rear of the right and left side edges extending from the tip edge in right and left direction to the sheet-shaped part and the side edges of the general section part are joined to each other, and thus the steering wheel side portion can be formed. Thereafter, in the steering wheel side portion, the driver side joining portion including the tip edge of the tip end part on the front side and the tip edges of the right and left general section parts is joined to the outer peripheral edge of the driver side portion, a front face and a rear face are inverted using the inflow opening so as not to expose a seam allowance, and thus the airbag can be manufactured. For the reason, in such a configuration, the airbag in which the support inflation portion protruding from the front edge of the steering wheel side portion to increase the volume is arranged on the front edge side of the steering wheel side portion can be easily manufactured by planar sewing.

In the airbag of the present invention, the joining site of the joining section for forming the steering wheel side portion to the driver side portion may be arranged within a range of being shifted by 50 mm in a forward and backward direction when a reference line of a direction along the steering shaft of the steering wheel on the front surface side of the steering wheel is set to a center, in a side view observed from the right and left direction at the time of completion of inflation.

That is, in a side view observed from the right and left direction at the time of completion of inflation, when a reference line of a direction along the steering shaft of the steering wheel on the front surface side of the steering wheel is set to a center, in a case where the joining site of the joining section forming a steering wheel side portion to the driver side portion is disposed on the front side distant by 50 mm or longer from the center, a boundary part (bent section) of the front edge side of the attaching seat with the support inflation portion is in a state of being abutted to and supported by the front surface side distant from the upper surface side of the steering wheel on the front portion side, and the support surface portion of the support inflation portion causes the vicinity of the base portion to be abutted to the front surface of the steering wheel. However, the part of the front edge side of the attaching seat is also abutted to the front surface side of the steering wheel, a force of pushing the base portion side of the support inflation portion against the front side is generated, the tip end side is easily separated from the front surface of the steering wheel, and it is difficult for the support inflation portion to rapidly secure counterforce from the front surface of the steering wheel, which is not preferable.

Furthermore, in a side view observed from the right and left direction at the time of completion of inflation, when a reference line of a direction along the steering shaft of the steering wheel on the front surface side of the steering wheel is set to a center, in a case where the joining site of the joining section forming a steering wheel side portion to the driver side portion is disposed on the rear side distant by 50 mm or longer from the center, a boundary part (bent section) of the front edge side of the attaching seat with the support inflation portion is in a state of being abutted to and supported by the upper surface side shifted to the rear side from the front surface side of the front portion of the steering wheel, and counterforce received by the support surface portion of the support inflation portion from the front surface side of the steering wheel generates a moment for directing the rear edge of the driver side portion downward by setting the vicinity of the boundary part shifted backward as a rotation center. As a result, the rear edge side of the driver side portion is shifted downward to lead to inclining the driver side portion, and it is difficult for the driver side portion to face a driver, which is not preferable.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 30 is a central longitudinal sectional view of the steering wheel shown in

FIG. 29;

DETAILED DESCRIPTION OF THE INVENTION

Figure 1:
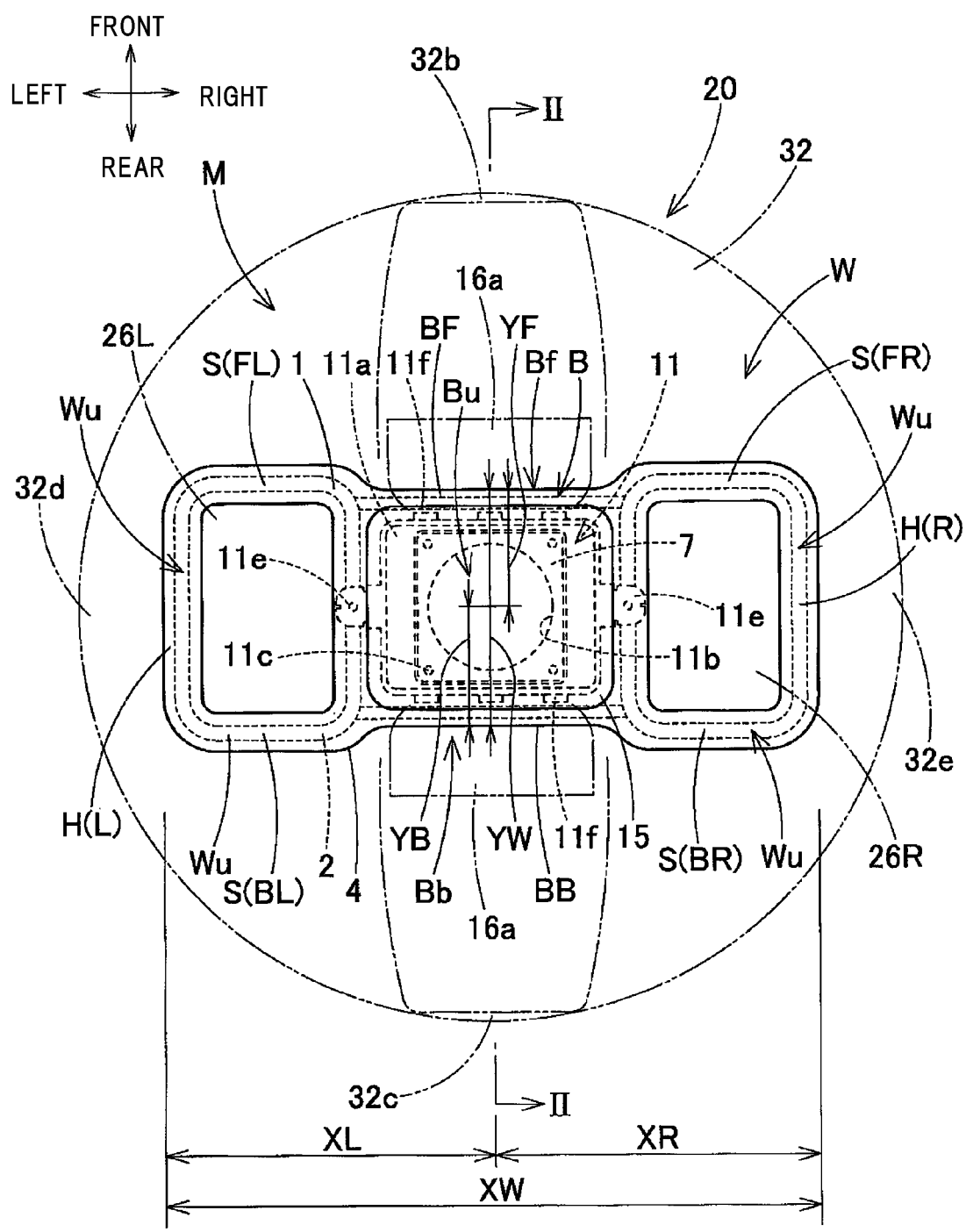
FIG. 1 is a schematic plan view illustrating a use state of a driver seat airbag device according to a first embodiment of the present invention which uses a driver seat airbag.
Figure 2:
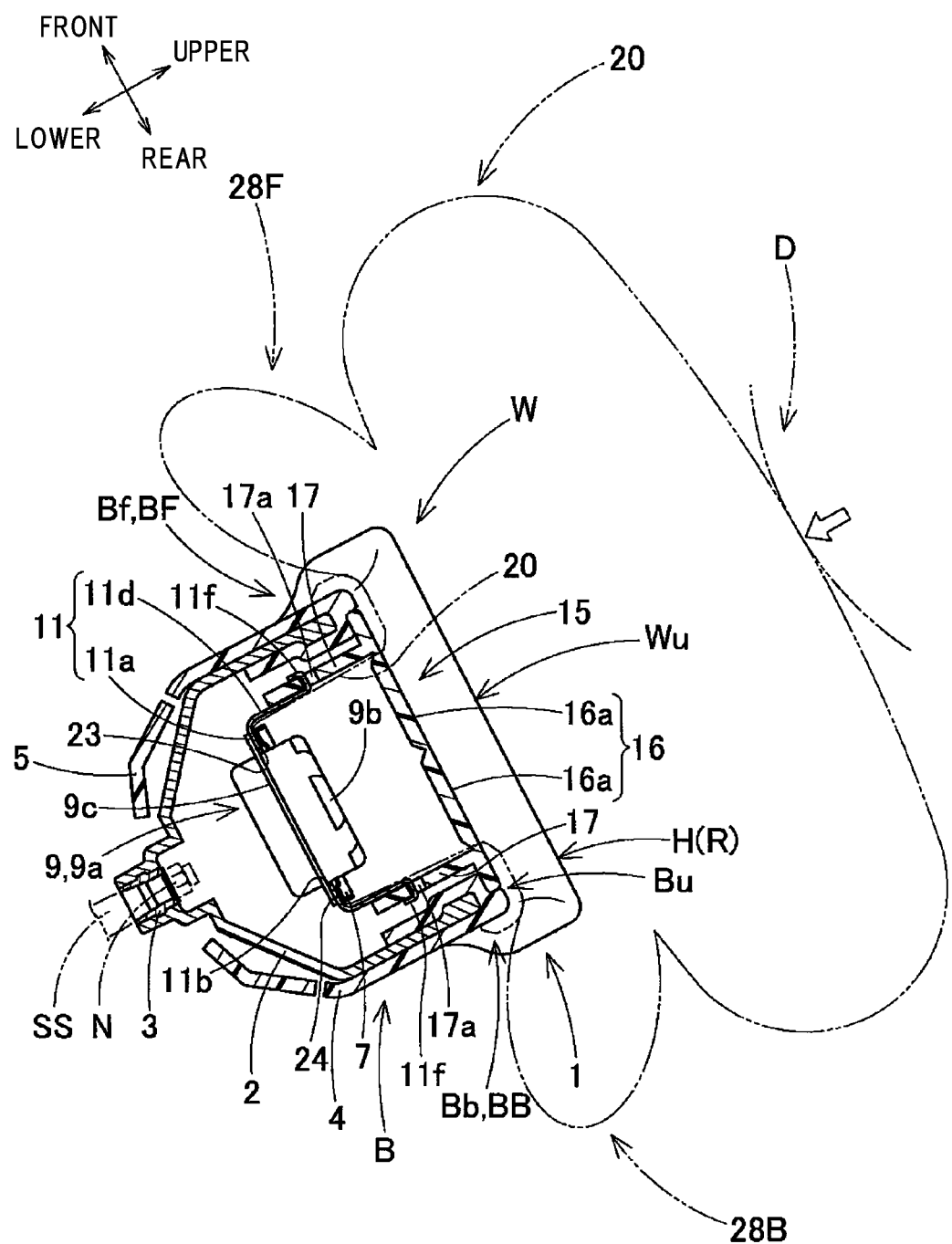
FIG. 2 is a schematic longitudinal sectional view of the driver seat airbag device according to the first embodiment, and corresponds to a II-II part in FIG. 1.

Hereinafter, according to one embodiment of the present invention based on the drawings, as shown in FIGS. 1 and 2, an airbag according to a first embodiment is a driver seat airbag 20, and an airbag device M using the driver seat airbag 20 is a driver seat airbag device mounted on a steering wheel W. The steering wheel includes a steering wheel main body 1, and an airbag device M disposed on an upper portion of a central portion B at a center of the steering wheel main body 1.

The steering wheel W is a deformed steering wheel in which a length dimension YF toward at least a front portion BF side of both of front and rear sides is shorter than length dimensions XL and XR toward both of right and left sides, as a length dimension from the central portion B. More specifically, in the steering wheel W, a length dimension YB from the central portion B toward a rear portion BB side is also shorter than length dimensions XL and XR toward both of right and left sides. In other words, the steering wheel W has operating grip portions H (HL and HR) on both of right and left sides, and is a deformed steering wheel having a shape in which a front and rear width dimension YW from the central portion B is shorter than a right and left width dimension XW from the central portion B. Operating grip portions HL and HR are constituted of a rod-shaped part along a forward and backward direction, and both of front and rear ends are supported by shaft-shaped coupling portions S (SFL, SFR, SBL, and SBR) extending along the right and left direction from front and rear edge sides of the central portion B of the steering wheel W. A boss 3 coupled to a steering shaft SS which is a rotation center at the time of operation is arranged in a lower part of the central portion B. To secure rigidity in the central portion B, the coupling portion S, and the operating grip portion H, the steering wheel main body 1 is provided with a core 2 formed of metallic materials such as a steel material, and the boss 3 is arranged on a lower part side at a center of the core 2. A coated layer 4 made of synthetic resin is appropriately arranged around the core 2. A lower surface side of the central portion B is covered with a lower cover 5 made of synthetic resin.

In the description of the present invention, unless otherwise specified, a vertical direction corresponds to a vertical direction along a shaft direction of the steering shaft SS, a forward and backward direction corresponds to a forward and backward direction orthogonal to a shaft direction of the steering shaft SS at the time of straight steering of a vehicle, and a right and left direction is a right and left direction orthogonal to a shaft direction of the steering shaft SS at the time of straight steering of a vehicle.

As shown in FIGS. 1 and 2, the driver seat airbag device M includes the airbag 20 folded and stored, an inflator 9 supplying inflation gas to the airbag 20, an airbag cover 15 covering above the folded airbag 20, a case 11 storing and holding the airbag 20 and the inflator 9 and holding the airbag cover 15, and a retainer 7 for attaching the inflator 9 and the airbag 20 to the case 11.

The retainer 7 is made of square annular sheet metal, presses a peripheral edge of an inflow opening 23 of the airbag 20, and has bolts (not shown) fastened with nuts to the case 11 at four corners so that the airbag 20 is attached to the case 11 and the inflator 9 is attached to the case 11.

The inflator 9 includes a columnar main body portion 9a having a plurality of gas discharge ports 9b on an upper portion, and a flange portion 9c protruding from an outer peripheral surface of the main body portion 9a. A through-hole (not shown) for passing through each bolt (not shown) of the retainer 7 is formed in the flange portion 9c.

The case 11 is made of approximately rectangular parallelepiped sheet metal, is disposed on the upper portion side of the central portion B of the steering wheel W, constitutes a storage part storing the folded airbag 20, and includes a rectangular bottom wall portion 11a and a square cylindrical side wall portion 11d extending upward from an outer peripheral edge of the bottom wall portion 11a. An insertion hole 11b in which the main body portion 9a of the inflator 9 can be inserted from a lower side and which opens in a circular shape is formed in the bottom wall portion 11a, and four through-holes 11c (see FIG. 1) for passing through bolts (not shown) of the retainer 7 are formed in the periphery thereof. A plurality of locking claws 11f locking and coupling a side wall portion 17 of the airbag cover 15 are attached to the side wall portion 11d. To arrange and fix the airbag device M onto the upper portion of the central portion B, a bracket portion 11e coupled and fixed to the core 2 by bolt fastening or the like is arranged in the case 11.

The airbag cover 15 is made of synthetic resin, and includes a ceiling wall portion 16 covering above the stored airbag 20, and the approximately square cylindrical side wall portion 17 extending downward from the vicinity of an outer peripheral edge of the ceiling wall portion 16. Two sheets of door portions 16a and 16a which are pushed by the inflating airbag 20 and open to both of front and rear sides are formed in the ceiling wall portion 16. A locking hole 17a for inserting the locking claws 11f of the case 11 is formed in the side wall portion 17.

Figure 3:
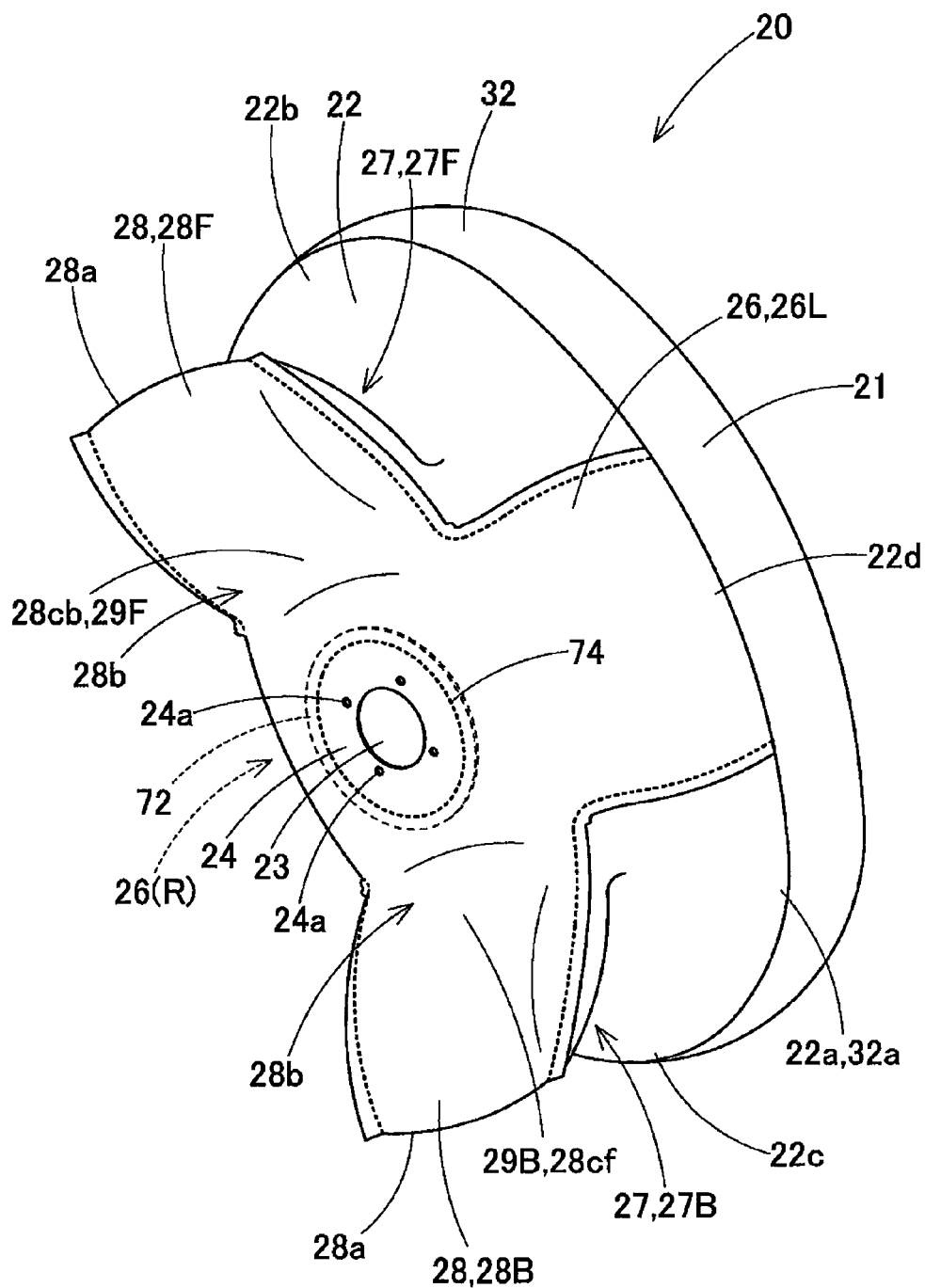
FIG. 3 is a schematic perspective view at the time of inflation of the airbag according to the first embodiment.

The airbag 20 is formed of a bag material which is made of a cloth material obtained by weaving yarn such as polyamide or polyester and has flexibility, as shown in FIGS. 1 to 3, a shape after the inflation completion is a circular shape when viewed from above and is an approximately oval spherical shape close to a spherical shape, in a case of excluding support inflation portions 28 (28F and 28B) to be described later, when viewed from a side. A peripheral wall (outer peripheral wall) 21 at the time of completion of inflation includes a driver side portion 32 capable of receiving a driver D, and a steering wheel side portion 22 which connects (joins or couples) an outer peripheral edge 22a to an outer peripheral edge 32a of the driver side portion 32 and is supported by the steering wheel W (steering wheel main body 1).

The steering wheel side portion 22 is formed in an approximately disc shape in a state of being flatly deployed, and the inflow opening 23 which opens in a circular shape to allow inflation gas to flow in is arranged at a center of the steering wheel side portion 22. To attach the airbag 20 to the bottom wall portion 11a of the case 11, an attaching hole 24a for passing through each bolt (not shown) of the retainer 7 is formed at a peripheral edge of the inflow opening 23. An arrangement part of the attaching hole 24a at the peripheral edge of the inflow opening 23 constitutes an attaching seat 24 which is pressed by the retainer 7 and is attached to the bottom wall portion 11a of the case 11.

The front and rear support inflation portions 28 (28F and 28B) protruding from both of front and rear sides of the attaching seat 24 to a front surface Bf side and a rear surface Bb side of the central portion B of the steering wheel W are arranged in the steering wheel side portion 22 at the time of completion of inflation. When the airbag 20 at the time of completion of inflation receives the driver D by the driver side portion 32, even if the driver side portion 32 is tilted (oscillated) in the forward and backward direction, these front support inflation portions 28F and rear support inflation portions 28B are arranged so that each of surfaces 28cb and 28cf (a rear surface 28cb in the front support inflation portions 28F and a front surface 28cf in the rear support inflation portions 28B) on the central portion B side between a tip end portion 28a and a base portion 28b is abutted (or pressure- welded) to the front surface Bf side or the rear surface Bb side of the central portion B of the steering wheel W, the airbag 20 is supported, and inclination of the driver side portion 32 is prevented.

That is, the rear surface 28cb of the front support inflation portions 28F constitutes a support surface portion 29F abutted to and supported by the front surface Bf side of the central portion B of the steering wheel W. The front surface 28cf of the rear support inflation portions 28B constitutes a support surface portion 29B abutted to and supported by the rear surface Bb side of the central portion B of the steering wheel W.

In a case of the embodiment, both of the support surface portions 29F and 29B are abutted to and supported by the vicinity of the base portion 28b side of the support inflation portion 28, in particular, the front surface Bf or the rear surface Bb of the steering wheel W.

Figure 5:
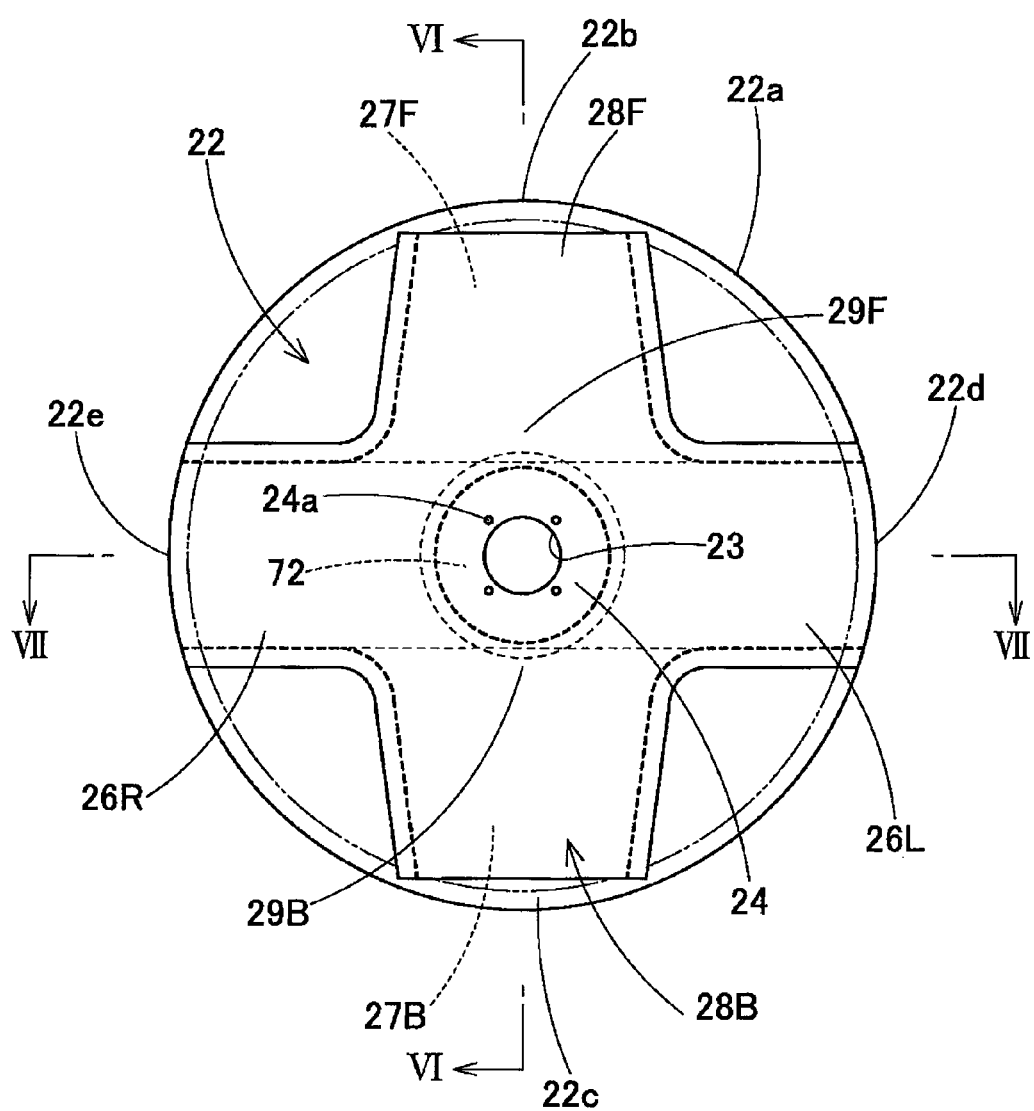
FIG. 5 is a plan view illustrating a state where a steering wheel side portion of the airbag according to the first embodiment is manufactured.
Figure 6:
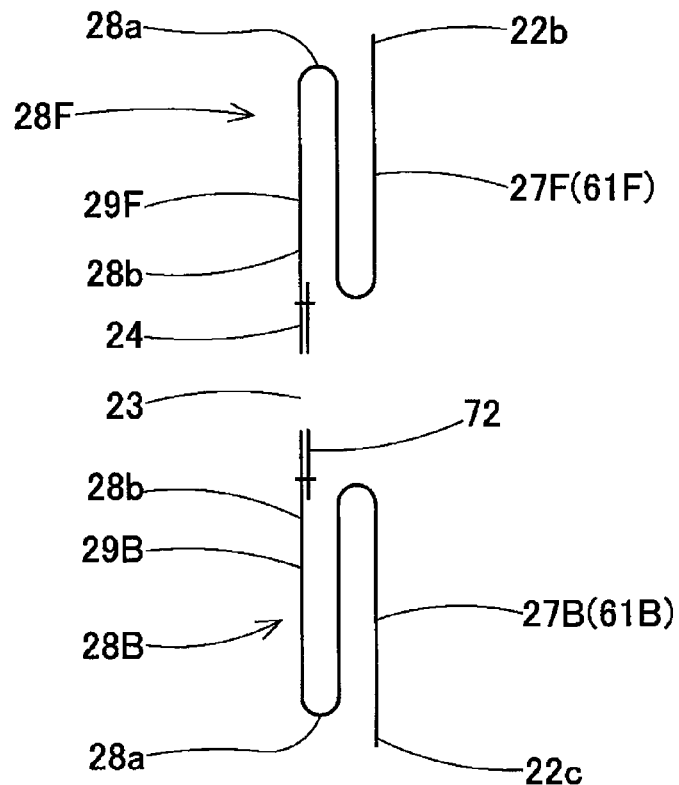
FIG. 6 is a schematic end view of a VI-VI part in FIG. 5.
Figure 7:
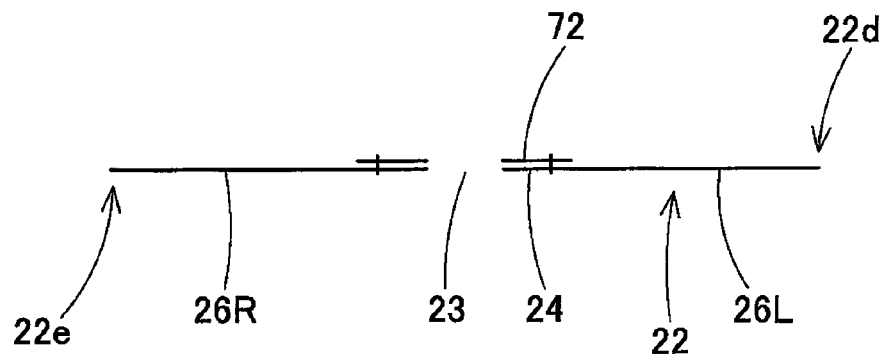
FIG. 7 is a schematic end view of a VII-VII part in FIG. 5.

General sections 26 (26L and 26R) supported by an upper surface Wu side (in a case of the embodiment, an upper surface Wu side of the coupling portions SFL, SFR, SBL, and SBR in the vicinity of the operating grip portions HL and HR or an upper surface Wu side of the operating grip portions HL and HR) of the steering wheel W are arranged on both of right and left sides between the front and rear support inflation portions 28F and 28B in the steering wheel side portion 22 at the time of completion of inflation. Specifically, the general sections 26L and 26R are parts on both of right and left sides of the attaching seat 24 leading to right and left edges 22d and 22e sides of the steering wheel side portion 22 at the time of completion of inflation, and, as shown in FIGS. 5 to 7, are parts exposed between the support inflation portions 28F and 28B on both of right and left sides of the attaching seat 24. In a case of the embodiment, the general sections are constituted of general section parts 43L and 43R and parts on both of right and left edge sides of tip end parts 61F and 61B which will be described later.

In a case of the embodiment, each of the general sections 26L and 26R extends extension sections 27 (F and B) disposed above the front and rear support inflation portions 28F and 28B in the steering wheel side portion 22 at the time of completion of inflation. These extension sections 27F and 27B are respectively parts leading to front and rear edges 22b and 22c sides of the steering wheel side portion 22 from the support inflation portions 28F and 28B on both of front and rear sides of the attaching seat 24, and specifically, as shown in FIGS. 5 and 6, are central parts in the right and left direction of the tip end parts 61F and 61B positioned to be hidden by the support inflation portions 28F and 28B.

For the reason, in a case of the embodiment, appearance obtained by combining the right and left general sections 26L and 26R of the attaching seat 24 and the extension sections 27F and 27B has an approximately circular shape equal to appearance of the driver side portion 32, and the support inflation portions 28F and 28B are arranged so that tip end portions 28a and 28a are expanded and protrude downward from the vicinity of the front and rear of the attaching seat 24 in the approximately circular steering wheel side portion 22. In a case of the embodiment, each of the support inflation portions 28F and 28B has an approximately rectangular plate shape in which the thickness of the tip end portion 28a in the forward and backward direction is narrowed to be tapered.

Figure 4:
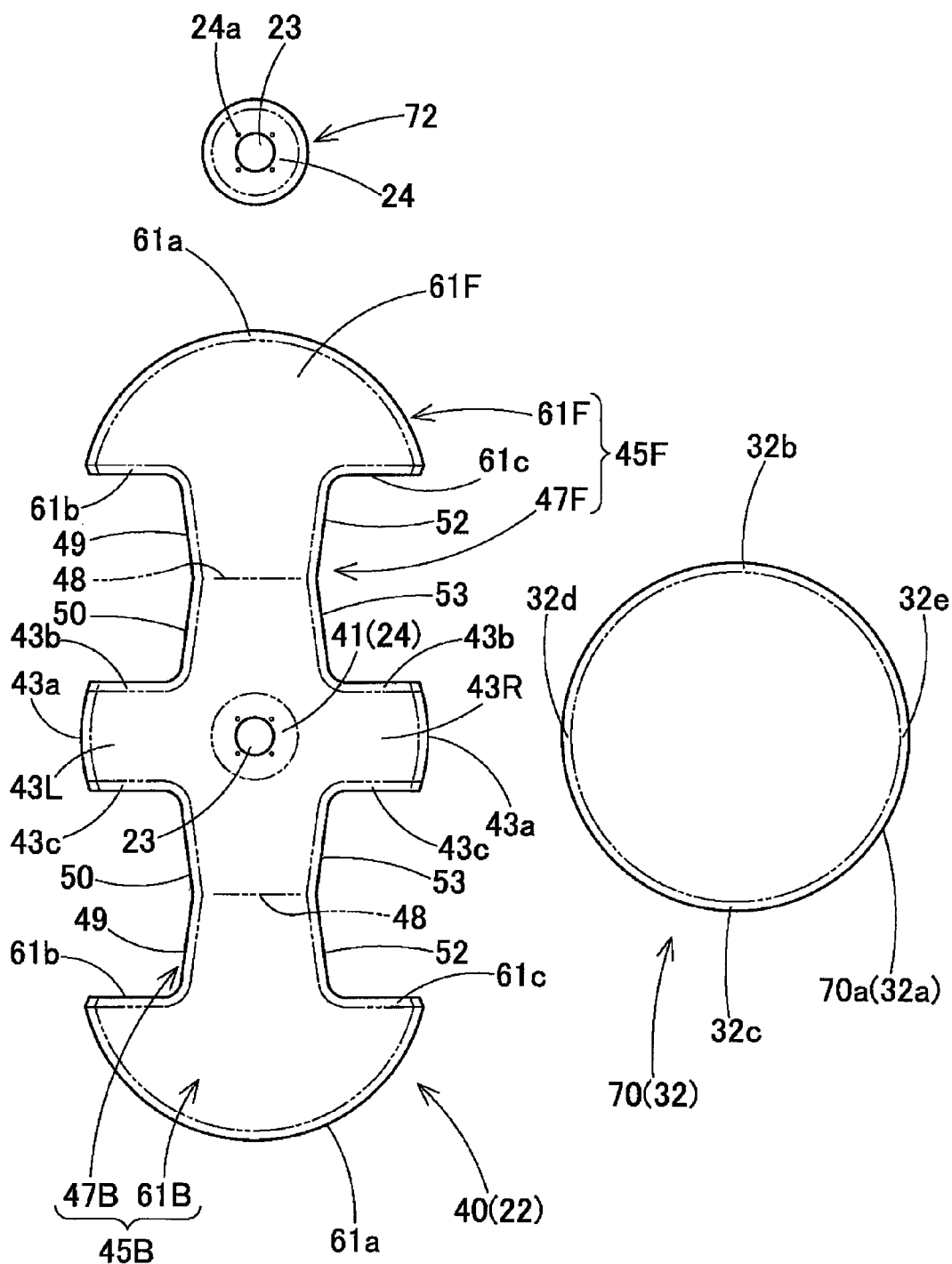
FIG. 4 is a plan view of a bag material for manufacturing the airbag according to the first embodiment.

In the airbag 20 according to the first embodiment, as shown in FIG. 4, an outer peripheral wall 21 is formed of two sheets of a bag material (bag material) 40 for the steering wheel side portion 22 and a bag material 70 for the driver side portion 32. The bag material 70 has a disc shape. These bag materials 40 and 70 are made of a cloth material obtained by weaving yarn such as polyamide or polyester and having flexibility, as described above.

In a case of being flatly deployed, the bag material 40 is provided with parts extending in all directions from an attaching seat part 41 forming the attaching seat 24 at a center of the forward and backward direction. That is, the bag material 40 includes the approximately rectangular planar general section parts 43 (43L and 43R) capable of forming the general sections 26L and 26R by extending in the right and left direction from the attaching seat part 41, and protrusion section parts 45 (45F and 45B) capable of forming the support inflation portions 28F and 28B and the extension sections 27F and 27B by extending in the forward and backward direction from the attaching seat part 41 as a dimension longer than the general section part 43.

The general section parts 43L and 43R extend in an approximately rectangular plate shape from the attaching seat part 41 to both of right and left sides, and include an arc tip edge 43a and front and rear side edges 43b and 43c. The tip edge 43a constitutes a driver side joining portion joined to an outer peripheral edge 70a of the bag material 70 forming the driver side portion 32 by sewing. The front and rear side edges 43b and 43c are arranged in a linear shape in which the side edges are parallel to each other along the right and left direction, and the side edge constitutes a joining portion forming the steering wheel side portion 22 by joining to a part opposed in the forward and backward direction of edges 61*b* and 61*c* of the protrusion section parts 45F and 45B which will be described later by sewing.

The width dimensions of the general section parts 43L and 43R in the forward and backward direction are approximately equal to an outer diameter dimension of an approximately circular reinforcing cloth 72 sewn to the attaching seat 24. The reinforcing cloth 72 is, similar to the bag material 40, made of a cloth material obtained by weaving yarn such as polyamide or polyester and having flexibility, is sewn to the attaching seat 24 on an inner peripheral surface side of the airbag 20, and similar to the attaching seat 24, forms the inflow opening 23 and the attaching hole 24*a*.

Each of the protrusion section parts 45F and 45B includes sheet-shaped parts 47 (47F and 47B) on the attaching seat part 41 side, and the tip end parts 61 (61F and 61B) on the tip end side arranged so as to extend from the sheet-shaped parts 47F and 47B.

The width dimensions of the sheet-shaped parts 47F and 47B on the attaching seat part 41 side are slightly longer than the outer diameter dimension of the reinforcing cloth 72, and the sheet-shaped parts have an approximately rectangular plate shape extending from the attaching seat part 41 in the forward and backward direction. Each of the sheet-shaped parts 47F and 47B is a part forming outer peripheral walls of the front and rear support inflation portions 28F and 28B. In a case where each of the sheet-shaped parts 47F and 47B is provided with a folding section 48 for attaching a crease along the right and left direction at a center of the forward and backward direction, is folded into two, joins right and left overlapped edges to each other, that is, an edge 49 on a left tip side and an edge 50 on a left base side to each other and an edge 52 on a right tip side and an edge 53 on a right base side to each other by sewing, the support inflation portions 28 (28F and 28R) in which the folding section 48 is used as the tip end portion 28*a* can be formed.

The tip end parts 61F and 61B are formed so as to extend in a bow shape in which the width dimensions in the right and left direction are widened, from tip ends of the sheet-shaped parts 47F and 47B, and respectively include an arc tip edge 61*a*, and front and rear side edges 61*b* and 61*c* extended along the right and left direction so as to expand from the sheet-shaped parts 47F and 47B and continued to the tip edge 61*a*. The tip edge 61*a* constitutes the driver side joining portion joined to the outer peripheral edge 70*a* of the bag material 70 forming the driver side portion 32 by sewing, together with the tip edge 43*a* of the general section parts 43L and 43R.

That is, the tip edges 61*a* and 61*a* of the tip end parts 61F and 61B and the tip edges 43*a* and 43*a* of the general section parts 43L and 43R form the outer peripheral edge 22*a* of the steering wheel side portion 22, and the outer peripheral edge 22*a* is joined to the outer peripheral edge 32*a* of the driver side portion 32.

Each of the right and left side edges 61*b* and 61*c* extending from both ends of the tip edge 61*a* to the sheet-shaped parts 47F and 47B on the inner side in the outer peripheral edges of the tip end parts 61F and 61B constitutes a joining portion for forming the steering wheel side portion 22 by joining to the front and rear side edges 43*b* and 43*c* of the general section parts 43L and 43R opposed in the forward and backward direction.

In a step of manufacturing the airbag 20 using these bag materials 40 and 70, the bag materials 40 and 70 having a predetermined shape are formed by cutting from a predetermined cloth material for a bag material. The bag material 70 at the time of cutting is in a state shown in FIG. 4, but the bag material 40 immediately after cutting is in a state where the reinforcing cloth 72, the inflow opening 23, and the attaching hole 24*a* are not provided, the reinforcing cloth 72 is sewn to the attaching seat 24 using a suture thread 74, then drilling process is performed, and the inflow opening 23 and the attaching hole 24*a* are formed on the attaching seat 24 together with the reinforcing cloth 72.

When outline of a step of manufacturing the steering wheel side portion 22 is simply described by using the bag material 40 for forming the inflow opening 23 and the attaching hole 24*a*, first, creases are attached to the folding section 48 of the sheet-shaped parts 47F and 47B, the overlapped edges 49 and 50 and the overlapped edges 52 and 53 are respectively sewn to each other using a suture thread 74, and the outer peripheral walls of the support inflation portions 28F and 28B are formed. The folding section 48 is folded with mountain-fold creases upon an outer peripheral surface side (side where the reinforcing cloth 72 is not sewn) of the airbag 20.

In a case where edges of the general section parts 43L and 43R and the tip end parts 61F and 61B approaching so as to be overlapped by formation of the support inflation portions 28F and 28B, that is, the side edge 43*b* of the general section part 43L and the side edge 61*b* of the tip end part 61F, the side edge 43*c* of the general section part 43L and the side edge 61*b* of the tip end part 61B, the side edge 43*b* of the general section part 43R and the side edge 61*c* of the tip end part 61F, and the side edge 43*c* of the general section part 43R and the side edge 61*c* of the tip end part 61B are respectively sewn using the suture thread 74, the steering wheel side portion 22 is formed as shown FIGS. 5 to 7.

Figure 8:
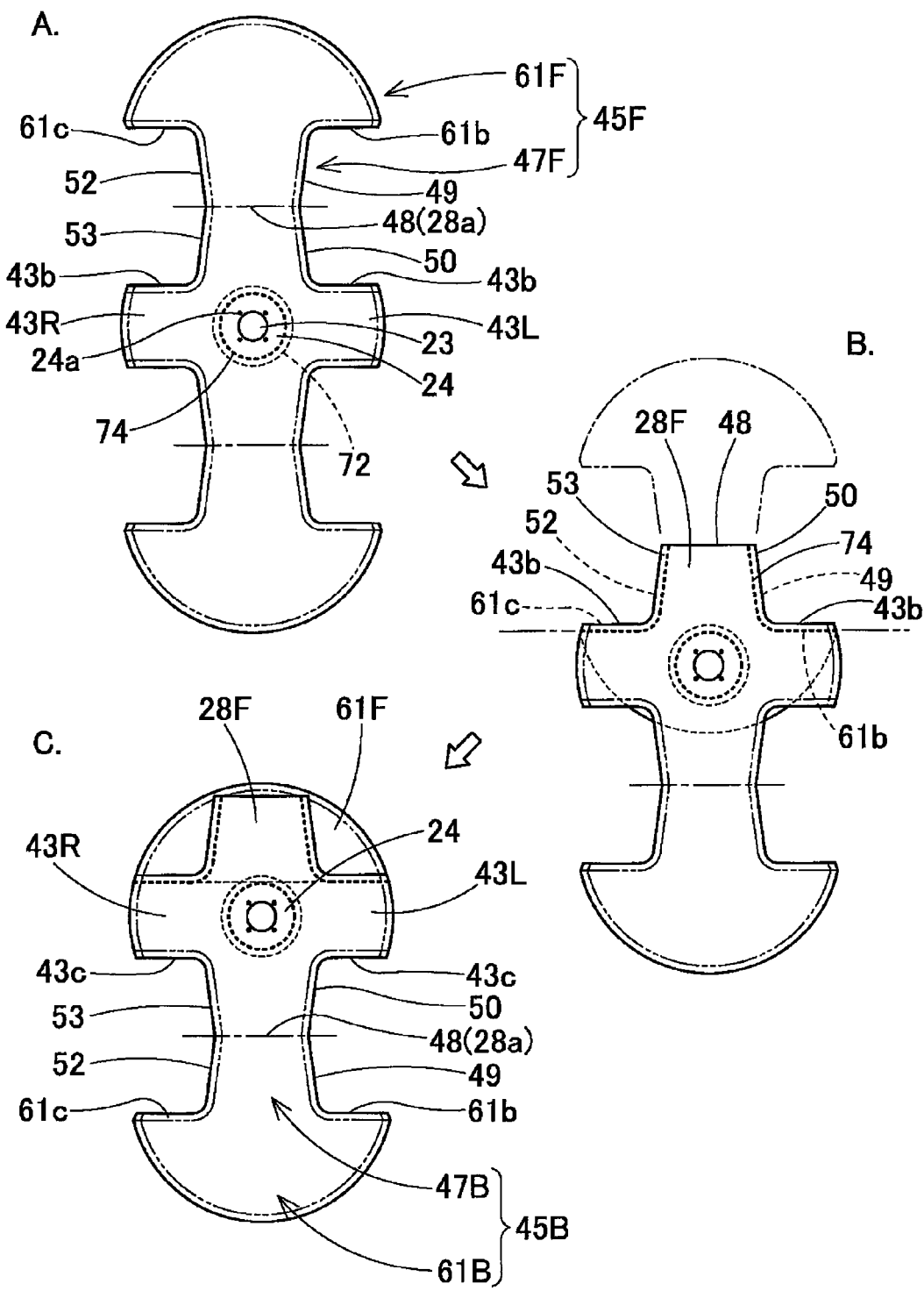
FIG. 8 is a view illustrating a step of manufacturing the steering wheel side portion in the airbag according to the first embodiment.

In the first embodiment, when at the time of formation of the steering wheel side portion 22, for example, as shown in Sections A and B of FIG. 8, in a case where the folding section 48 of the support inflation portion 28F in the bag material 40 is folded so as to overlap the tip end part 61F of the protrusion section part 45F with the attaching seat 24, the edges 61*b* and 43*b* of the tip end part 61F and the general section part 43L, the edges 49 and 50 of the sheet-shaped part 47F, the edges 61*c* and 43*b* of the tip end part 61F and the general section part 43R, and the edges 52 and 53 of the sheet-shaped part 47F are overlapped with each other at the same time, and thus parts thereof are set on a workbench of a predetermined industrial sewing machine, and are easily sewn by planar sewing. Thereafter, as shown in Section C of FIG. 8 and Section A of FIG. 9, in a case where the folding section 48 of the support inflation portion 28B in the bag material 40 is folded so as to overlap the tip end part 61B of the protrusion section part 45B with the attaching seat 24, the edges 61*b* and 43*c* of the tip end part 61B and the general section part 43L, the edges 49 and 50 of the sheet-shaped part 47B, the edges 61*c* and 43*c* of the tip end part 61B and the general section part 43R, and the edges 52 and 53 of the sheet-shaped part 47B are overlapped with each other at the same time, and thus parts thereof are set on a workbench of a predetermined industrial sewing machine and the steering wheel side portion 22 is easily formed by planar sewing.

Figure 9:
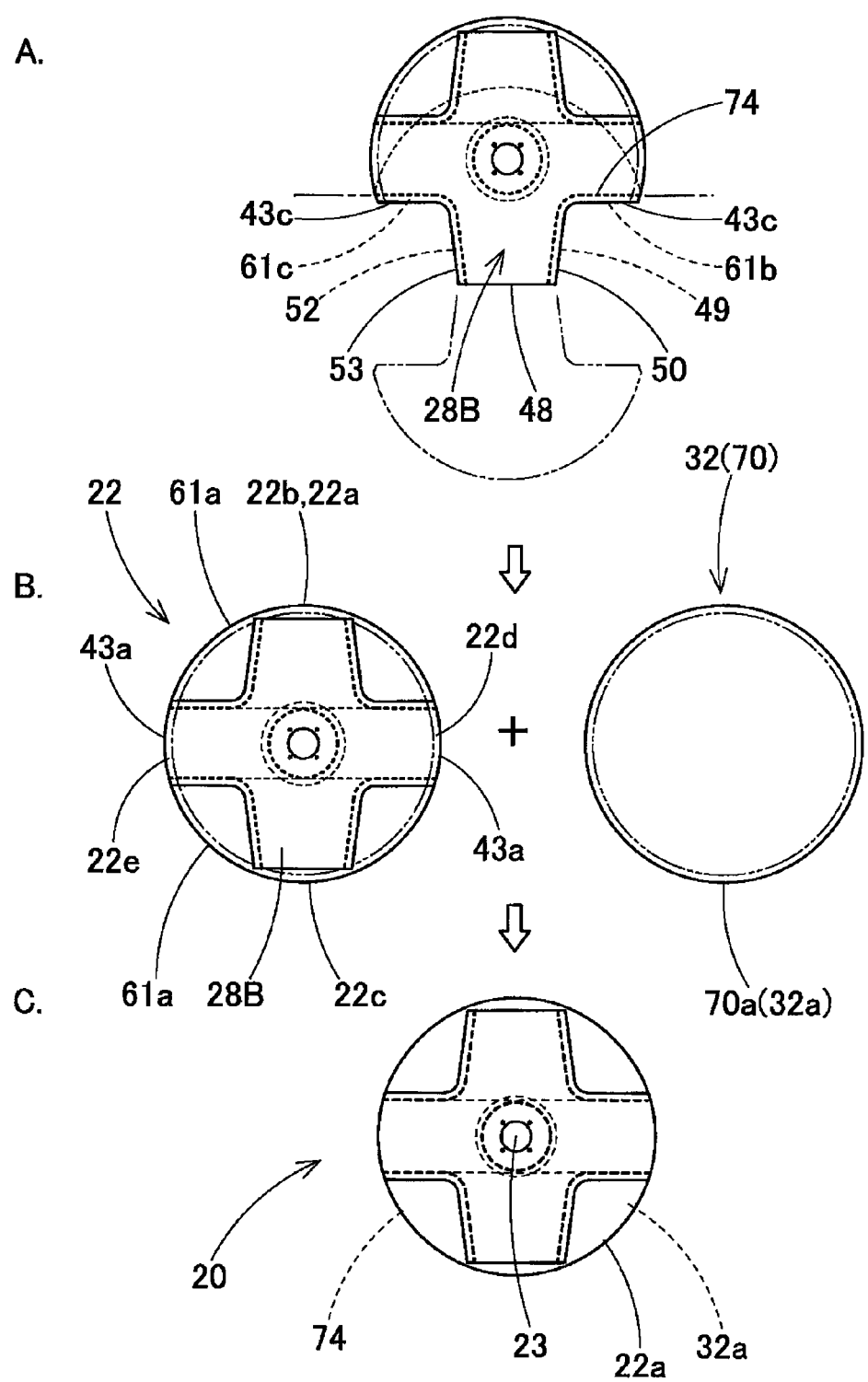
FIG. 9 is a view illustrating a step after Section C of FIG. 8 in the step of manufacturing the steering wheel side portion according to the first embodiment, and a step of manufacturing the airbag.

Then, the outer surface side of the airbag 20 in the driver side portion 32 formed of the bag material 70 is overlapped from the upper side of the steering wheel side portion 22 formed of the bag material 40 shown in Section B of FIG. 9, the tip edges 43*a*, 43*a*, 61*a*, and 61*a* (outer peripheral edge 22*a* of the steering wheel side portion 22) of the bag material 40 connecting in an arc shape and the outer peripheral edge 70*a* of the bag material 70 (outer peripheral edge 32*a* of the driver side portion 32) are sewn by the suture thread 74, and are inverted using the inflow opening 23 so that a seam allowance (sewing margin) of the outer peripheral edges 22a and 32a is not exposed to the outer peripheral surface side of the airbag 20, and thus the airbag 20 can be manufactured as shown in Section C of FIG. 9.

In a case where the airbag M is assembled and mounted on a vehicle, the retainer 7 is inserted into the airbag 20 so as to protrude each bolt (not shown) of the retainer 7 from the attaching hole 24a, then the airbag 20 is folded, and the airbag 20 is wrapped with a predetermined breakage preventing material so as not to break. In a case where the airbag 20 is stored on the bottom wall portion 11a in the case 11 so as to protrude each bolt (not shown) of the retainer 7 from through-hole 11c, the main body portion 9a of the inflator 9 is inserted from the lower side into the insertion hole 11b of the bottom wall portion 11a, each bolt (not shown) of the retainer 7 is passed through the flange portion 9c, and a nut (not shown) is fastened to each bolt, the airbag 20 and the inflator 9 are stored in the case 11 as a storage part and the airbag 20 and the inflator 9 are attached to the case 11 using the retainer 7. Further, in a case where the case 11 is covered with the airbag cover 15, each locking claw 11f is inserted into the locking hole 17a, the side wall portions 11d and 17 are coupled to each other, and the airbag cover 15 is attached to the case 11, it is possible to assemble the airbag device M. Mounting the airbag device M on a vehicle is first performed using a working hole (not shown) of the lower cover 5 in the airbag main body 1 fasten to the steering shaft SS, and in a case where the bracket portion 11e of the case 11 is attached and fixed to the core 2 by bolt fastening or the like, the airbag device M can be mounted on a vehicle.

Figure 10:
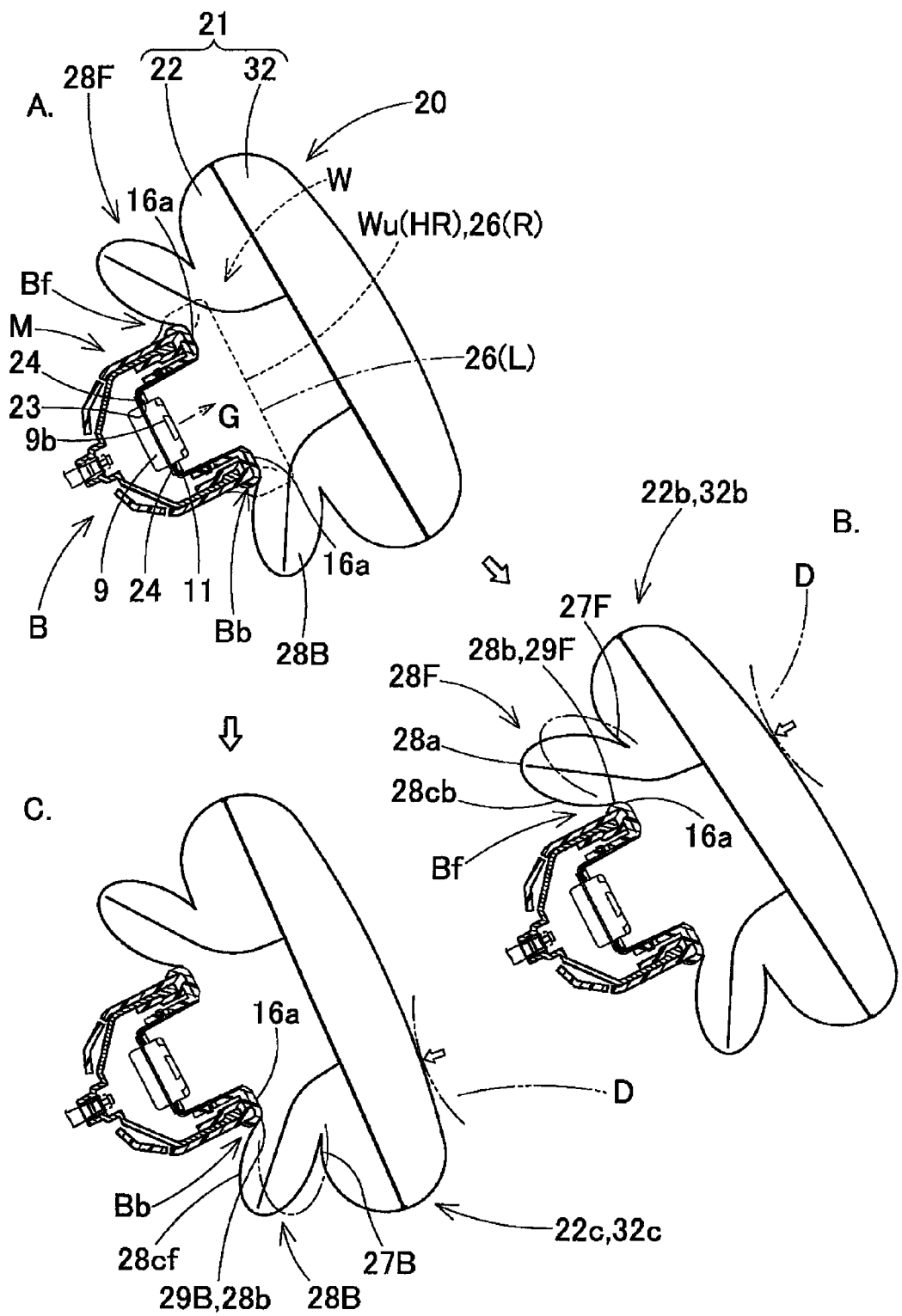
FIG. 10 is a schematic longitudinal sectional view illustrating the airbag according to the first embodiment at the time of receiving a driver after inflation completion.

At the time of operating the driver seat airbag device M according to the first embodiment, in a case where inflation gas G flows into the airbag 20 through the inflow opening 23, the airbag 20 is inflated by the inflation gas G, the door portions 16a and 16a of the airbag cover 15 is pushed to open, and as shown in a two-dot chain line in FIGS. 1 and 2 or Section A of FIG. 10, inflation is completed so that the airbag 20 protrudes from the case 11 as a storage part, covers the upper surface Wu side of the steering wheel W, and is supported by the upper surface Wu side.

In the driver seat airbag 20 according to the first embodiment, when inflation is completed and the driver D is received, the front support inflation portions 28F is disposed on the front side (front surface Bf side) of the central portion B of the steering wheel W, and thus as shown in Section B of FIG. 10, even if the front edge 32b side of the driver side portion 32 is inclined so as to be deflated downward, the front support inflation portion 28F allows the support surface portion 29F to be abutted to the front surface Bf side of the central portion B of the steering wheel (specifically, the base portion 28b side of the support surface portion 29F on the rear surface 28cb side is pressure-welded to the opened door portion 16a or the side surface Bf and is supported by the central portion B), and it is possible to prevent the front edge 32b side of the airbag 20 from being deflated downward. For the reason, the airbag 20 can accurately receive the driver D heading for the steering wheel W by the driver side portion 32 disposed so as to face the driver D without inclining.

Even if the airbag 20 according to the first embodiment is mounted on a steering wheel W having the short length dimension YF from the central portion B toward the front portion BF side, it is possible to stably receive and protect the driver D at the time of completion of inflation.

In the airbag 20 according to the first embodiment, the rear support inflation portions 28B protruding from the rear side of the attaching seat 24 to the rear side of the steering wheel W is arranged in the steering wheel side portion 22 at the time of completion of inflation, and at the time of tilting the driver side portion 32 in the backward direction when the airbag 20 receives the driver D, the rear support surface portion 29B abutted to and supported by a rear surface Bb side of the steering wheel W is arranged in a region on the front surface 28cf side of the rear support inflation portions 28B from the base portion 28b to the tip end portion 28a.

For the reason, the first embodiment, when inflation is completed in a state of mounting on the steering wheel W and the driver D is received, as shown in Section C of FIG. 10, since the rear support inflation portion 28B is disposed on the rear side of the central portion B of the steering wheel W, even if the rear edge 32c side of the driver side portion 32 is inclined so that the rear edge side is deflated downward, the rear support inflation portion 28B allows a rear support surface portion 29B to be abutted to a rear surface Bb side of the central portion B of the steering wheel (specifically, the base portion 28b side of the support surface portion 29F on the front surface 28cf side is pressure-welded to the opened door portion 16a or the rear surface Bb and is supported by the central portion B), and thus it is possible to prevent the rear edge 32c side of the airbag 20 from being deflated downward. As a result, the airbag 20 can accurately receive the driver D heading for the steering wheel W by the driver side portion 32 disposed so as to face the driver D without inclining.

That is, in the airbag 20 having such a configuration, even if the steering wheel W to be mounted has a configuration in which length dimensions YF and YB from the central portion B toward the both sides of the front portion BF side and the rear portion BB side are shorter than length dimensions XL and XR from the central portion B toward right and left sides, it is possible to stably receive and protect the driver D heading for the steering wheel W at the time of completion of inflation.

In other words, even if the airbag 20 according to the first embodiment is mounted on the steering wheel W which has at least the operating grip portions HL and HR on both of right and left sides and has a shape in which a front and rear width dimension YW from the central portion B is shorter than a right and left width dimension XW from the central portion B, it is possible to suitably receive the driver D. Even if the sides of the right and left edges 32d and 32e of the driver side portion 32 (see FIG. 1) is deflated downward, since the width dimension XW of the steering wheel W in the right and left direction is wider than the width dimension YW in the forward and backward direction, instead of the support inflation portion 28, the general sections 26L and 26R extending from the attaching seat 24 of the steering wheel side portion 22 to the right and left sides are abutted to and supported by the upper surface Wu side of the coupling portions SFL, SFR, SBL, and SBR in the vicinity of the operating grip portions HL and HR of the steering wheel W or the upper surface Wu side of the operating grip portions HL and HR, inclination of the driver side portion 32 is prevented, and the airbag 20 can accurately receive the driver by the driver side portion 32 disposed so as to face the driver D.

At the time of completion of inflation of the airbag 20, the front and rear support inflation portions 28F and 28B may be arranged, with the opened door portion 16a interposed appropriately therebetween, so as to be abutted to one or both of the front surface Bf side extending from a front edge of an upper surface Bu of the central portion B (see FIGS. 1 and 2) to the lower side and the rear surface Bb side extending from a rear edge of the upper surface Bu to the lower side in advance, or may be arranged so as to be abutted to the both sides, thereby holding the central portion B in the front and rear. At least if the driver side portion 32 is possibly prevented from being largely tilted (oscillated) in the forward and backward direction when receiving the driver D, at the time of completion of inflation of the airbag 20, the support inflation portions 28F and 28B may be arranged to be separated from the front surface Bf side extending from the front edge of the upper surface Bu of the central portion B to the lower side and the rear surface Bb side extending from the rear edge of the upper surface Bu to the lower side in advance.

In the airbag 20 according to the first embodiment, the steering wheel side portion 22 at the time of completion of inflation includes the general sections 26L and 26R which are disposed on both of right and left sides between the front and rear support inflation portions 28F and 28B and supported on the upper surface Wu side of the steering wheel W, and the extension sections 27F and 27B which are extended from the general sections 26L and 26R to an upper sides of the front and rear support inflation portions 28F and 28B.

For the reason, in the embodiment, each of the front and rear support inflation portions 28F and 28B is formed so as to partially protrude from a space between the extension sections 27F and 27B and the attaching seat 24, and it is possible to reduce the volume and to rapidly inflate the airbag 20.

In the first embodiment, the steering wheel side portion 22 is formed of the bag material 40 having flexibility, and the bag material 40 includes the general section parts 43L and 43R which are extended from the attaching seat part 41 for forming the attaching seat 24 in a right and left direction and can form the general sections 26L and 26R, and the protrusion section parts 45 which are extended from the attaching seat part 41 in a forward and backward direction and can form the front and rear support inflation portions 28F and 28B, respectively. Each of the front and rear support inflation portions 28F and 28B has the folding section 48 along the right and left direction on the tip end portion 28a and is formed of the sheet-shaped parts 47F and 47B joining overlapped right and left edges extending from the folding section 48, that is, edges 49 and 50 and edges 52 and 53 to each other. Each of the front and rear protrusion section parts 45F and 45B has the sheet-shaped parts 47F and 47B disposed on the attaching seat 24 side and the tip end parts 61F and 61B disposed on a tip end side. The tip edge 61a of the front and rear tip end parts 61F and 61B and the tip edge 43a of the right and left general section parts 43L and 43R constitute a driver side joining portion joined to the outer peripheral edge 32a of the driver side portion 32, and parts opposing in front and rear of right and left side edges 61b and 61c extending from both ends of the tip edge 61a to the sheet-shaped parts 47F and 47B on an inner side and the front and rear side edges 43b and 43c of the general section parts 43L and 43R, in outer peripheral edges of the front and rear tip end parts 61F and 61B, constitute joining sections for forming a steering wheel side portion joining to each other.

In such a configuration, in each of the sheet-shaped parts 47F and 47B in the front and rear protrusion section parts 45F and 45B of the bag material 40 constituting the steering wheel side portion 22, the folding section 48 is folded, and overlapped right and left edges, that is, the edges 49 and 50 and the edges 52 and 53 are joined to each other to form the support inflation portions 28F and 28B. Then, extending is performed from the tip edge 61a in the right and left direction in outer peripheral edges of the tip end parts 61F and 61B of the front and rear protrusion section parts 45F and 45B, the joining portions opposing in front and rear of the right and left side edges 61b and 61c extending to the sheet-shaped parts 47F and 47B and the front and rear side edges 43b and 43c of the general section parts 43L and 43R, that is, the side edge 43b of the general section part 43L and the side edge 61b of the tip end part 61F, the side edge 43c of the general section part 43L and the side edge 61b of the tip end part 61B, the side edge 43b of the general section part 43R and the side edge 61c of the tip end part 61F, and the side edge 43c of the general section part 43R and the side edge 61c of the tip end part 61B are joined to each other, and thus the steering wheel side portion 22 can be formed. Thereafter, in the steering wheel side portion 22, the driver side joining portion including the tip edges 61a and 61a of the front and rear tip end parts 61F and 61B and the tip edges 43a and 43a of the right and left general section parts 43L and 43R is joined to the outer peripheral edge 32a of the driver side portion 32, a front face and a rear face are inverted using the inflow opening 23 so as not to expose a seam allowance, and thus the airbag 20 can be manufactured.

In such a configuration, the airbag 20 can be formed by planar sewing of overlapping predetermined joining sites, and it is possible to easily manufacture the airbag 20.

In the first embodiment, the bag material 40 which forms the steering wheel side portion 22 and has flexibility is formed from a single sheet including the attaching seat part 41, the right and left general section parts 43L and 43R, and the front and rear protrusion section parts 45F and 45B. For the reason, in the first embodiment, the outer peripheral wall 21 of the airbag 20 can be formed by using two sheets of the bag materials 40 and 70 having a predetermined shape together with the bag material 70 which forms the steering wheel side portion 32, the number of components of the airbag 20 can be reduced, the components are easily managed, the number of the sites subjected to joining work can be reduced, and it is possible to easily manufacture the airbag 20.

Particularly, in the first embodiment, as shown in Sections A, B and C of FIG. 8 and Sections A and B of FIG. 9, the steering wheel side portion 22 can be formed only by planar sewing. Therefore, even if the support inflation portion 28 partially protrudes, the steering wheel side portion 22 can be easily formed.

Without consideration of the above points, as the bag material 40 which forms the steering wheel side portion 22 and has flexibility, the bag material 40 may be formed by separating the attaching seat part 41, the right and left general section parts 43L and 43R, and the front and rear protrusion section parts 45F and 45B respectively, into two sheets, or into three sheets and joining parts to each other. The airbag may also be formed by providing an opening to allow the support inflation portion to protrude on the steering wheel side portion provided with the attaching seat and join the support inflation portion to a peripheral edge of the opening.

Figure 11:
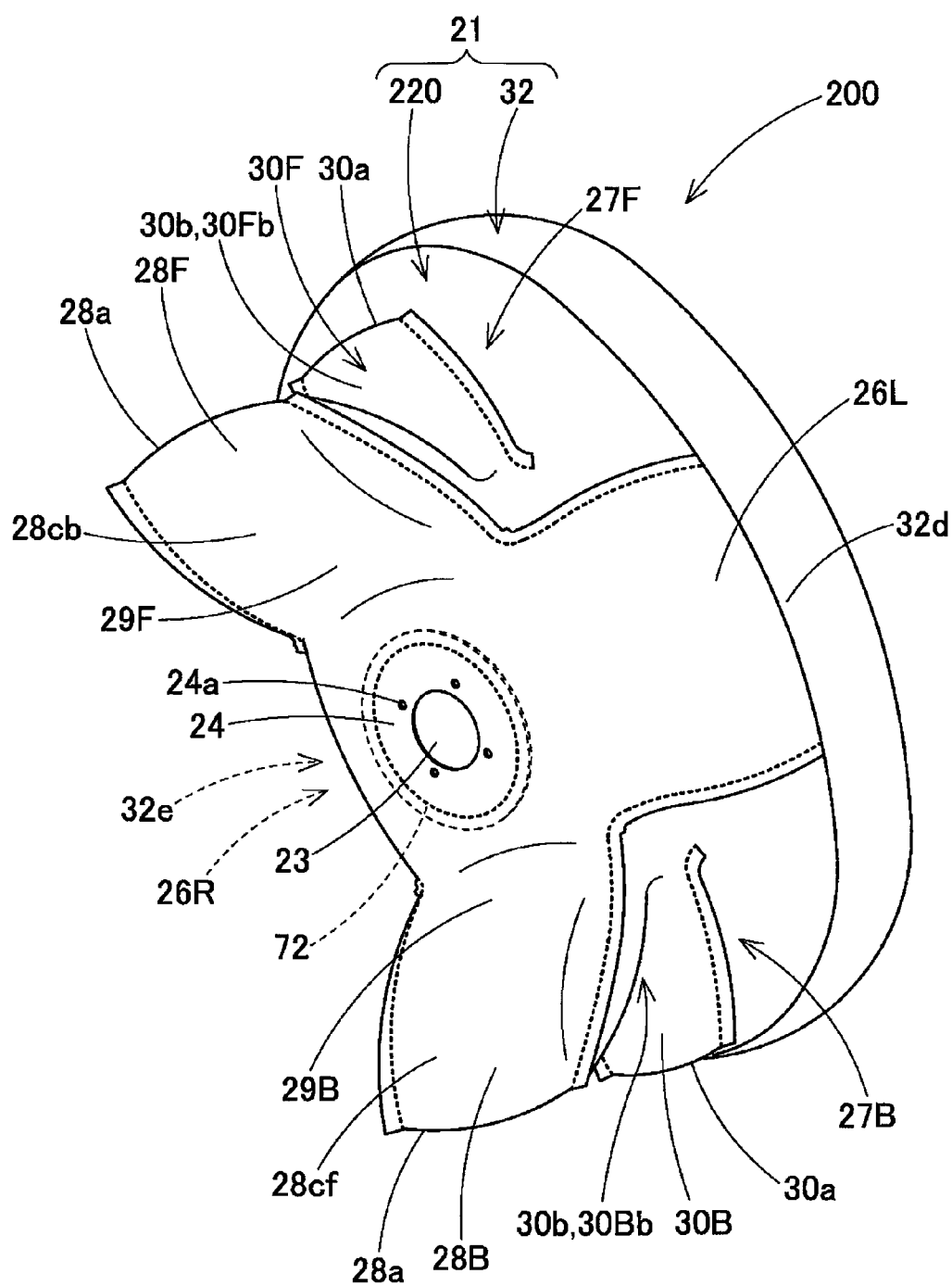
FIG. 11 is a schematic perspective view of an airbag according to a second embodiment at the time of inflation.
Figure 19:
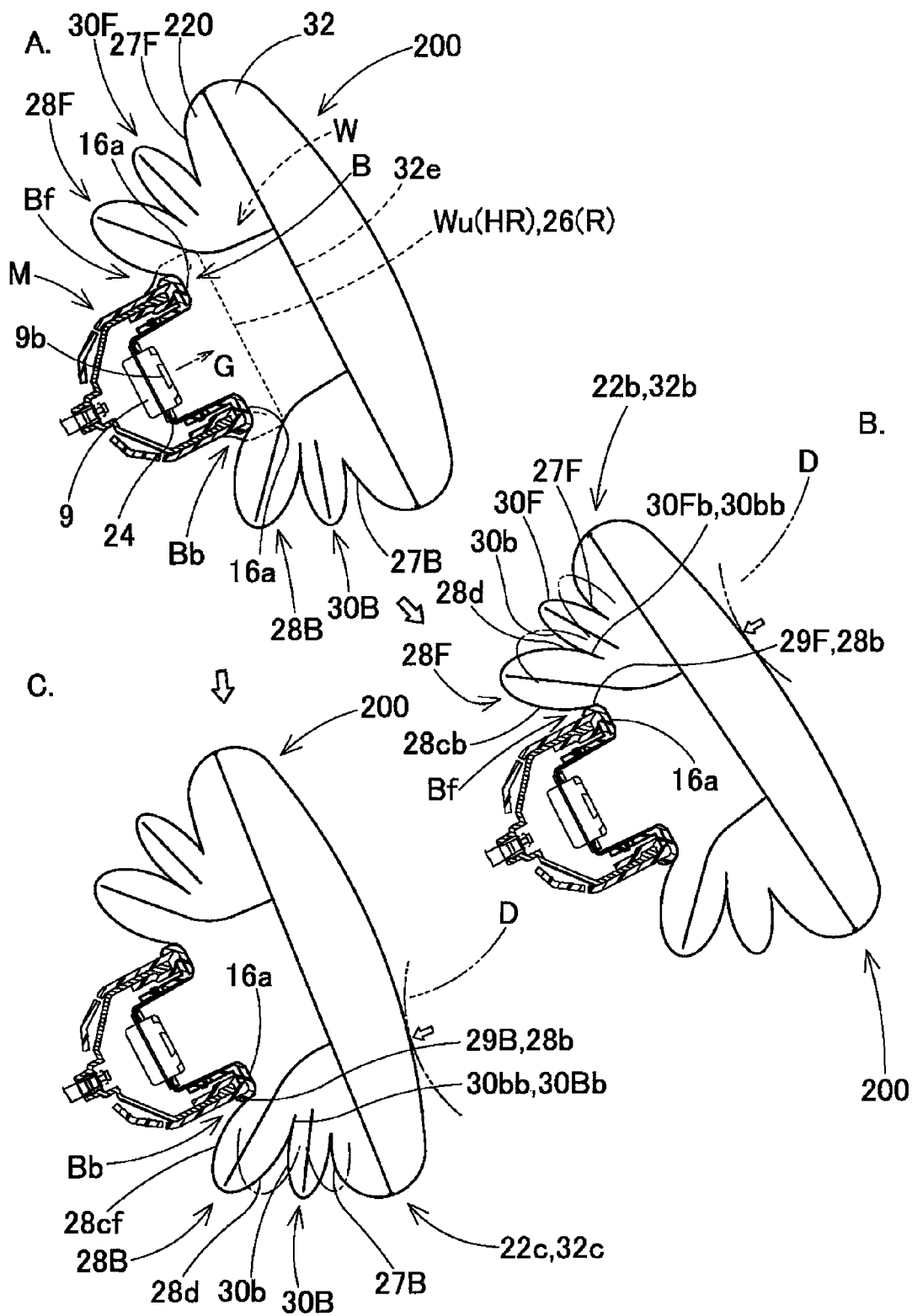
FIG. 19 is a schematic longitudinal sectional view illustrating the airbag according to the second embodiment at the time of receiving a driver after inflation completion.

As shown in an airbag 200 according to a second embodiment shown in FIG. 11 and Sections A, B and C of FIG. 19, at the time of relative approaching to sides of the extension sections 27F and 27B when the support inflation portions 28F and 28B is abutted (pressure-welded) to the front side (front surface Bf side) or the rear side (rear surface Bb side) of the central portion B of the steering wheel W, second support inflation portions 30F and 30B capable of supporting the support inflation portions 28F and 28B may be arranged in the extension sections 27F and 27B of a steering wheel side portion 220 at the time of completion of inflation.

The second support inflation portions 30F and 30B have an approximately rectangular plate shape in which the tip end portion 30a is tapered.

In the airbag 200 according to the second embodiment, each of the second support inflation portions 30F and 30B supporting the support inflation portions 28F and 28B is formed so as to partially protrude from a space between the extension sections 27F and 27B and the support inflation portions 28F and 28B, and it is possible to prevent the volume of the airbag 200 from being increased and to improve supporting force of the front and rear support inflation portions 28F and 28B.

That is, after the inflation of the airbag 200 is completed as shown in Section A of FIG. 19, the driver D is received as shown in Section B of FIG. 19, and even if the front edge 32b side of the driver side portion 32 is inclined so as to be deflated downward, first, the support inflation portion 28F on the front side pressure-welds the support surface portion 29F on the rear surface 28cb side to the front surface Bf including the opened door portion 16a in the central portion B of the steering wheel W, and is supported by the central portion B, and inclination of the driver side portion 32 is prevented. Moreover, even if the driver side portion 32 is inclined, the second support inflation portion 30F abuts a support surface 30b to a surface (front surface) 28d opposite to the support inflation portion 28F abutting the support surface portion 29F to the front surface Bf side, the inclination of driver side portion 32 can be prevented, and the airbag 200 can accurately receive the driver D by the driver side portion 32 disposed so as to face the driver D.

Similarly, as shown in Section C of FIG. 19, even if the rear edge 32c side of the driver side portion 32 is inclined so as to be deflated downward, first, the support inflation portion 28B on the rear side pressure-welds the support surface portion 29B on the front surface 28cf side to the rear surface Bb side including the opened door portion 16a in the central portion B of the steering wheel W, and is supported by the central portion B, and inclination of the driver side portion 32 is prevented. Moreover, even if the driver side portion 32 is inclined, the second support inflation portion 30B abuts a support surface 30b to a surface (rear surface) 28d opposite to the support inflation portion 28B abutting the support surface portion 29B to the rear surface Bb side, the inclination of driver side portion 32 can be prevented, and the airbag 200 can accurately receive the driver D by the driver side portion 32 disposed so as to face the driver D.

Even if the sides of the right and left edges 32d and 32e of the driver side portion 32 (see FIG. 11 and Sections A, B and C of FIG. 19) is deflated downward, similar to the first embodiment, instead of the support inflation portion 28 or the second support inflation portion 30, the general sections 26L and 26R extending from the attaching seat 24 of the steering wheel side portion 220 to the right and left sides are abutted to and supported by the upper surface Wu side of the coupling portions SFL, SFR, SBL, and SBR in the vicinity of the operating grip portions HL and HR of the steering wheel W or the upper surface Wu side of the operating grip portions HL and HR, inclination of the driver side portion 32 is prevented, and the airbag 20 can accurately receive the driver by the driver side portion 32 disposed so as to face the driver D.

Figure 12:
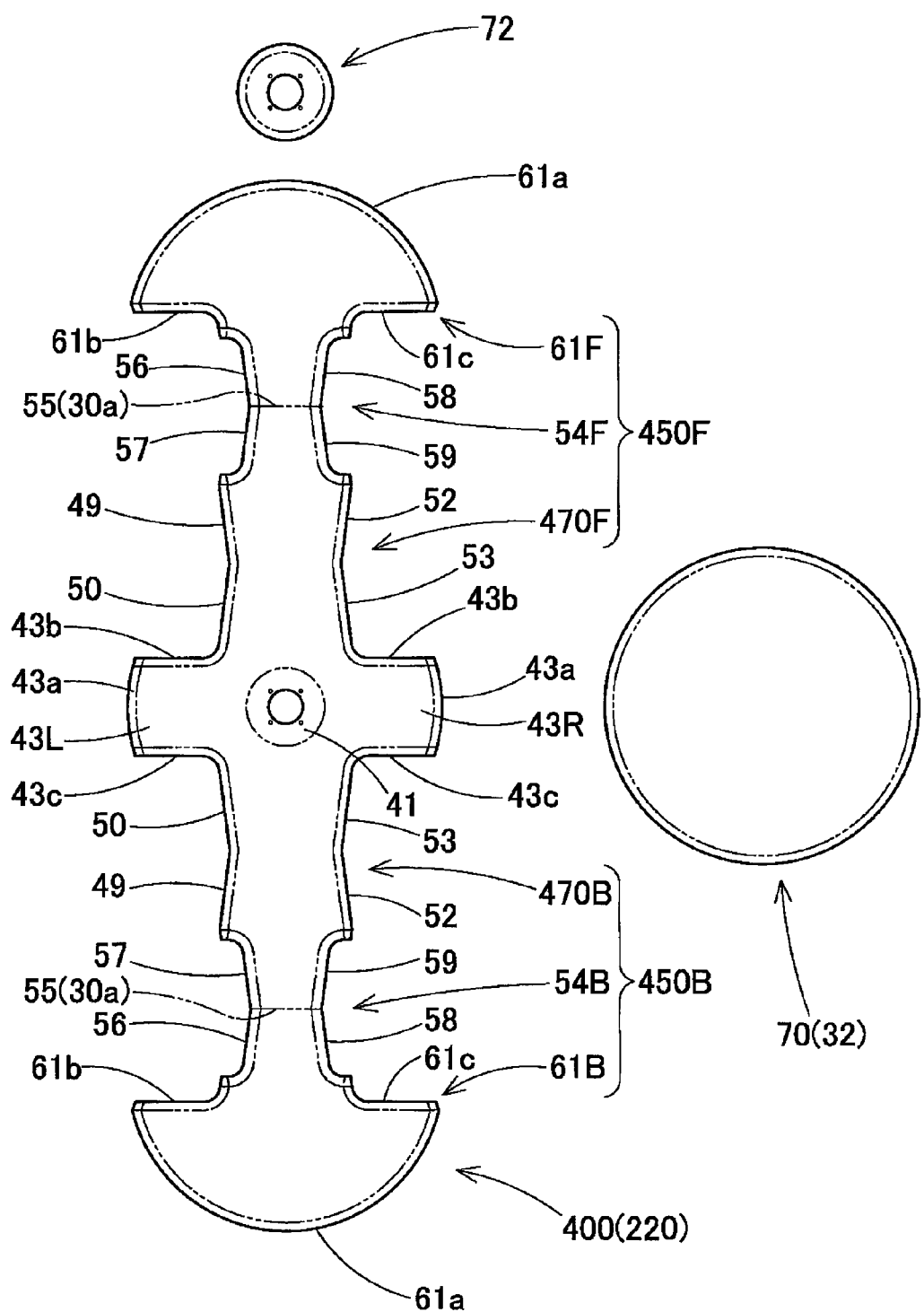
FIG. 12 is a plan view of a bag material for manufacturing the airbag according to the second embodiment.

As shown in FIG. 12, the airbag 200 is formed by using the driver side portion 32 formed of the same bag material 70 as the first embodiment, and the steering wheel side portion 220 formed of a bag material 400 having a shape slightly different from the bag material 40 of the first embodiment.

The bag material 400 is different from the bag material 40 in that second parts 54 (54F and 54B) forming the second support inflation portions 30F and 30B are disposed between the sheet-shaped parts 47(47F and 47B) and the tip end parts 61 (61F and 61B) of the protrusion section part 45 of the bag material 40 of the first embodiment. That is, similar to the bag material 40, the bag material 400 includes the attaching seat part 41, the general section parts 43 (43L and 43R), and the tip end parts 61 (61F and 61B). Sheet-shaped parts 470 (470F and 470B) of protrusion section parts 450 (450F and 450B) include the second parts 54 (54F and 54B) having a folding section 55 forming the tip end portion 30a of the second support inflation portion 30 (30F and 30B), edges 56 and 57 which are sewn to each other by mutually overlapping on the left side of the folding section 55, and edges 58 and 59 which are sewn to each other by mutually overlapping on the right side, in addition to the parts similar to the sheet-shaped parts 47 (47F and 47B) of the base material 40 including the mutual sewing edges 49 and 50 on the left side and the mutual sewing edges 52 and 53 on the right side of the folding sections 48.

Figure 13:
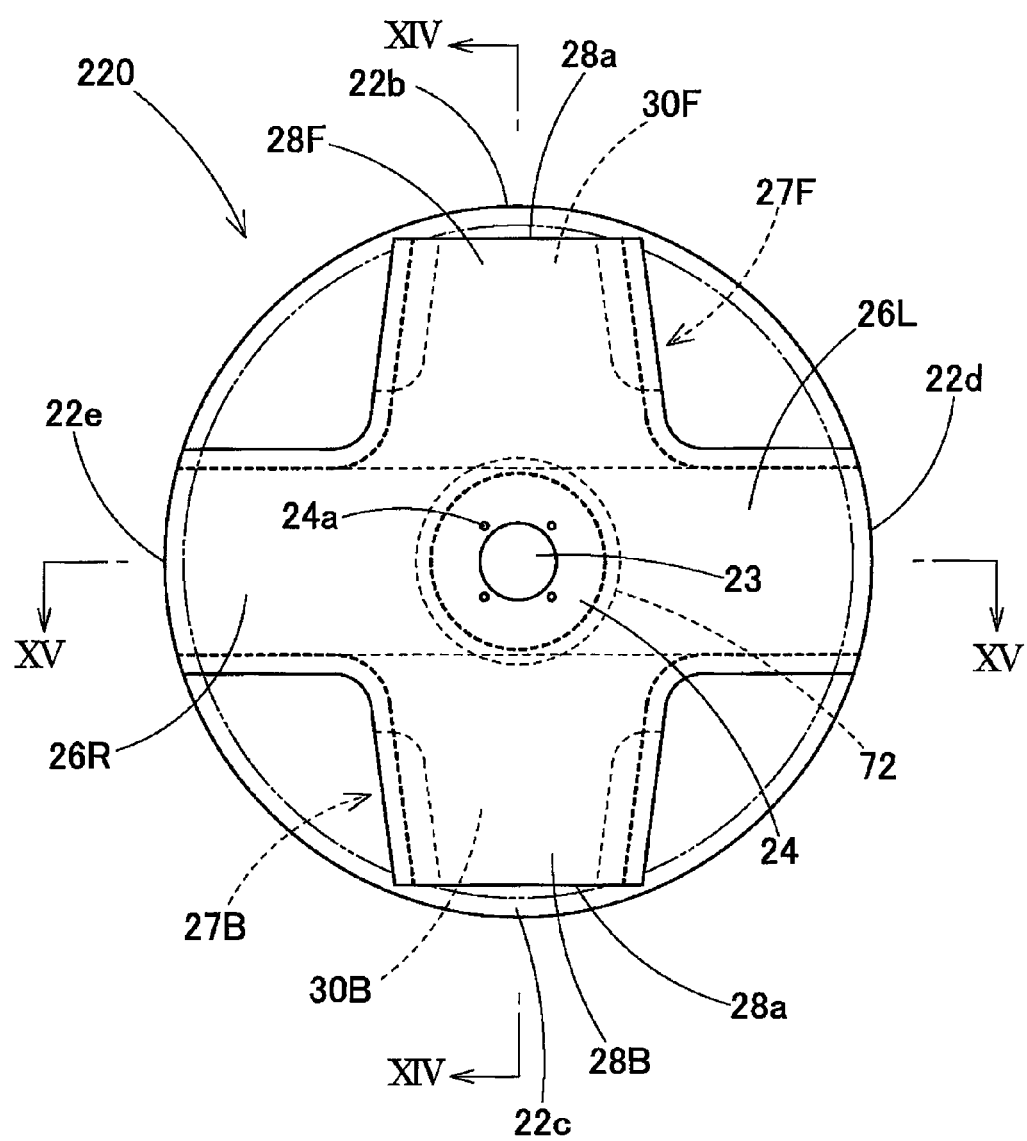
FIG. 13 is a plan view illustrating a state where a steering wheel side portion of the airbag according to the second embodiment is manufactured.
Figure 14:
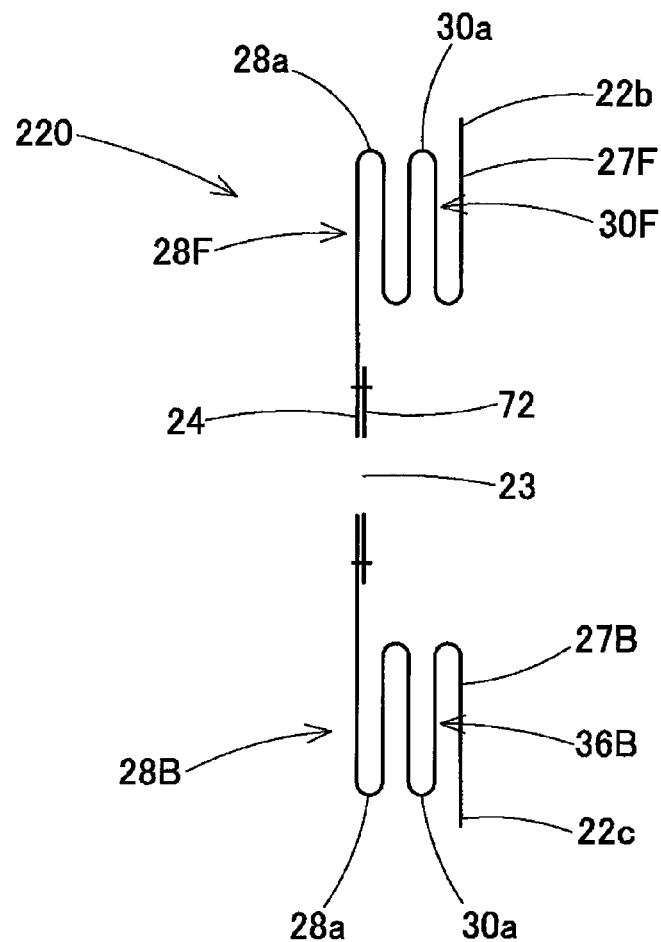
FIG. 14 is a schematic end view of a XIV-XIV part in FIG. 13.
Figure 15:
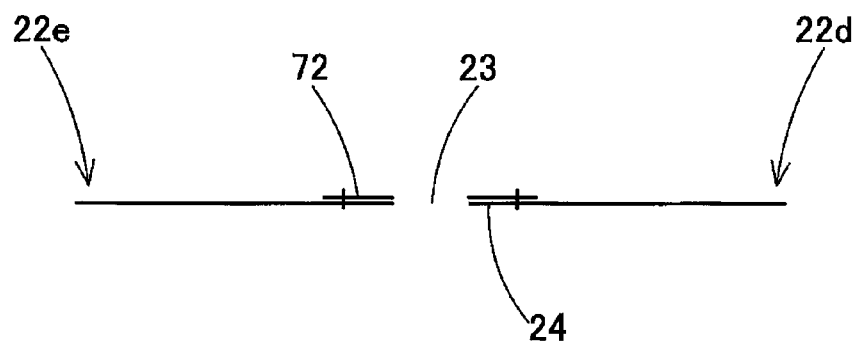
FIG. 15 is a schematic end view of a XV-XV part in FIG. 13.
Figure 16:
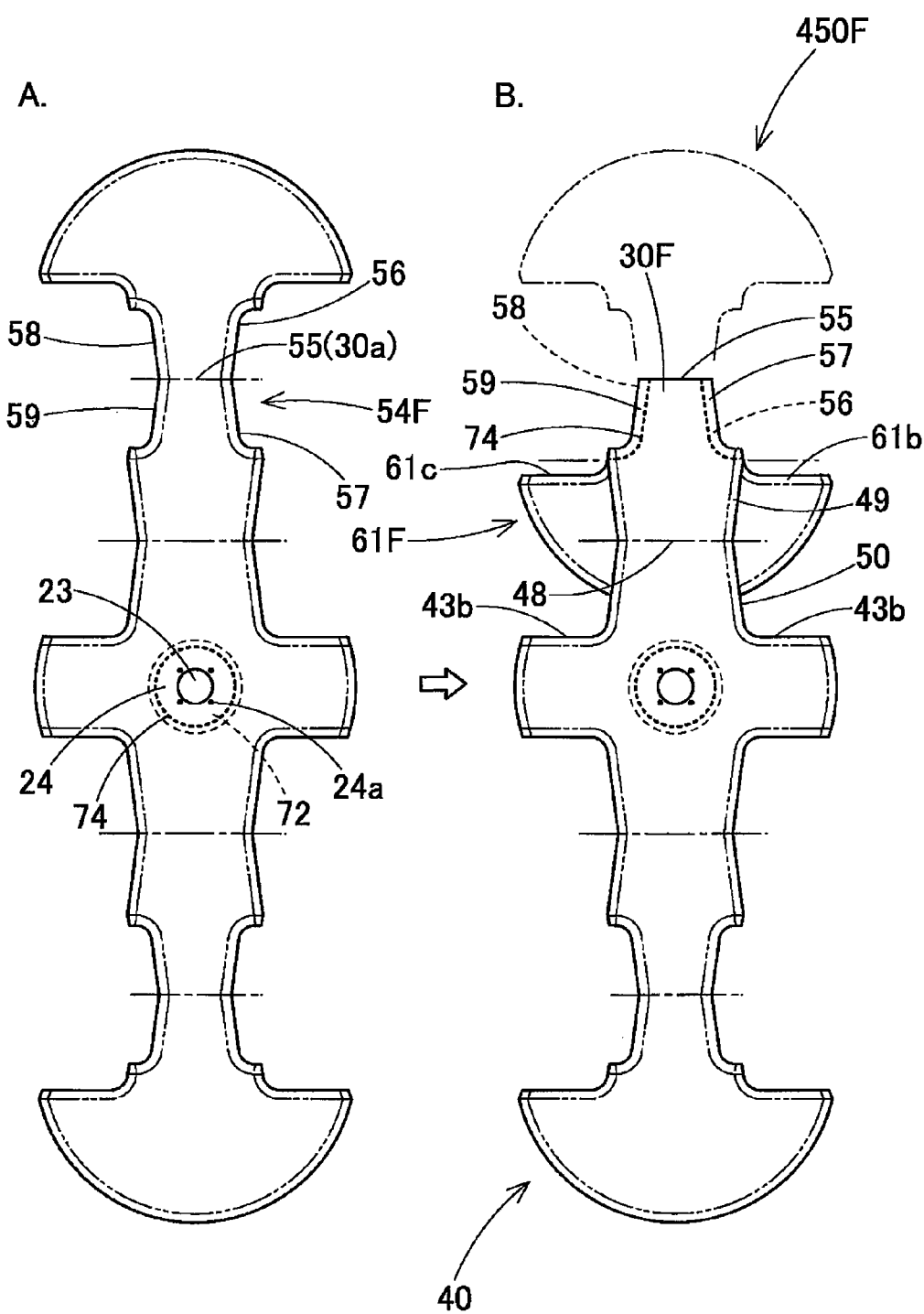
FIG. 16 is a view illustrating a step of manufacturing the steering wheel side portion in the airbag according to the second embodiment.
Figure 17:
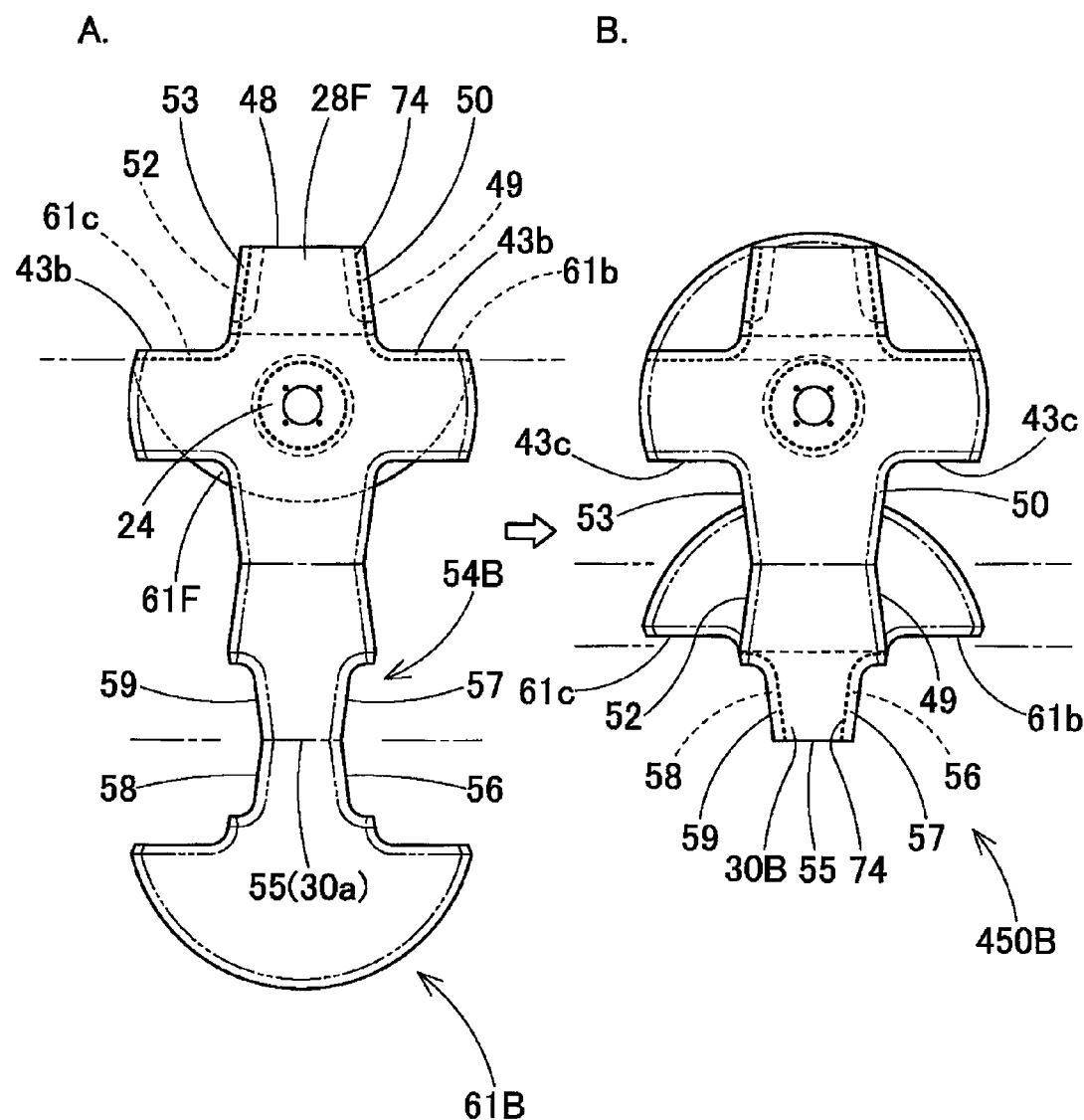
FIG. 17 is a view illustrating the step of manufacturing the steering wheel side portion in the airbag according to the second embodiment, and illustrate a step after Section B of FIG. 16.
Figure 18:
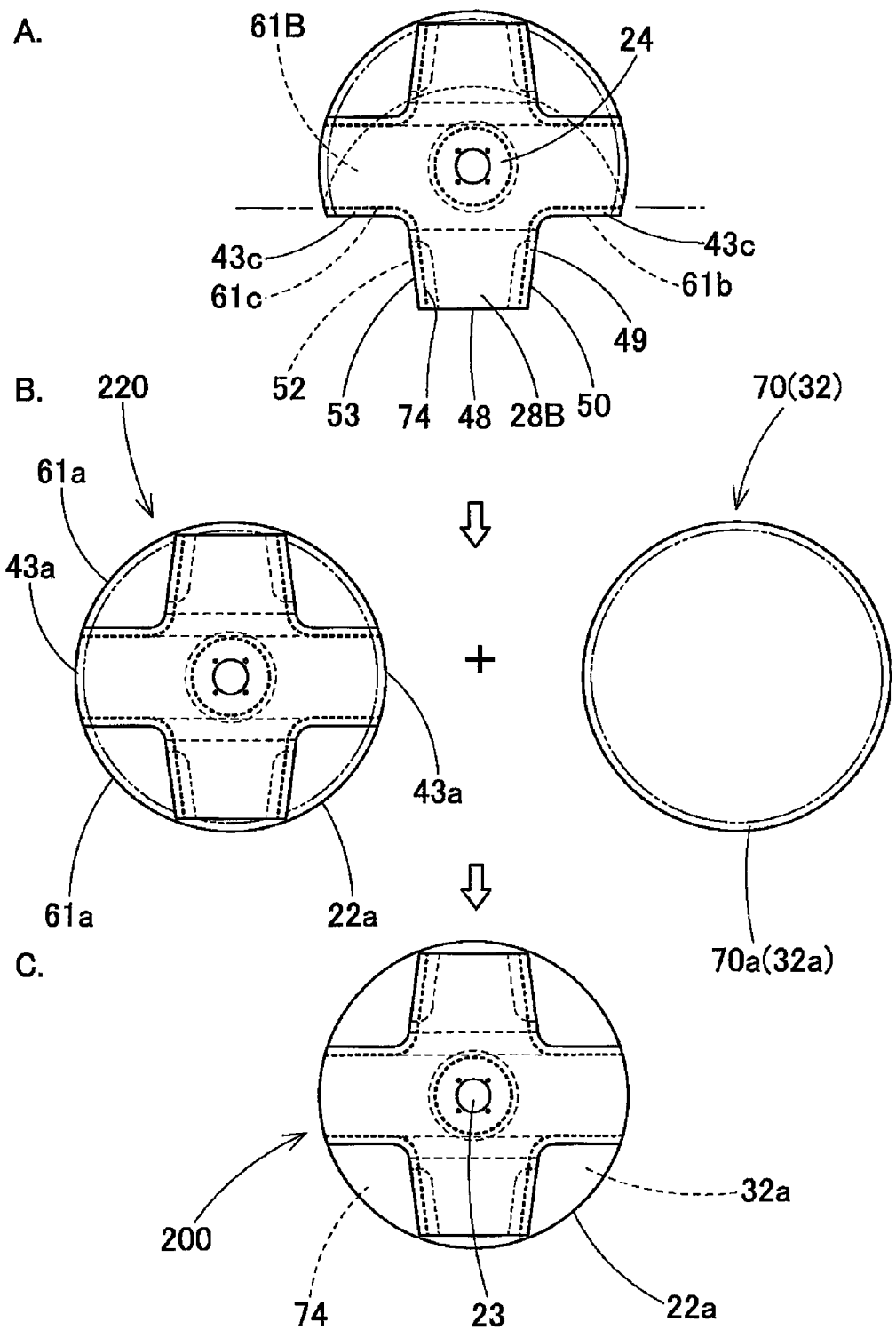
FIG. 18 is a view illustrating a step after Section B of FIG. 17 in the step of manufacturing the steering wheel side portion according to the second embodiment, and a step of manufacturing the airbag.

In a step of manufacturing the steering wheel side portion 220 by using the bag material 400, as shown in Sections A and B of FIG. 16, after the inflow opening 23 and the attaching hole 24a are formed by sewing the reinforcing cloth 72, for example, mountain-fold creases are attached to a surface sewing the reinforcing cloth 72 in the second part 54F and an opposite side (outer peripheral surface side), the folding section 55 is folded, the overlapped edges 56 and 57 on the left side of the folding section 55 and the edges 58 and 59 on the right side are sewn to each other, and only the outer peripheral wall of the second support inflation portion 30F is first formed, and subsequent work is the same as Sections A and B of FIG. 8. That is, as shown in Section B of FIG. 16 and Section A of FIG. 17, in a case where the tip end part 61F of the protrusion section part 450F is overlapped with the attaching seat 24 and the folding section 48 of the support inflation portion 28F in the bag material 400 is folded, the edges 61b and 43b of the tip end part 61F and the general section part 43L, the edges 49 and 50 of the sheet-shaped part 470F, the edges 61c and 43b of the tip end part 61F and the general section part 43R, and the edges 52 and 53 of the sheet-shaped part 470F are overlapped with each other at the same time, and thus parts thereof are set on a workbench of a predetermined industrial sewing machine, and are sewn by planar sewing. Then, as shown in Sections A and B of FIG. 17, mountain-fold creases are attached to a side sewing the reinforcing cloth 72 in the second part 54B and a surface on an opposite side, the folding section 55 is folded, the overlapped edges 56 and 57 on the left side of the folding section 55 and the edges 58 and 59 on the right side are sewn to each other, and the outer peripheral wall of the second support inflation portion 30B is first formed. As shown in Section B of FIG. 17 and Section A of FIG. 18, in a case where the tip end part 61B of the protrusion section part 450B is overlapped with the attaching seat 24 and the folding section 48 of the support inflation portion 28B in the bag material 400 is folded, the edges 61b and 43c of the tip end part 61B and the general section part 43L, the edges 49 and 50 of the sheet-shaped part 470B, the edges 61c and 43c of the tip end part 61B and the general section part 43R, and the edges 52 and 53 of the sheet-shaped part 470B are overlapped with each other at the same time, and thus parts thereof are set on a workbench of a predetermined industrial sewing machine, and the steering wheel side portion 220 shown in FIGS. 13 to 15 can be easily formed by planar sewing. Thereafter, as shown in Sections B and C of FIG. 18, similar to the first embodiment, the steering wheel side portion 220 is overlapped with the driver side portion 32, the outer peripheral edges 22a and 32a are sewn to each other, and inverting is performed, whereby the airbag 200 may be manufactured.

Then, similar to the airbag 20 according to the first embodiment, the airbag may be assembled to the airbag device M and mounted on the steering wheel W.

As described above, the airbag 200 including the front and rear support inflation portions 28F and 28B and the second support inflation portions 30F and 30B can be easily formed only by using the bag material 400 in which simply, two folding section 48 and 55 are arranged on the sheet-shaped parts 470F and 470B so as to form the two support inflation portions 28F and 30F or the support inflation portions 28B and 30B respectively, compared to the bag material 40 of the airbag 20.

In the airbag 200 according to the second embodiment, a case where the second support inflation portions 30F and 30B capable of supporting the front and rear support inflation portions 28F and 28B of the steering wheel side portion 220 respectively are provided is exemplified, but the second support inflation portions 30 may also be appropriately provided so as to support only one of the front and rear support inflation portions 28F and 28B.

Figure 20:
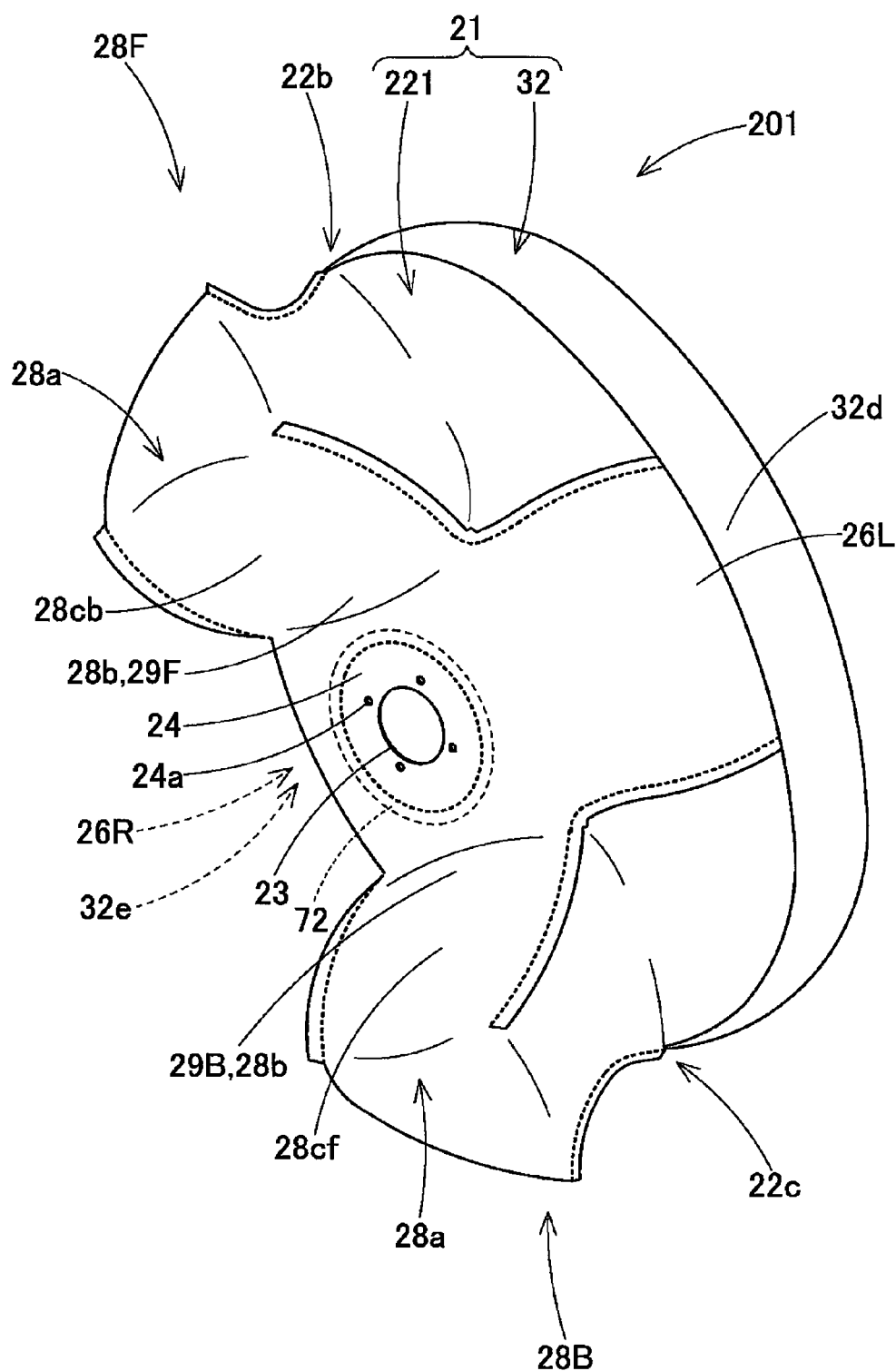
FIG. 20 is a schematic perspective view of an airbag according to a third embodiment at the time of inflation.
Figure 28:
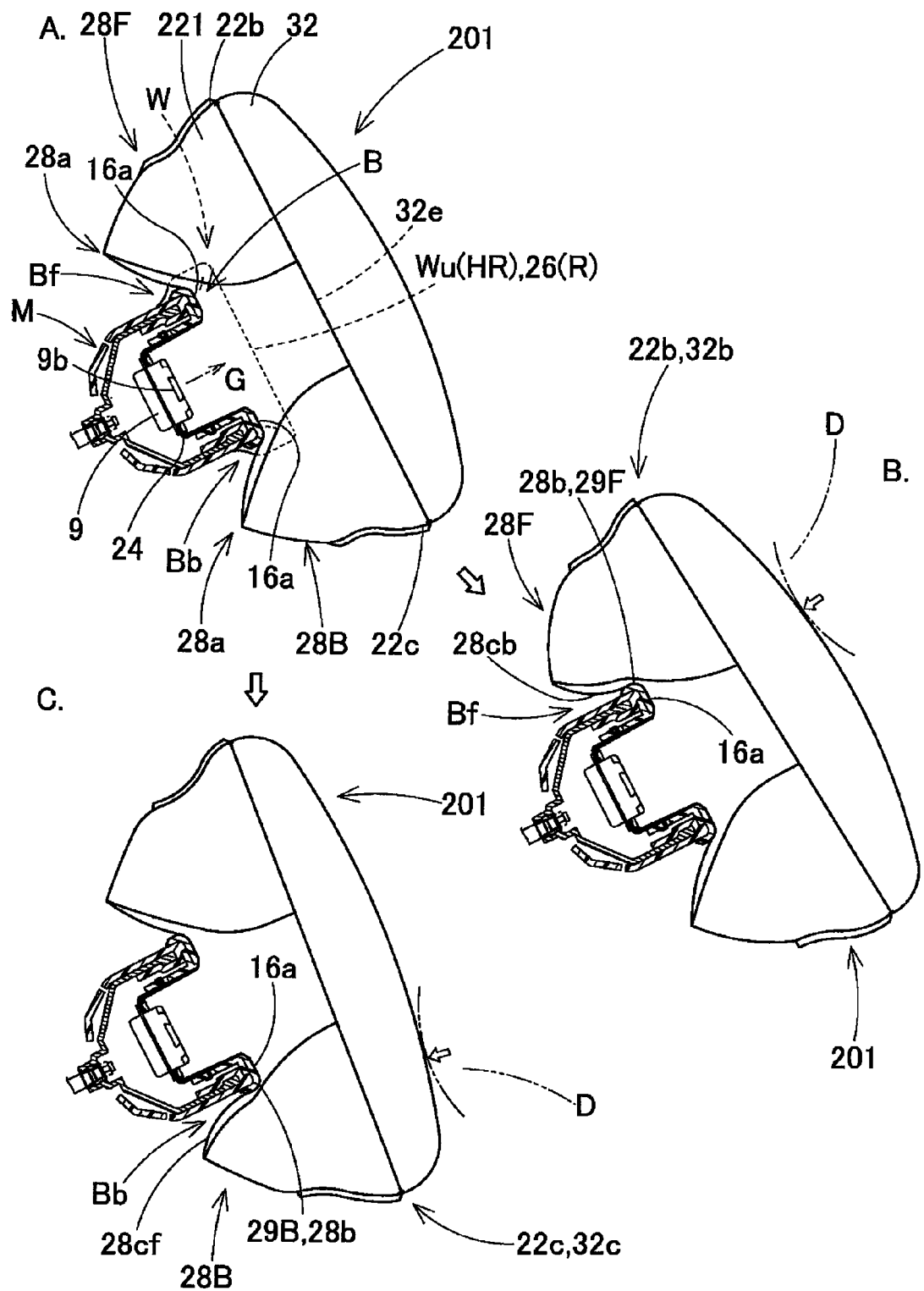
FIG. 28 is a schematic longitudinal sectional view illustrating the airbag according to the third embodiment at the time of receiving a driver after inflation completion.

In the airbags 20 and 200 according to the first and second embodiments, the support inflation portions 28 (28F and 28B) and 30 (30F and 30B) partially protrude from the extension sections 27 (27F and 27B) of the steering wheel side portions 22 and 220, but as an airbag 201 according to a third embodiment shown in FIG. 20 and Sections A, B and C of FIG. 28, the support inflation portions 28 (28F and 28B) may also protrude so as to protrude from front and rear edges 22b and 22c of a steering wheel side portions 221 to a lower side.

Figure 21:
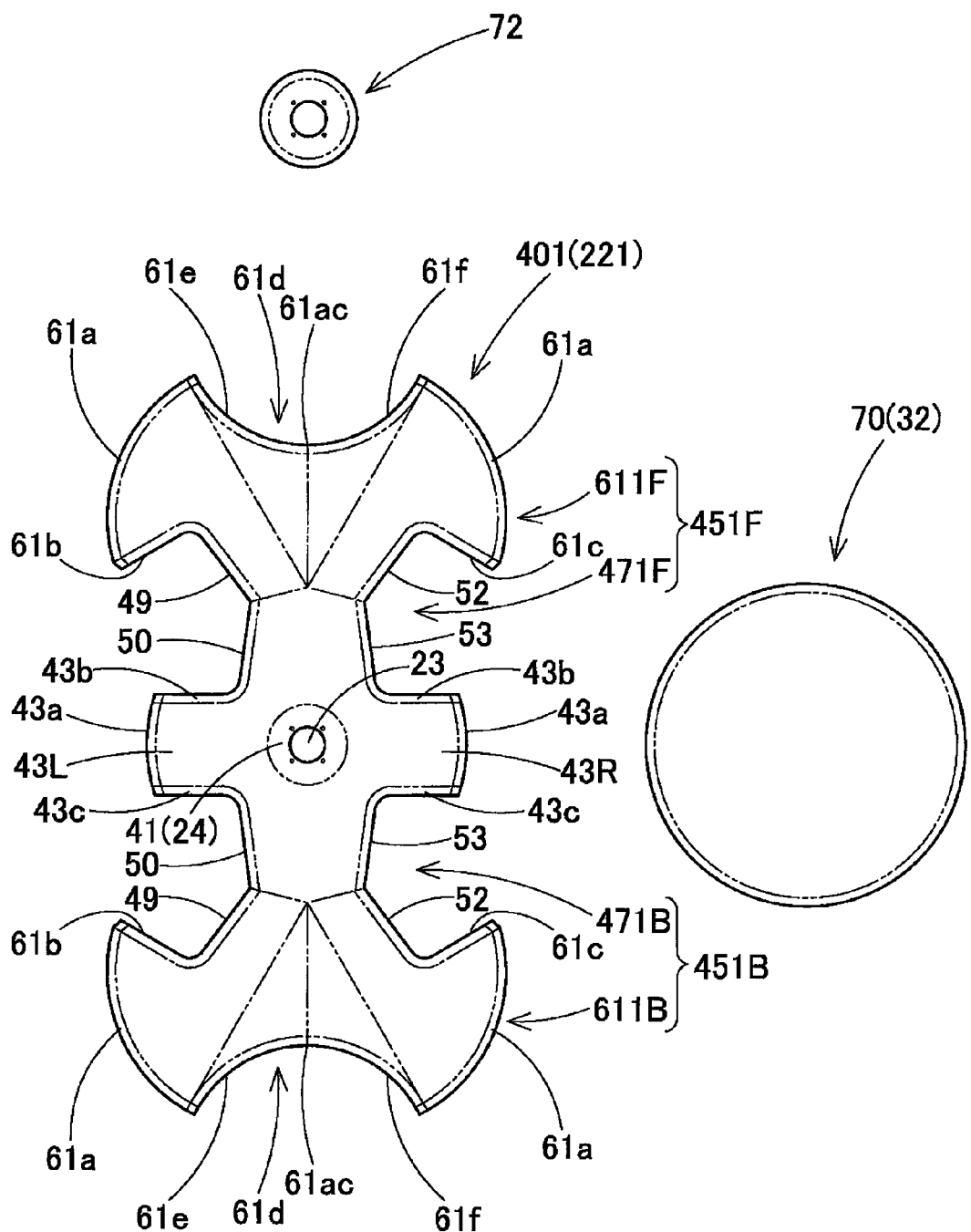
FIG. 21 is a plan view of a bag material for manufacturing the airbag according to the third embodiment.

The airbag 201 includes the same driver side portion 32 as the first and second embodiments, and the steering wheel side portions 221 formed of a bag material 401 having a shape slightly different from the bag material 40 of the first embodiment. As shown in FIG. 21, the bag material 401 has a shape in which a recessed groove 61d is provided at a center of the tip end and expanding is performed on both of right and left sides, from the tip end parts 61 (61F and 61B) of the bag material 40 to the sheet-shaped parts 47 (47F and 47B). Similar to the bag material 40, the bag material 401 includes the attaching seat part 41 and the general section parts 43 (43L and 43R). In a protrusion section part 451, that is, each tip edge 61a of front and rear tip end parts 611 (611F and 611B), the recessed groove 61d joining edges 61e and 61f opposed in the right and left direction is arranged at a center 61ac in the right and left direction. For the reason, even if the protrusion section part 451 is expanded by the recessed groove 61d and the edges 50 and 53 on right and left base sides of sheet-shaped parts 471 (471F and 471B) is similar to those in the bag material 40, edges 49 and 50 on right and left tip end sides of the sheet-shaped parts 471 (471F and 471B) are further expanded in the right and left direction than the edges 49 and 50 of the bag material 40, right and left side edges 61b and 61c of the tip end parts 611 (611F and 611B) continued to the parts are also further expanded in the right and left direction than the side edges 61b and 61c of the bag material 40, and these parts have a shape different from the bag material 40.

Figure 25:
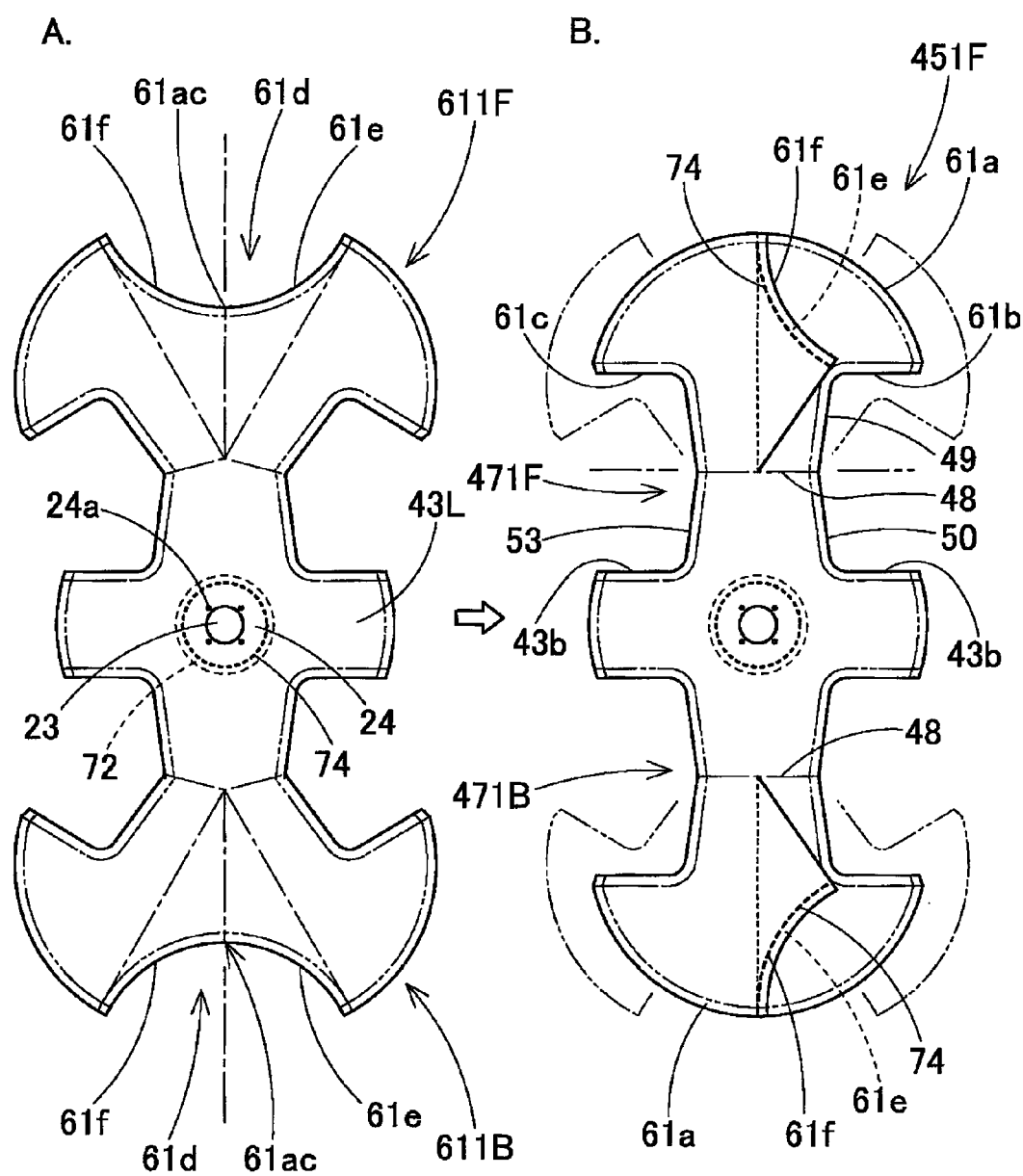
FIG. 25 is a view illustrating a step of manufacturing the steering wheel side portion in the airbag according to the third embodiment.

In the bag material 401, in a case where opposite edges 61e and 61f opposed in the right and left direction of the recessed grooves 61d of the tip end parts 611 (611F and 611B) are sewn to each other, as shown in Sections A and B of FIG. 25, parts of the tip edges 61a extending from the recessed grooves 61d of the tip end parts 611 (611F and 611B) before sewing to the right and left side have the same arc shape as the tip edge 61a of the tip end part 61 of the bag material 40, and form the driver side joining portion sewn to the outer peripheral edge 32a (70a) of the driver side portion 32 (bag material 70), together with the tip edge 43a of the general section parts 43 (43L and 43R).

Figure 22:
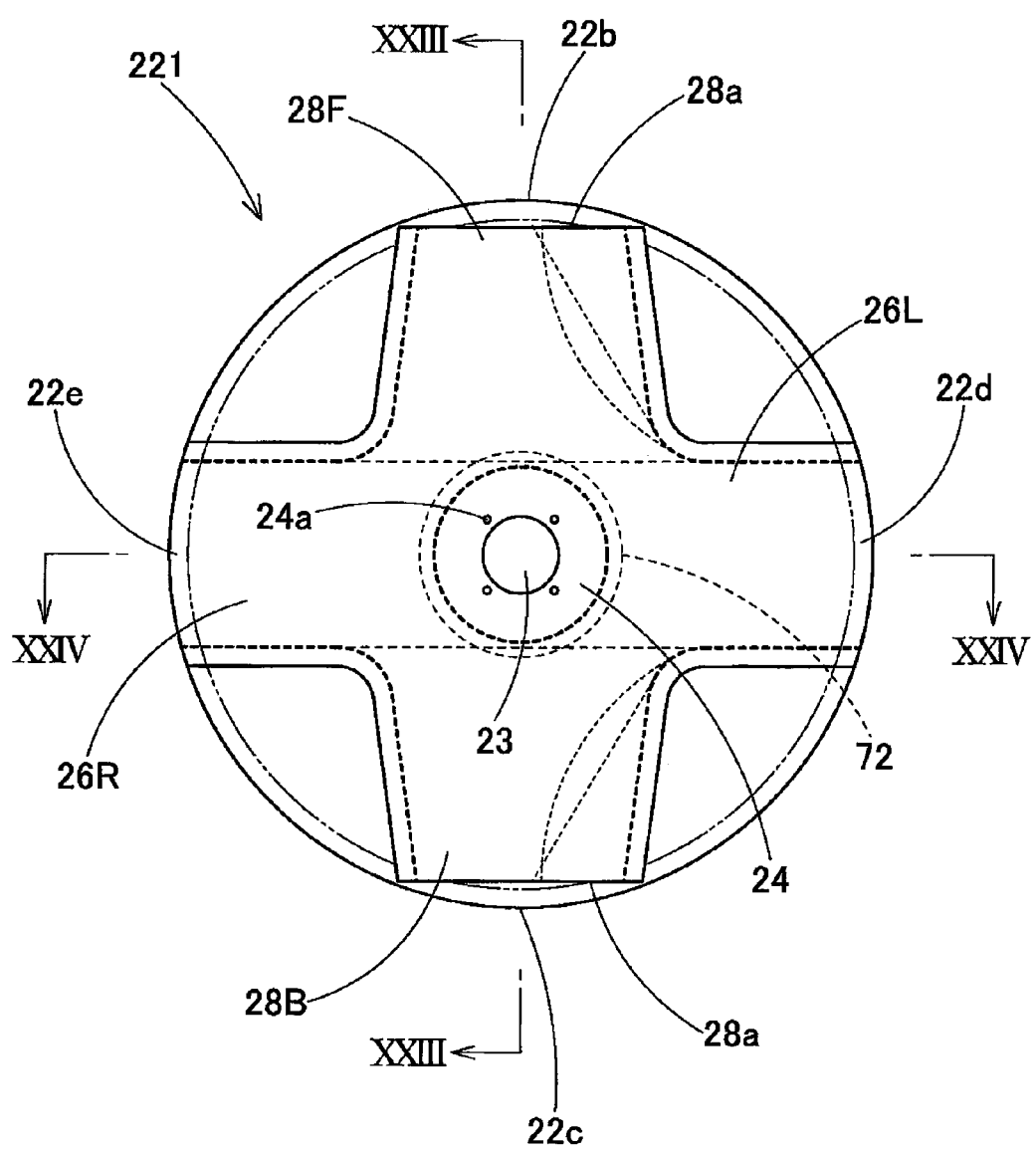
FIG. 22 is a plan view illustrating a state where a steering wheel side portion of the airbag according to the third embodiment is manufactured.
Figure 23:
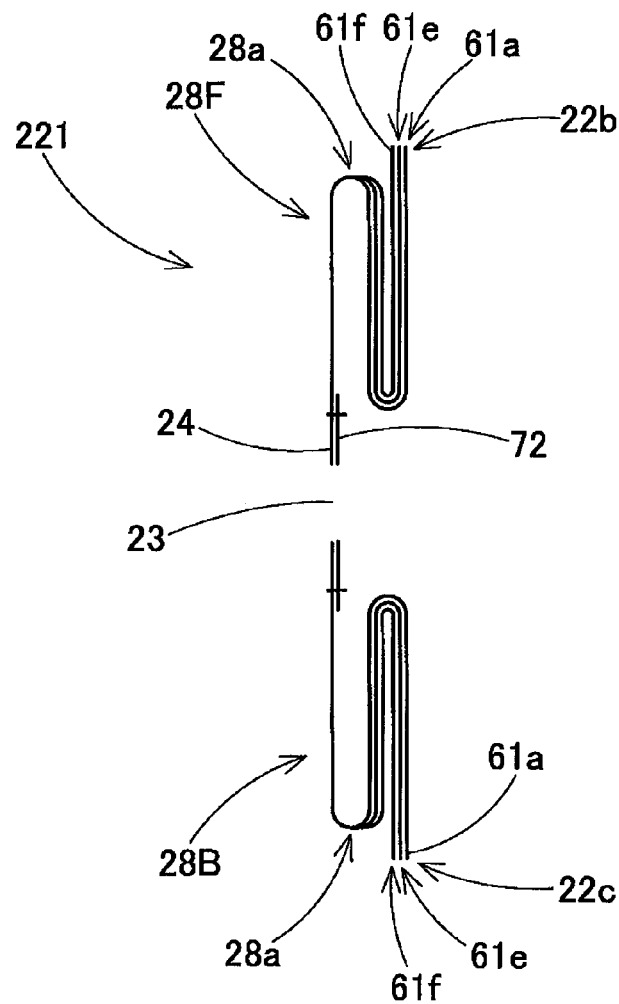
FIG. 23 is a schematic end view of a XXIII-XXIII part in FIG. 22.
Figure 24:
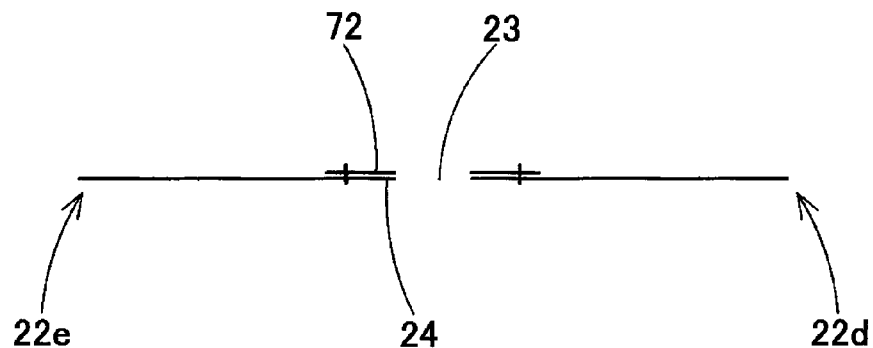
FIG. 24 is a schematic end view of a XXIV-XXIV part in FIG. 22.
Figure 26:
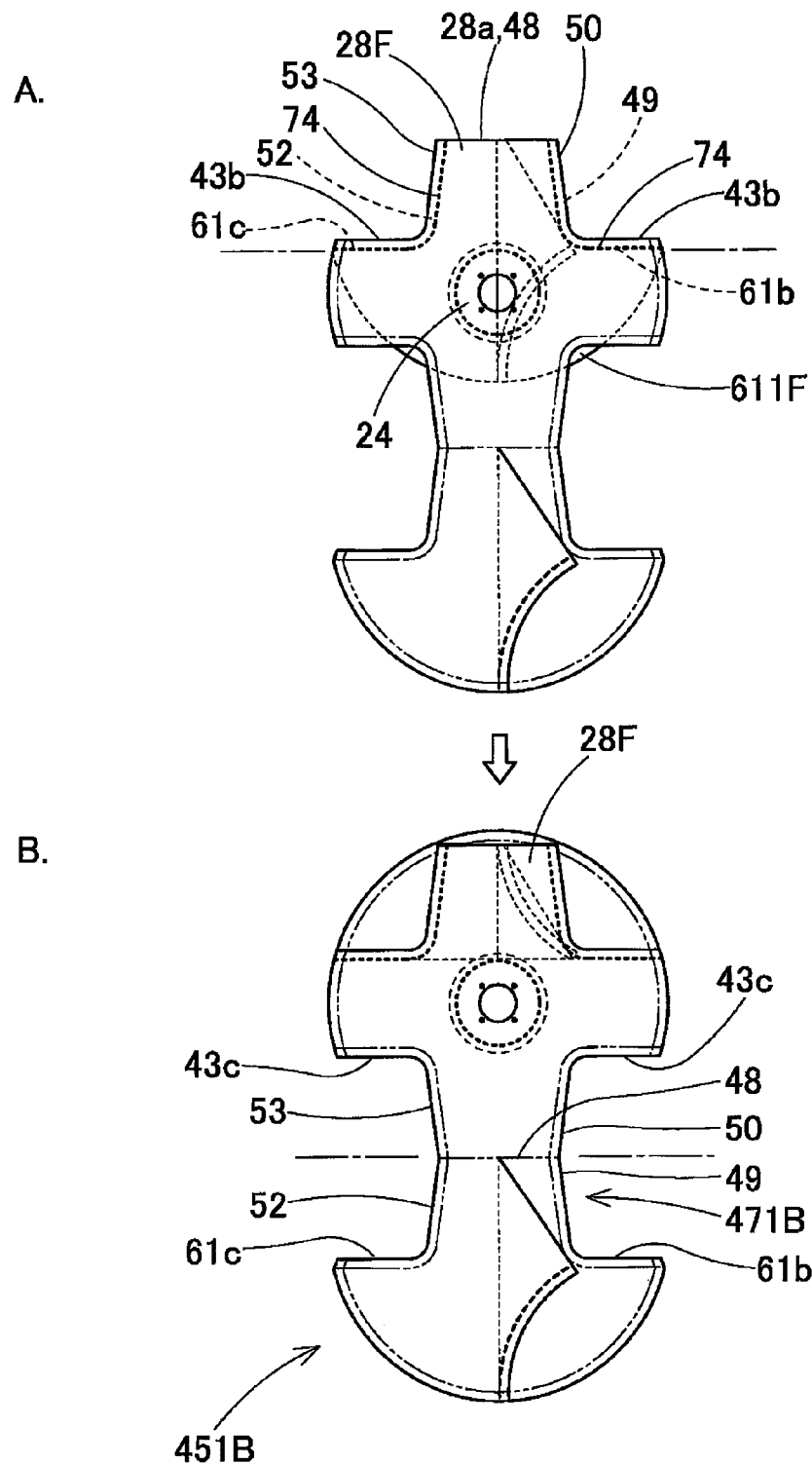
FIG. 26 is a view illustrating a step after Section B of FIG. 25 in the step of manufacturing the steering wheel side portion according to the third embodiment.
Figure 27:
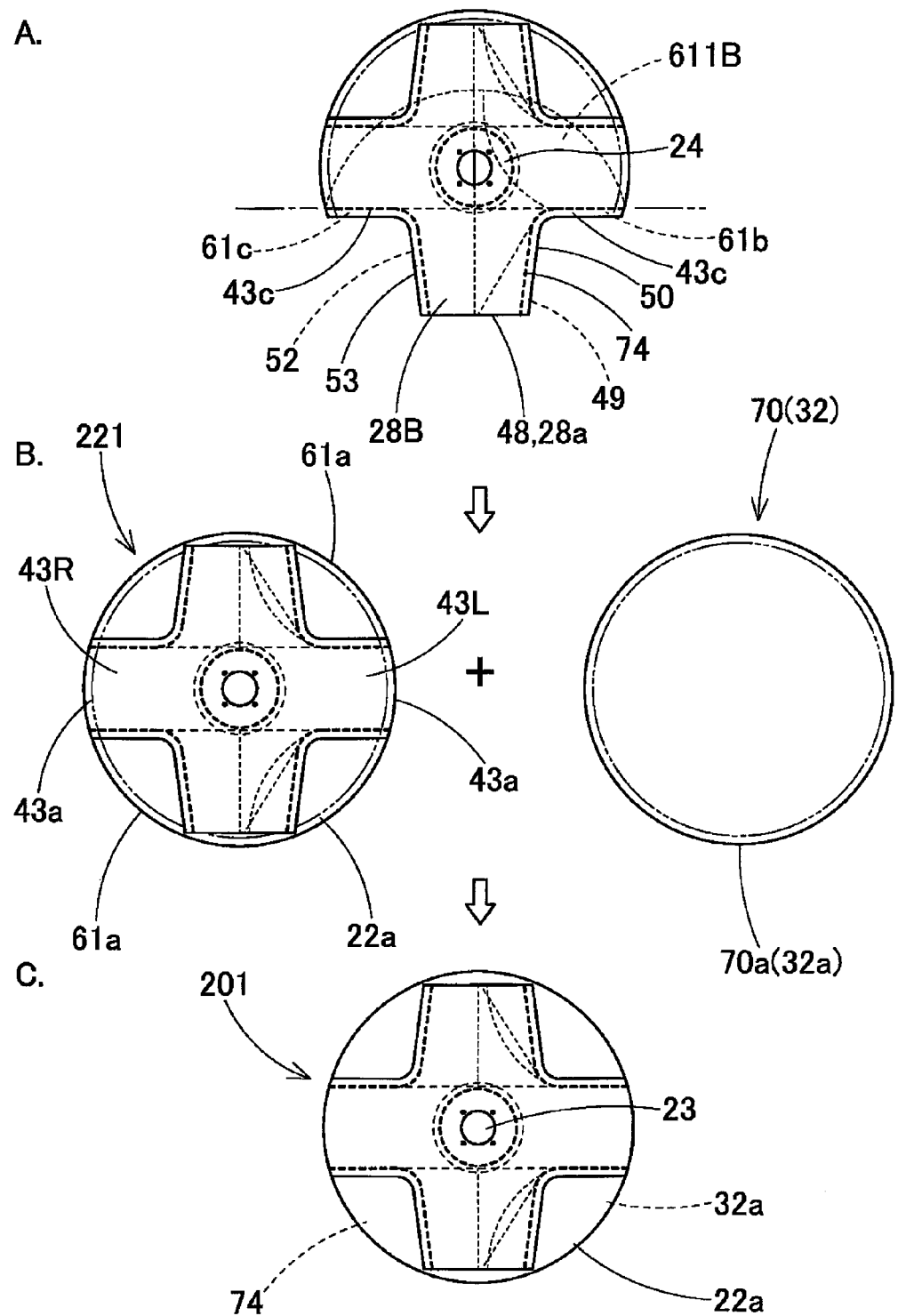
FIG. 27 is a view illustrating a step after Section B of FIG. 26 in the step of manufacturing the steering wheel side portion according to the third embodiment, and a step of manufacturing the airbag.

That is, in such a bag material 401, the opposite edges 61e and 61f opposed in the right and left direction of the recessed grooves 61d of the tip end parts 611 (611F and 611B) are sewn to each other, and in a case of being flatly deployed, the bag material 401 has the same planar shape as the bag material 40. For the reason, in the subsequent steps, similar to the steps shown in Sections A and B of FIG. 8, as shown in Section B of FIG. 25 and Section A of FIG. 26, in a case where the folding section 48 of the support inflation portion 28F in the bag material 401 is folded so as to overlap the tip end part 611F of the protrusion section part 451F with the attaching seat 24, the edges 61b and 43b of the tip end part 611F and the general section part 43L, the edges 49 and 50 of the sheet-shaped part 471F, the edges 61c and 43b of the tip end part 611F and the general section part 43R, and the edges 52 and 53 of the sheet-shaped part 471F are overlapped with each other at the same time, and thus parts thereof are set on a workbench of a predetermined industrial sewing machine, and are sewn by planar sewing. Then, as shown in Section B of FIGS. 26 and Section A of FIG. 27, in a case where the folding section 48 of the support inflation portion 28B in the bag material 401 is folded so as to overlap the tip end part 611B of the protrusion section part 451B with the attaching seat 24, the edges 61b and 43c of the tip end part 611B and the general section part 43L, the edges 49 and 50 of the sheet-shaped part 471B, the edges 61c and 43c of the tip end part 611B and the general section part 43R, and the edges 52 and 53 of the sheet-shaped part 471B are overlapped with each other at the same time, and thus parts thereof are set on a workbench of a predetermined industrial sewing machine and the steering wheel side portion 221 shown in FIGS. 22 to 24 is easily formed by planar sewing. Thereafter, similar to the first embodiment, as shown in Sections B and C of FIG. 27, the steering wheel side portion 221 is overlapped with the driver side portion 32, the outer peripheral edges 22a and 32a are sewn to each other, and inverting is performed, whereby the airbag 201 may be manufactured.

Then, similar to the airbag 20 according to the first embodiment, the airbag may be assembled to the airbag device M and mounted on the steering wheel W.

In the airbag 201 according to the third embodiment, in a state of being mounted on a vehicle, after inflation is completed as shown in Section A of FIG. 28, the driver D is received as shown in Section B of FIG. 28 and even if the driver side portion 32 is inclined forward (inclined so that the front edge 32b is deflated downward), the support inflation portion 28F on the front side pressure-welds the support surface portion 29F on the rear surface 28cb side and particularly the base portion 28b side to the front surface Bf including the opened door portion 16a, and is supported by the central portion B, and thus inclination of the driver side portion 32 is prevented and the airbag 201 can accurately receive the driver D by the driver side portion 32 disposed so as to face the driver D. Alternately, the driver D is received as shown in Section C of FIG. 28, and even if the driver side portion 32 is inclined backward (inclined so that the rear edge 32c is deflated downward), the support inflation portion 28B on the rear side pressure-welds the support surface portion 29B on the front surface 28cf side and particularly the base portion 28b side to the rear surface Bb including the opened door portion 16a, and is supported by the central portion B, and thus inclination of the driver side portion 32 is prevented and the airbag 201 can accurately receive the driver by the driver side portion 32 disposed so as to face the driver D.

In particular, in the airbag 201 according to the third embodiment, at the time of completion of inflation, in a case where the recessed grooves are joined so as to be closed, the support inflation portions 28F and 28B can protrude from the front and rear edges 22b and 22c of the steering wheel side portion 221, the support inflation portions 28F and 28B having a large volume can be formed, and great counterforce can be secured by using the support inflation portions 28F and 28B having a large volume abutted to and supported by the front surface Bf or the rear surface Bb of the steering wheel W. Therefore, even if a driver having great kinetic energy moves to the front edge 32b side and the rear edge 32c side of the airbag 201, the driver side portion 32 of the airbag 201 can accurately receive a driver by facing a driver without inclining.

Also in the airbag 201, at the time of receiving the driver D after inflation completion, even if the sides of the right and left edges 32d and 32e of the driver side portion 32 (see FIG. 20 and Sections A, B and C of FIG. 28) is deflated downward, instead of the support inflation portions 28 (28B and 28F), the general sections 26L and 26R extending from the attaching seat 24 of the steering wheel side portion 221 to the right and left sides are abutted to and supported by the upper surface Wu side of the coupling portions SFL, SFR, SBL, and SBR in the vicinity of the operating grip portions HL and HR of the steering wheel W or the upper surface Wu side of the operating grip portions HL and HR, inclination of the driver side portion 32 is prevented, and the airbag 201 can accurately receive the driver D by the driver side portion 32 disposed so as to face the driver D.

In the airbag 201 according to the third embodiment, both of the front and rear support inflation portions 28F and 28B have a large volume, but only one of the front and rear support inflation portions 28F and 28B may have a large volume and the other may be used as the support inflation portion 28 of the airbag 20 according to the first embodiment or the support inflation portion 28 provided together with the second support inflation portion 30 as the airbag 200 according to the second embodiment.

Figure 29:
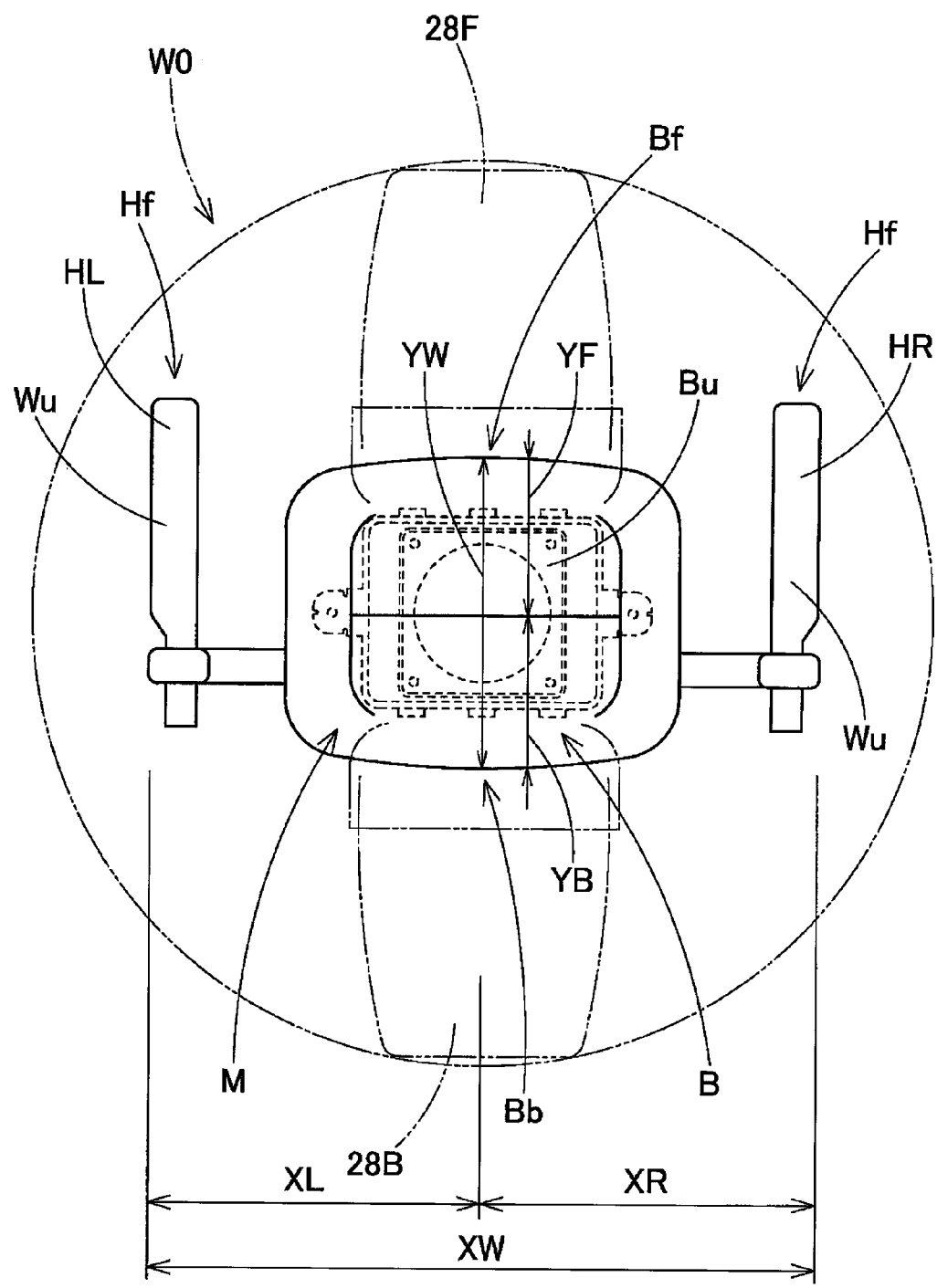
FIG. 29 is a plan view illustrating a steering wheel having a shape different from the embodiments.
Figure 30:
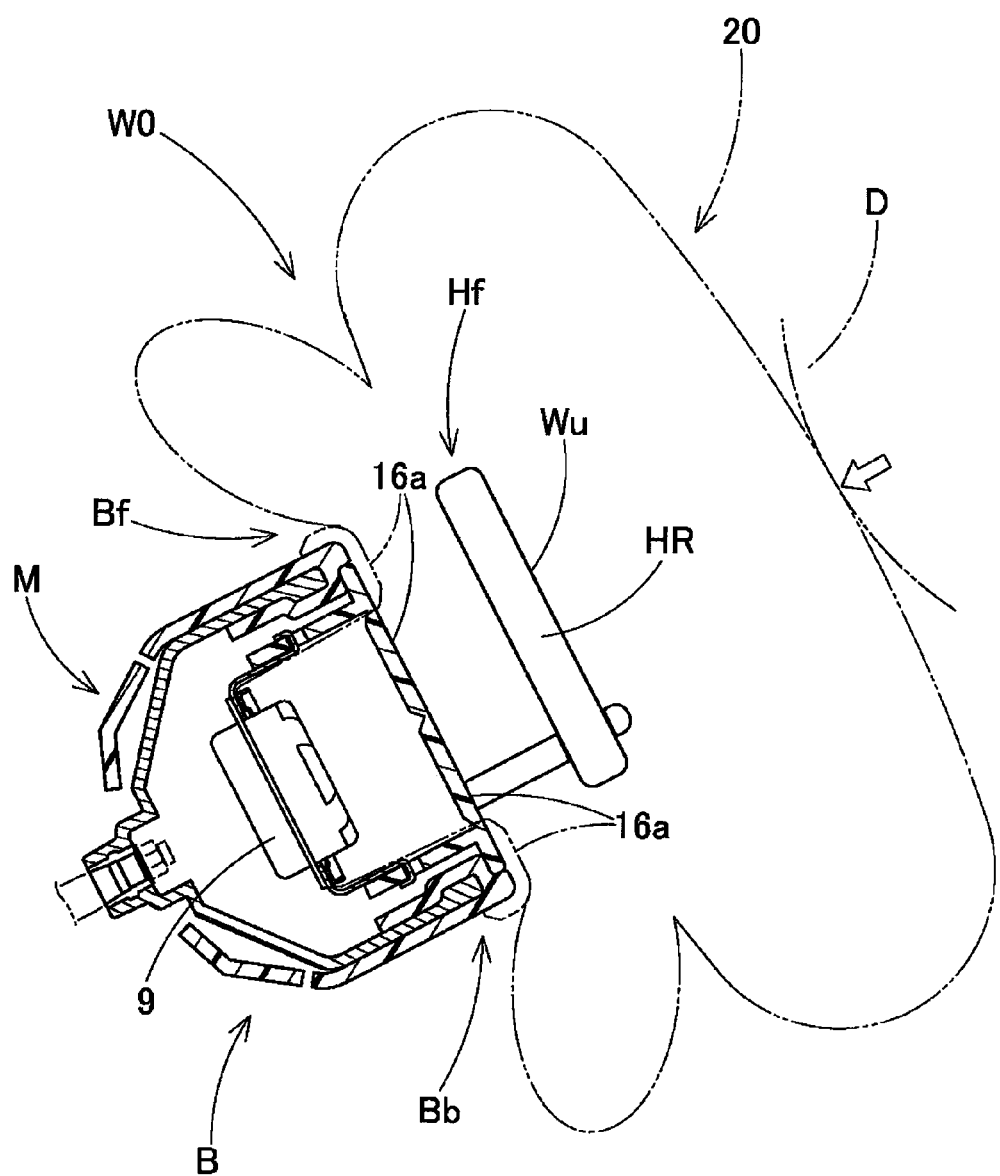
Figure 31:
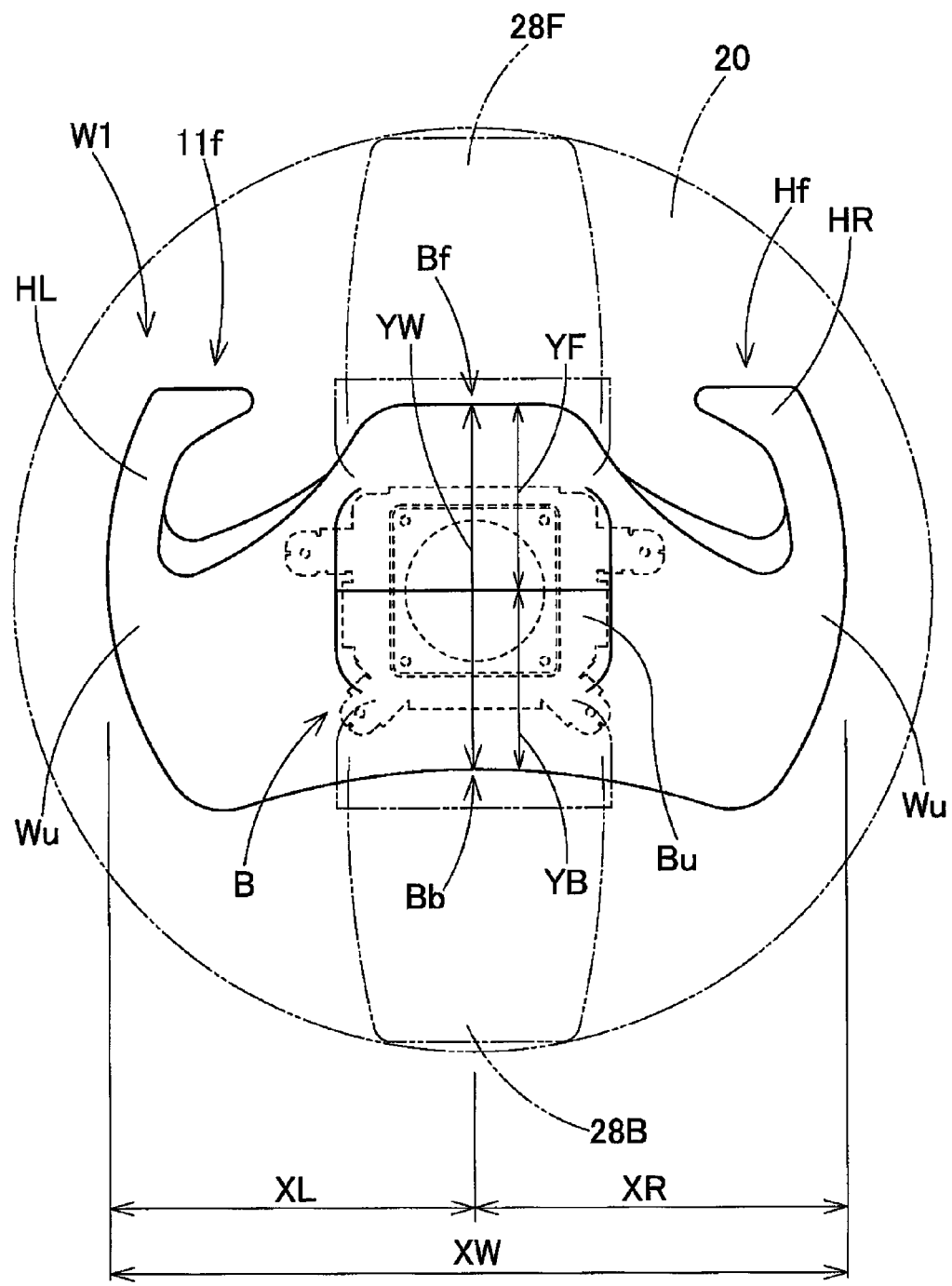
FIG. 31 is a plan view illustrating a steering wheel having another different shape.

In a case where the deformed steering wheel mounted on the airbag has a shape in which the length dimension YF toward at least the front portion BF side of both of front and rear sides is shorter than the length dimensions XL and XR toward both of right and left sides, as a length dimension from the central portion B, that is, a shape in which the operating grip portions H (L and R) are provided on both of right and left sides, the length dimension YF is reduced, and the front and rear width dimension YW is shorter than the right and left width dimension XW from the central portion B, in addition to the steering wheel shown in FIGS. 1 and 2, one of the forward and backward direction of the operating grip portion, for example, the front end HF may be used as a free end as the deformed steering wheel W0 shown in FIGS. 29 and 30 or the deformed steering wheel W1 shown in FIG. 31, and the central portion B may be disposed so as to be significantly shifted further downward than the operating grip portion H as the deformed steering wheel W0.

Figure 32:
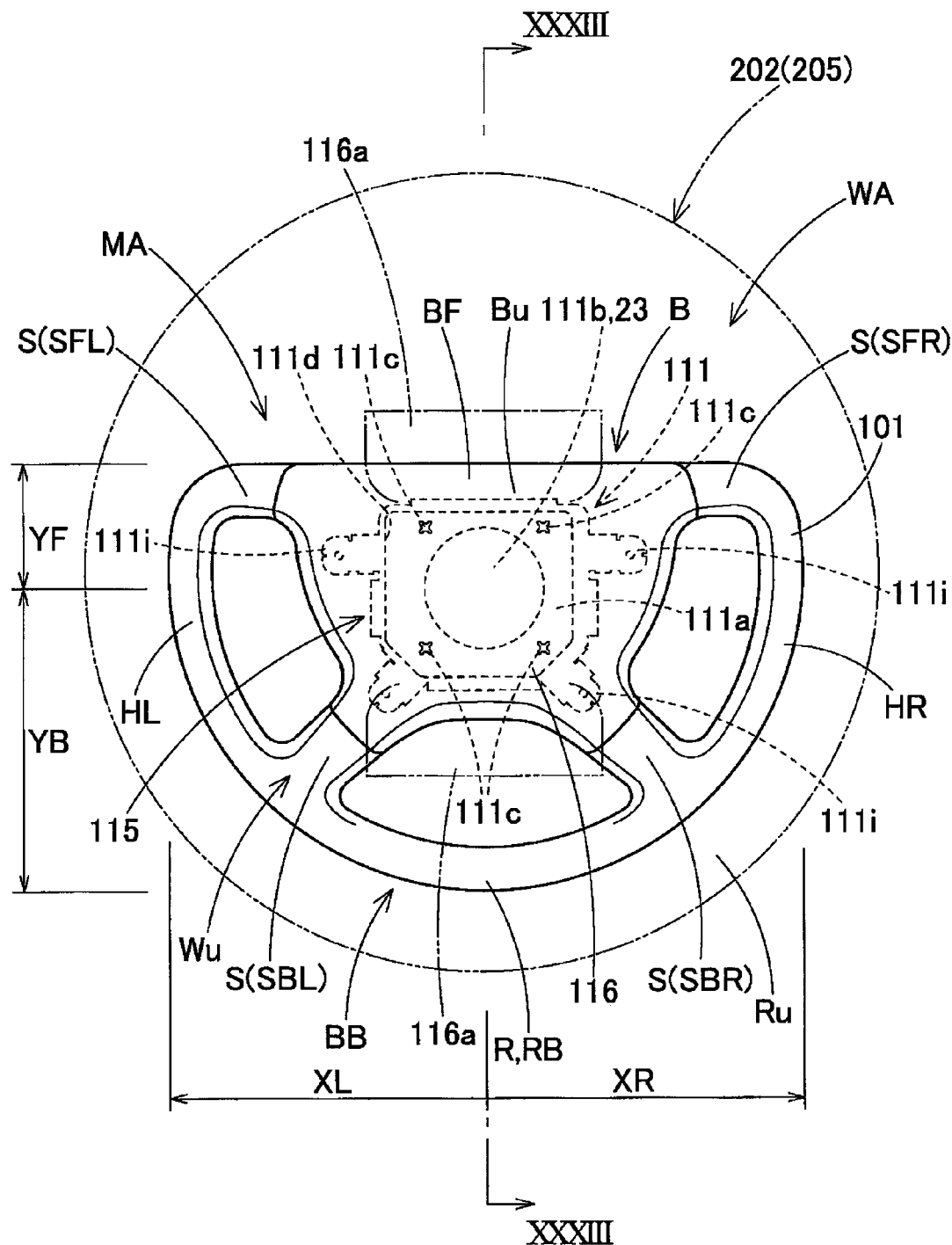
FIG. 32 is a schematic plan view illustrating a use state of a driver seat airbag device according to a fourth embodiment which uses a driver seat airbag.
Figure 33:
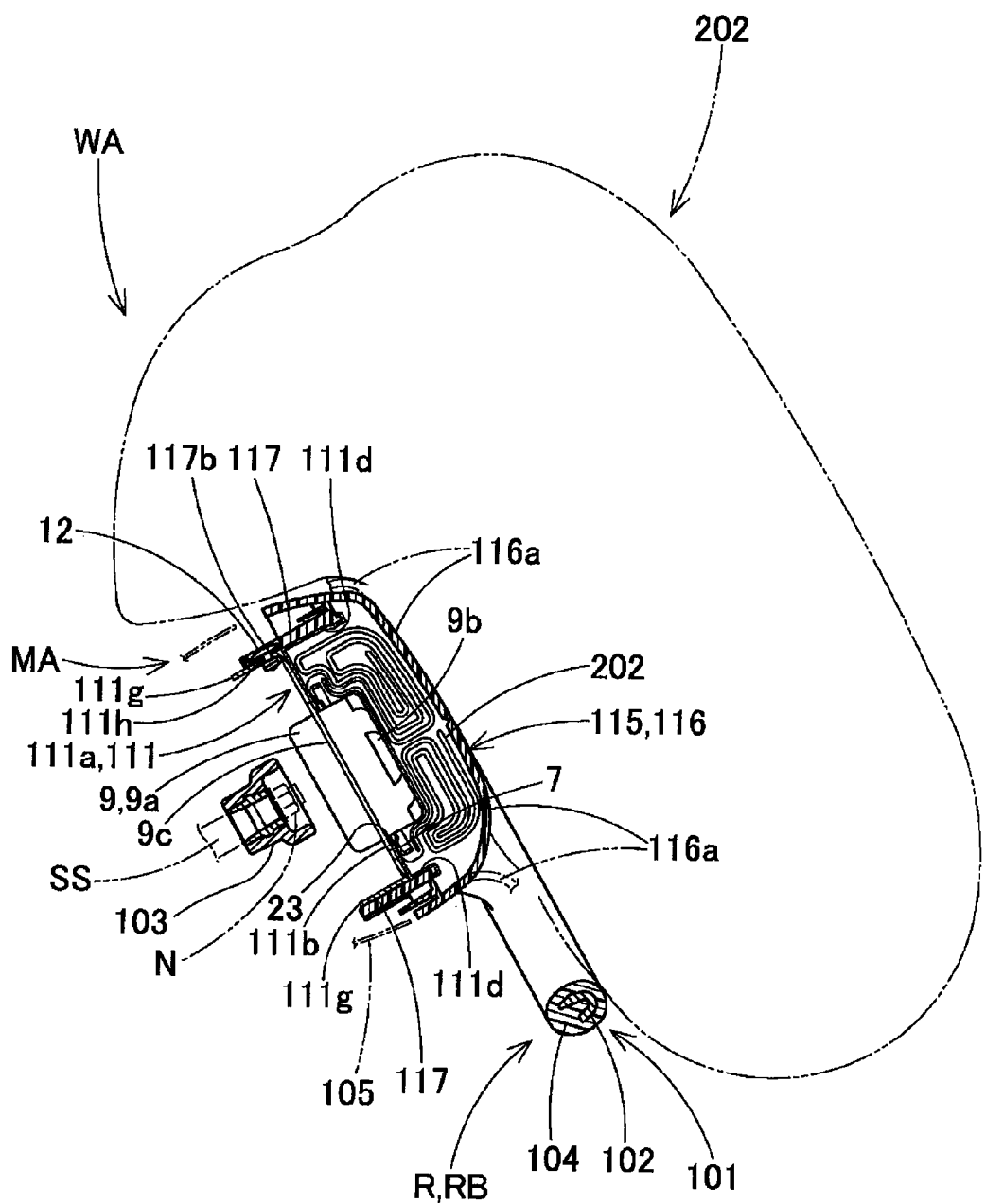
FIG. 33 is a schematic longitudinal sectional view of the driver seat airbag device according to the fourth embodiment, and corresponds to a XXXIII-XXXIII part in FIG. 32.
Figure 34:
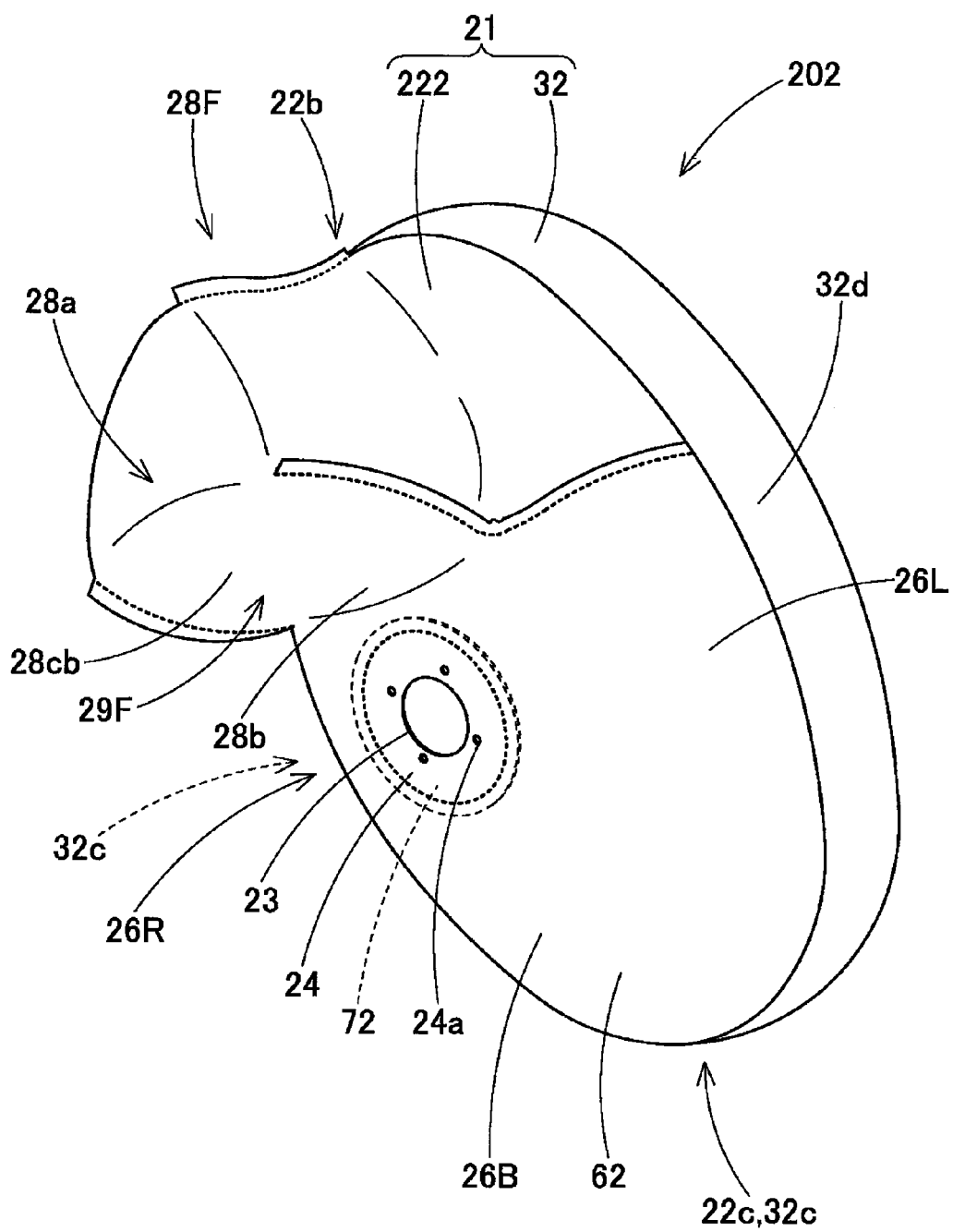
FIG. 34 is a schematic perspective view of an airbag according to the fourth embodiment at the time of inflation.
Figure 35:
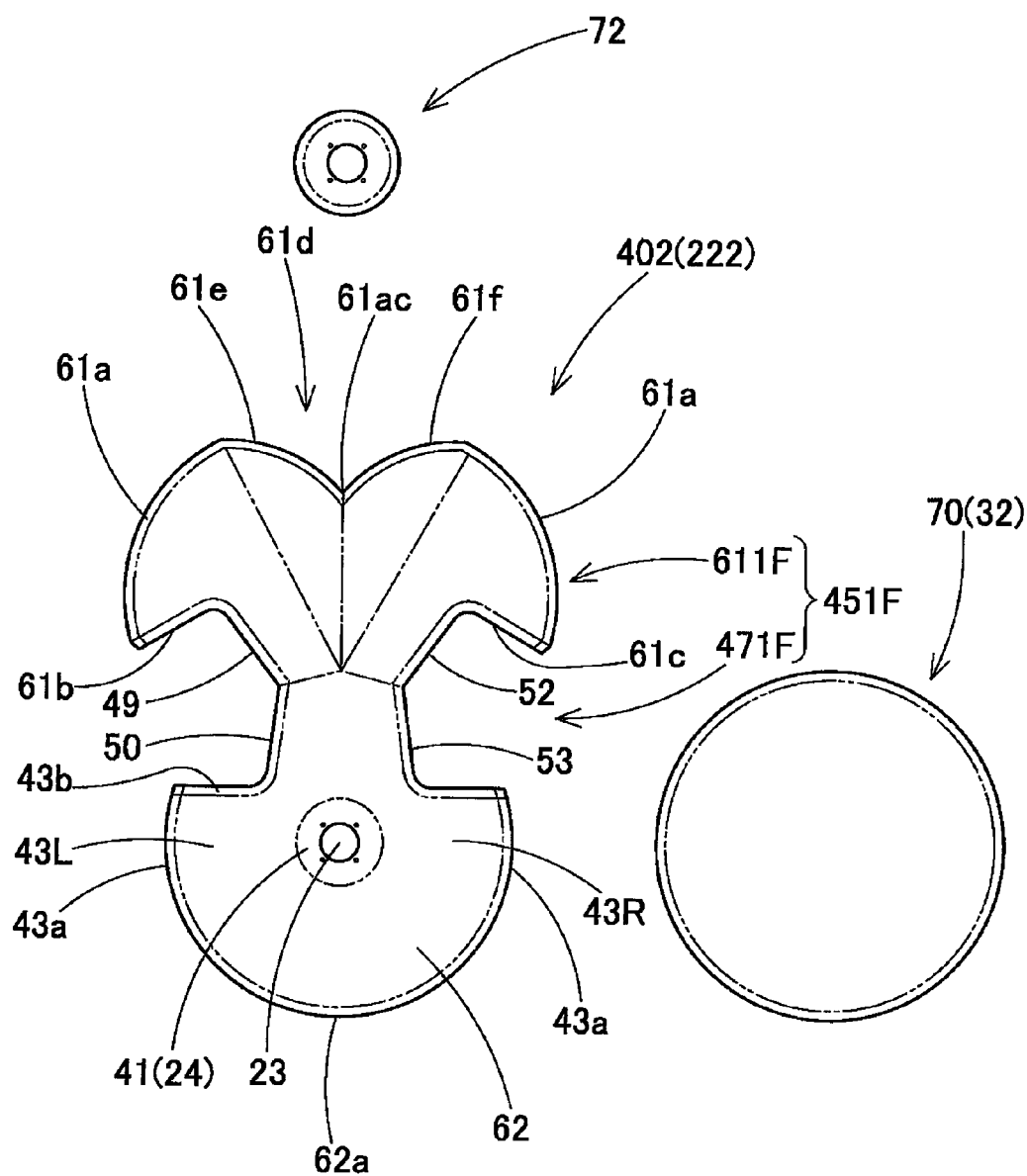
FIG. 35 is a plan view of a bag material for manufacturing the airbag according to the fourth embodiment.
Figure 36:
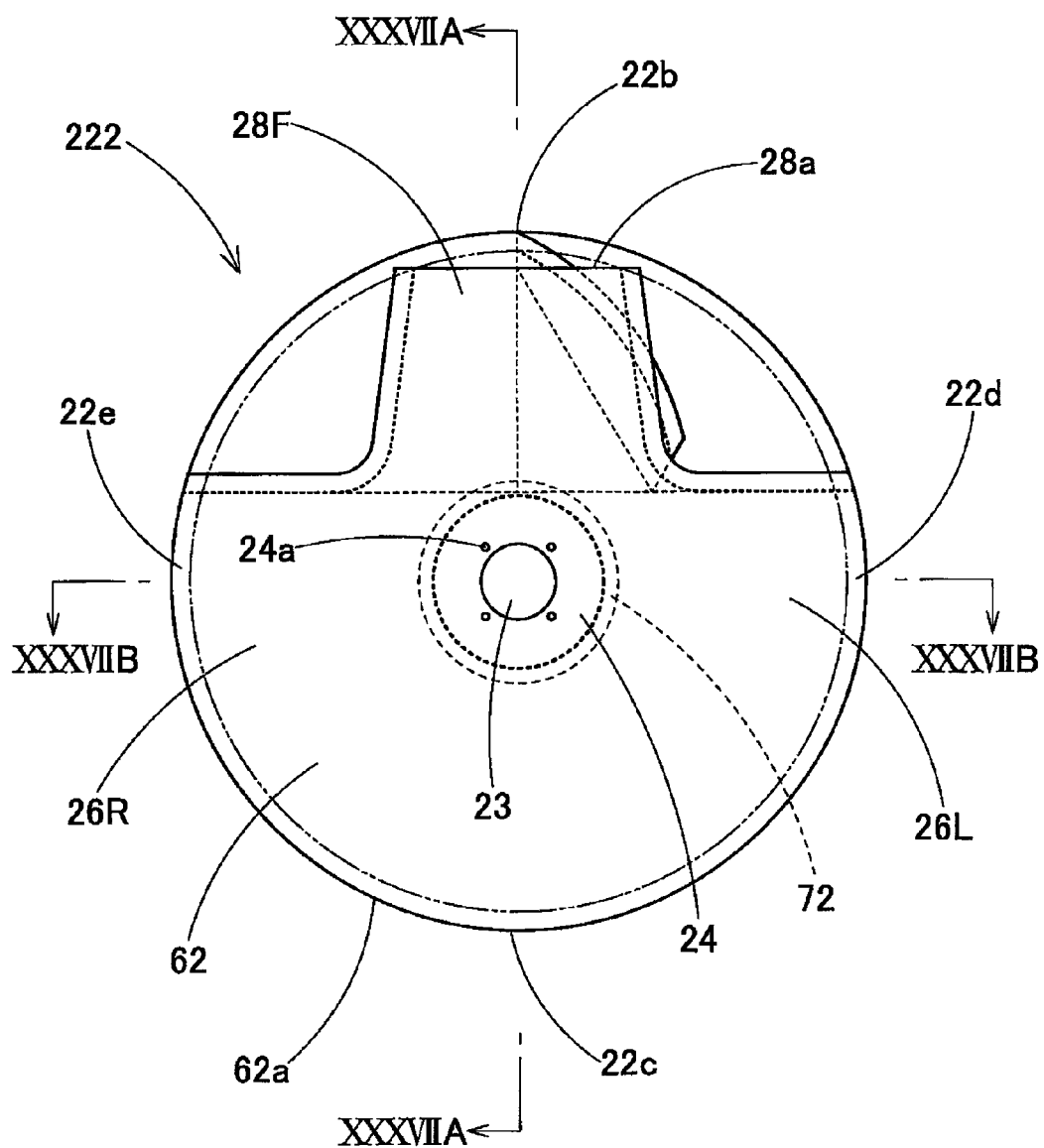
FIG. 36 is a plan view illustrating a state where a steering wheel side portion of the airbag according to the fourth embodiment is manufactured.
Figure 37A:
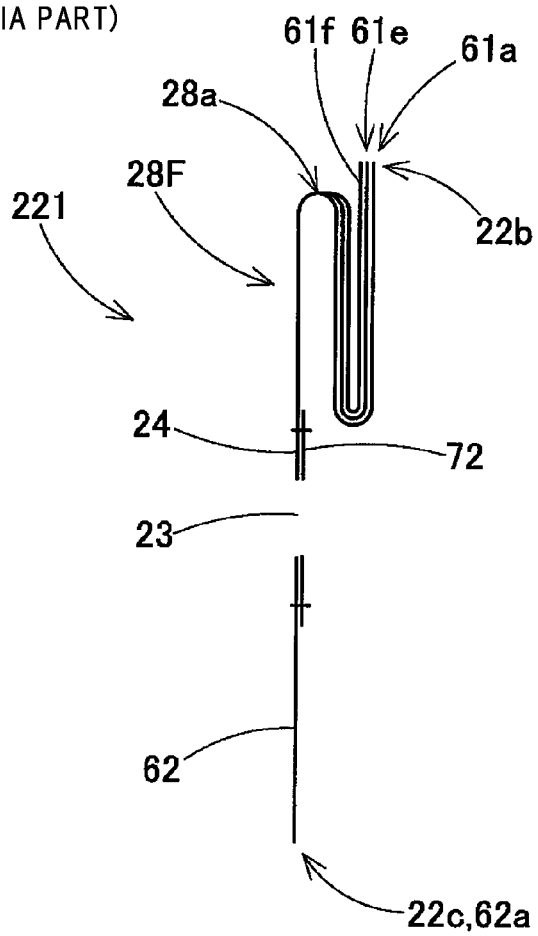
FIGS. 37A and 37B are schematic end views of a XXXVIIA-XXXVIIA part and a XXXVIIB-XXXVIIB part in FIG. 36.
Figure 37B:
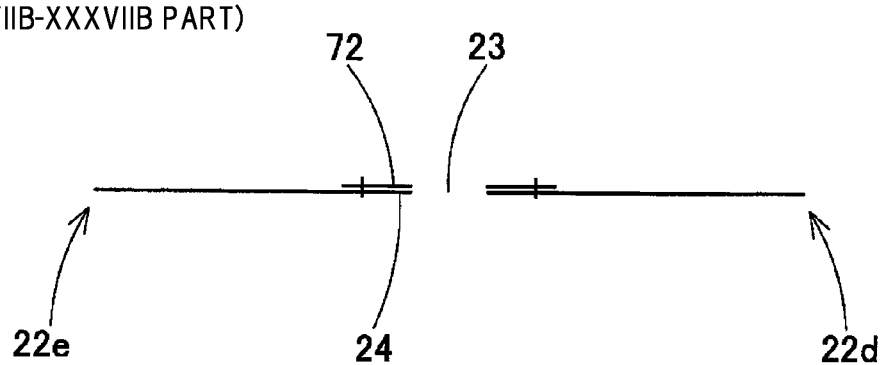

In the airbags 20, 200, and 201 according to the first, second, and third embodiments, the support inflation portions 28F and 28B are provided on both of front and rear sides, but as an airbag 202 according to a fourth embodiment shown in FIGS. 32 to 34, only the front support inflation portion 28F may be provided.

A steering wheel WA on which an airbag device MA using the airbag 202 is mounted is a deformed steering wheel having a shape in which the operating grip portions HL and HR are provided on both of right and left sides, and the length dimension YF toward the front portion BF side from the central portion B is shorter than the length dimensions XL and XR toward both of right and left sides from the central portion B. In other words, the shape is a shape in which a part of a ring portion R is not arranged on the front portion BF side of the central portion B of the steering wheel WA, and the rear portion RB of the ring portion R is arranged on the rear portion BB side of the central portion B together with the right and left grip portions HL and HR. The central portion B and the ring portion R are coupled by four spoke portions (coupling portions) S (SFL, SFR, SBL, and SBR). The boss 3 coupled to the steering shaft SS which is a rotation center at the time of operation is arranged in a lower part of the central portion B. The steering wheel WA is constituted of a steering wheel main body 101 and the airbag device MA.

To secure rigidity in the central portion B, the spoke portion S, and the ring portion R, the steering wheel main body 101 is provided with a core 102 formed of metallic materials such as a steel material, and the boss 3 is arranged on a lower part side at a center of the core 102. A coated layer 104 made of synthetic resin is appropriately arranged around the core 102. A lower surface side of the central portion B is covered with a lower cover 105 made of synthetic resin.

As shown in FIGS. 32 to 34, the driver seat airbag device MA includes the airbag 202 folded and stored, the inflator 9 supplying inflation gas to the airbag 202, an airbag cover 115 covering above the folded airbag 202, a case 111 storing and holding the airbag 202 and the inflator 9 and holding the airbag cover 115, and the retainer 7 for attaching the inflator 9 and the airbag 202 to the case 111.

The inflator 9 and the retainer 7 have the same configuration as the first embodiment. That is, the retainer 7 is made of square annular sheet metal, presses a peripheral edge of an inflow opening 23 of the airbag 202, and has bolts (not shown) fastened with nuts to the case 111 at four corners so that the airbag 202 is attached to the case 111 and the inflator 9 is attached to the case 111. The inflator 9 includes the columnar main body portion 9a having the plurality of gas discharge ports 9b on an upper portion, and the flange portion 9c protruding from an outer peripheral surface of the main body portion 9a. The through-hole (not shown) for passing through each bolt (not shown) of the retainer 7 is formed in the flange portion 9c.

The case 111 is made of approximately rectangular parallelepiped sheet metal, is disposed on the upper portion side of the central portion B of the steering wheel WA, constitutes a storage part storing the folded airbag 202, and includes a rectangular bottom wall portion 111a and a square cylindrical side wall portion 111d extending upward from an outer peripheral edge of the bottom wall portion 111a. An insertion hole 111b in which the main body portion 9a of the inflator 9 can be inserted from a lower side and which opens in a circular shape is formed in the bottom wall portion 111a, and the four through-holes 111c (see FIG. 32) for passing through bolts (not shown) of the retainer 7 are formed in the periphery thereof. A tongue-piece portion 111g extending downward is formed in front and rear opposite parts of the side wall portion 111d, and a plurality of through-holes 111h for passing through rivets 12 for fixing a side wall portion 117 of the airbag cover 115 to the side wall portion 111*d* are provided in the tongue-piece portion 111*g*. To arrange and fix the airbag device MA onto the upper portion of the central portion B, a bracket portion 111*i* coupled and fixed to the core 102 by bolt fastening or the like is arranged at an upper end of the side wall portion 111*d* of the case 111.

The airbag cover 115 is made of synthetic resin, and includes a ceiling wall portion 116 covering above the stored airbag 202, and the approximately square cylindrical side wall portion 117 extending downward from the vicinity of an outer peripheral edge of the ceiling wall portion 116. Two sheets of door portions 116*a* and 116*a* which are pushed by the inflating airbag 202 and open to both of front and rear sides are formed in the ceiling wall portion 116. A through-hole 117*b* for inserting the rivet 12 is formed in the side wall portion 117.

Similar to the airbags 20 and 201 according to the first and third embodiments, the airbag 202 according to the fourth embodiment includes the front support inflation portion 28F which protrudes toward the front side of the central portion B of the steering wheel WA and is abutted to and supported by the front surface Bf side of the central portion B, but only difference from the airbags 20 and 201 according to the first and third embodiments is that the rear support inflation portions 28B is not provided, and other configurations are the same as the airbags 20 and 201. In particular, in the airbag 202 according to the fourth embodiment, the front support inflation portion 28F has a large volume, similar to the front support inflation portion 28F of the airbag 201 according to the third embodiment.

That is, as shown in FIGS. 35 to 37B, as the bag material constituting the airbag 202, the bag material 70 forming the driver side portion 32 is the same as the first and third embodiments, and a bag material 402 forming the steering wheel side portion 222 does not include the protrusion section part 451B on the rear portion side in the bag material 401 according to the third embodiment and includes only the protrusion section part 451F on the front portion side. Specifically, in the bag material 402, the general section parts 43 (43L and 43R) are arranged on both of right and left sides of the attaching seat part 41, the protrusion section part 451F is arranged on the front side of the attaching seat part 41, and an approximately semi-disc rear side portion 62 obtained by joining the right and left general section parts 43L and 43R according to the third embodiment and the tip end part 611B is arranged on the rear side of the attaching seat part 41. The bag material 402 according to the fourth embodiment is slightly different from the bag material 401 according to the third embodiment in terms of the opposite edges 61*e* and 61*f* in that the opposite edges 61*e* and 61*f* of the recessed groove 61*d* in the center 61*ac* of the tip edge 61*a* of the tip end part 611F are formed so as to swell forward, and the same reference numerals are applied to parts which are the same as other parts of the bag material 401 according to the third embodiment.

Figure 38:
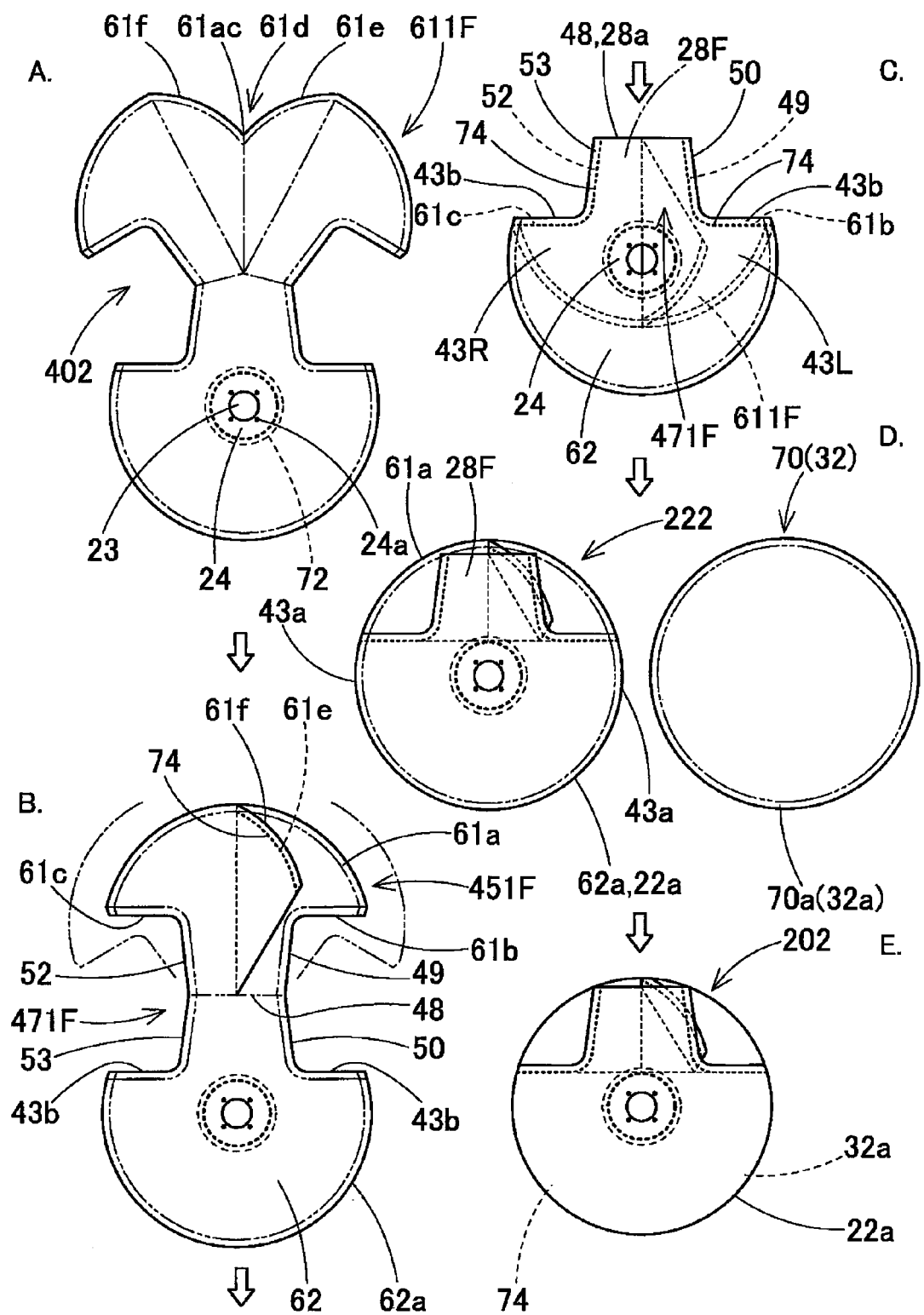
FIG. 38 is a view illustrating a step of manufacturing the airbag according to the fourth embodiment.

In manufacturing of the airbag 202, the opposite edges 61*e* and 61*f* opposed in the right and left direction of the recessed groove 61*d* of the tip end part 611F are sewn to each other as shown in Sections A and B of FIG. 38, and after being flatly deployed, as shown in Section C of FIG. 38, in a case where the folding section 48 of the support inflation portion 28F in the bag material 402 is folded so as to overlap the tip end part 611F of the protrusion section part 451F with the attaching seat 24, the edges 61*b* and 43*b* of the tip end part 611F and the general section part 43L, the edges 49 and 50 of the sheet-shaped part 471F, the edges 61*c* and 43*b* of the tip end part 611F and the general section part 43R, and the edges 52 and 53 of the sheet-shaped part 471F are overlapped with each other at the same time, and thus parts thereof are set on a workbench of a predetermined industrial sewing machine and the steering wheel side portion 222 is easily formed by planar sewing. Thereafter, the steering wheel side portion 222 is overlapped with the driver side portion 32, the outer peripheral edges 22*a* (driver side joining portions 61*a* and 43*a* and an outer peripheral edge 62*a* of the rear side portion 62) and 32*a* are sewn to each other, and inverting is performed, whereby the airbag 202 can be manufactured.

Similar to the airbag 20 according to the first embodiment, the airbag 202 thus manufactured may be assembled to the airbag device MA and mounted on the steering wheel WA.

Figure 39A:
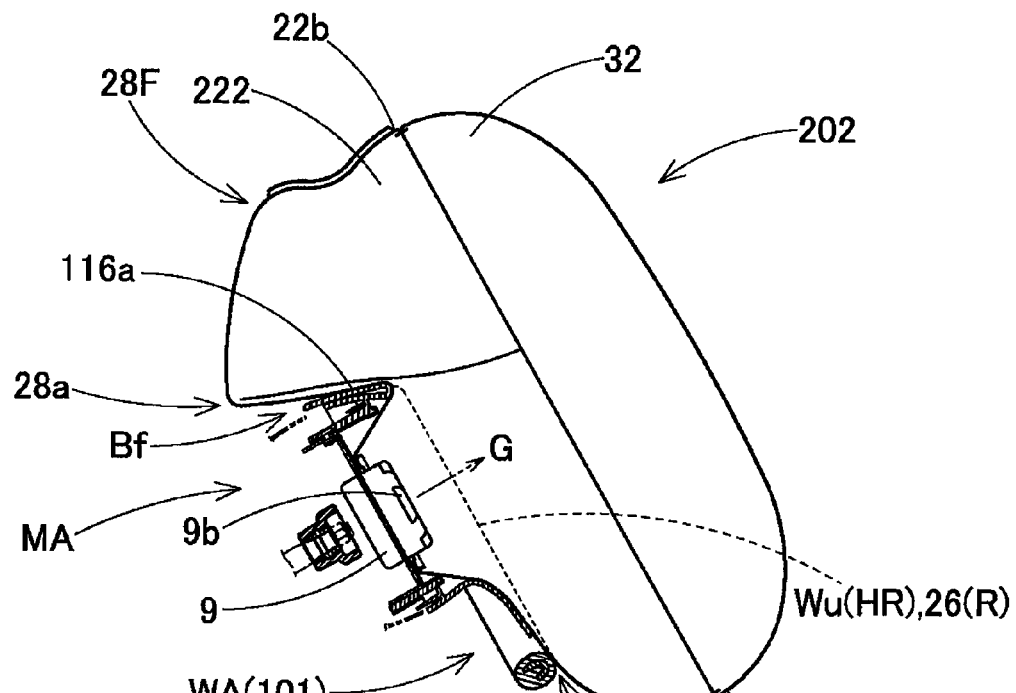
FIGS. 39A and 39B are schematic longitudinal sectional views illustrating the airbag according to the fourth embodiment at the time of receiving a driver after inflation completion.

At the time of operating the driver seat airbag device MA according to the fourth embodiment, in a case where inflation gas G flows into the airbag 202 through the inflow opening 23 and the airbag 202 is inflated, the door portions 116*a* and 116*a* of the airbag cover 115 are pushed to open, and as shown in a two-dot chain line in FIGS. 32 and 33 or FIG. 39A, inflation is completed so that the airbag 202 protrudes from the case 111 as a storage part, covers the upper surface Wu side of the steering wheel WA, and is supported by the upper surface Wu side.

Figure 39B:
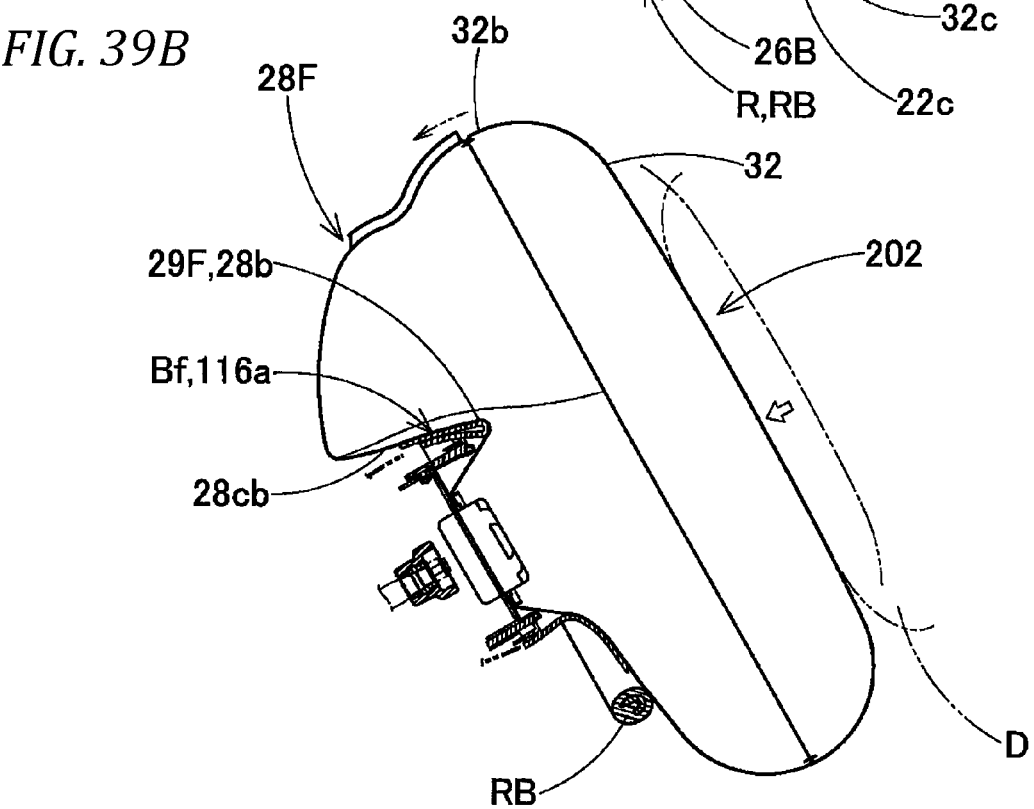

In the driver seat airbag 202 according to the fourth embodiment, when inflation is completed and the driver D is received, the front support inflation portion 28F is disposed on the front side (front surface Bf side) of the central portion B of the steering wheel WA, and thus as shown in FIG. 39B, even if the front edge 32*b* side of the driver side portion 32 is inclined so as to be deflated downward, the front support inflation portion 28F allows the support surface portion 29F to be abutted to the front surface Bf side of the central portion B of the steering wheel (specifically, the base portion 28*b* side of the support surface portion 29F on the rear surface 28*cb* side is pressure-welded to the opened door portion 116*a* or the front surface Bf and is supported by the central portion B), and it is possible to prevent the front edge 32*b* side of the airbag 202 from being deflated downward. For the reason, the airbag 202 can accurately receive the driver D heading for the steering wheel WA by the driver side portion 32 disposed so as to face the driver D without inclining. In a part other than the front edge 32*b* side of the airbag 202, the general sections 26L and 26R extending from the attaching seat 24 of the steering wheel side portion 222 to the right and left sides are abutted to and supported by the upper surface Wu in the vicinity of the operating grip portions HL and HR of the steering wheel WA, and in the rear edge 32*c* side, a general section 26B on the rear side of the attaching seat 24 is abutted to and supported by the upper surface Wu of the rear portion RB of the ring portion R, inclination of the driver side portion 32 is prevented, and the airbag 202 can accurately receive the driver by the driver side portion 32 disposed so as to face the driver D.

Even if the airbag 202 according to the fourth embodiment is mounted on a steering wheel WA having the short length dimension YF from the central portion B toward the front portion BF side, it is possible to stably receive and protect the driver D at the time of completion of inflation.

The front support inflation portion 28F of the airbag 202 according to the fourth embodiment has a shape in which the opposite edges 61*e* and 61*f* of the recessed groove 61*d* are swollen, and an area of a corresponding part of the bag material 402 is wider than an area of a corresponding part of the bag material 401 and slightly wider than the front support inflation portion 28F of the airbag 201 in terms of a volume.

Figure 40:
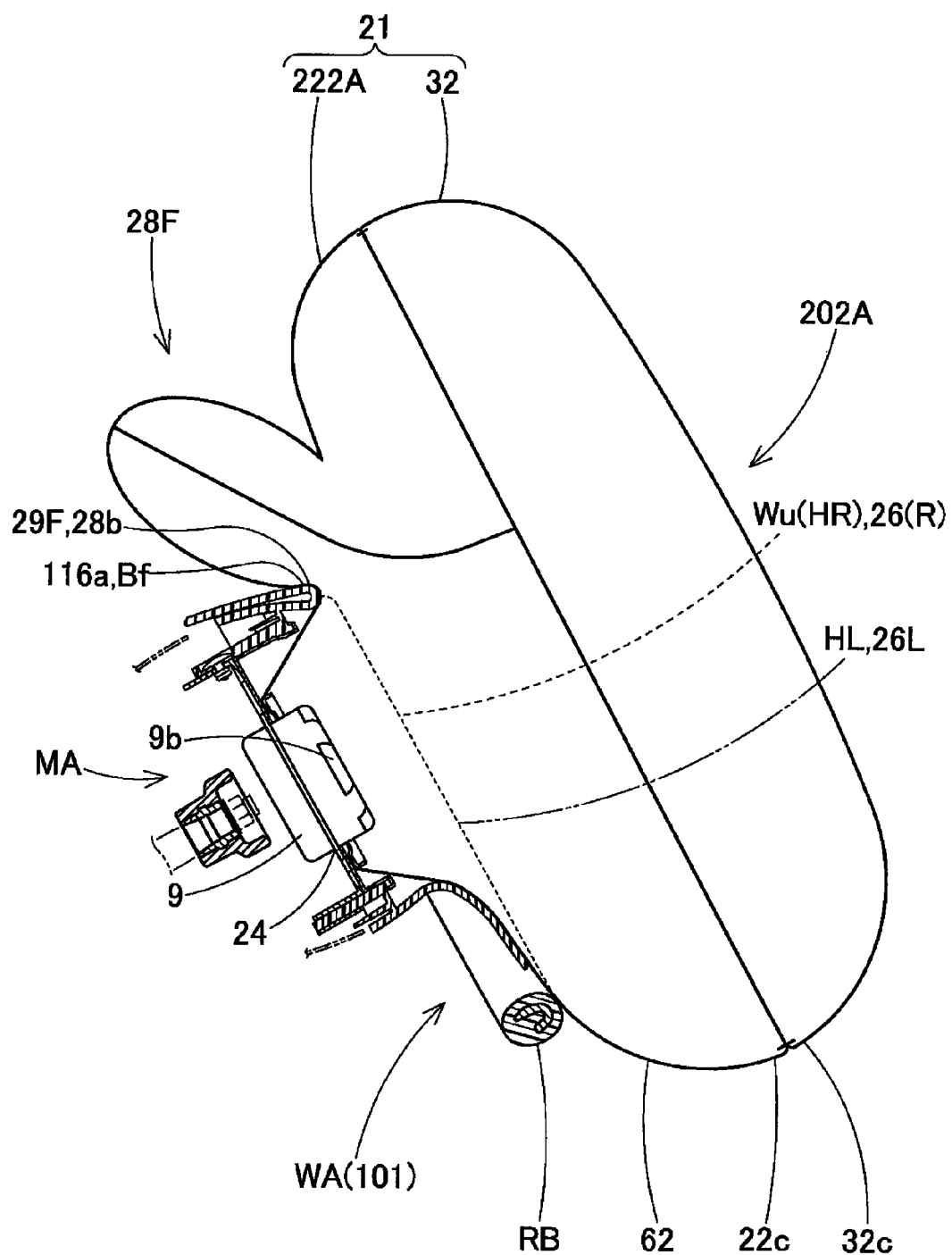
FIG. 40 is a schematic longitudinal sectional view of an airbag according to a modification example of the fourth embodiment at the time of completion of inflation.
Figure 41:
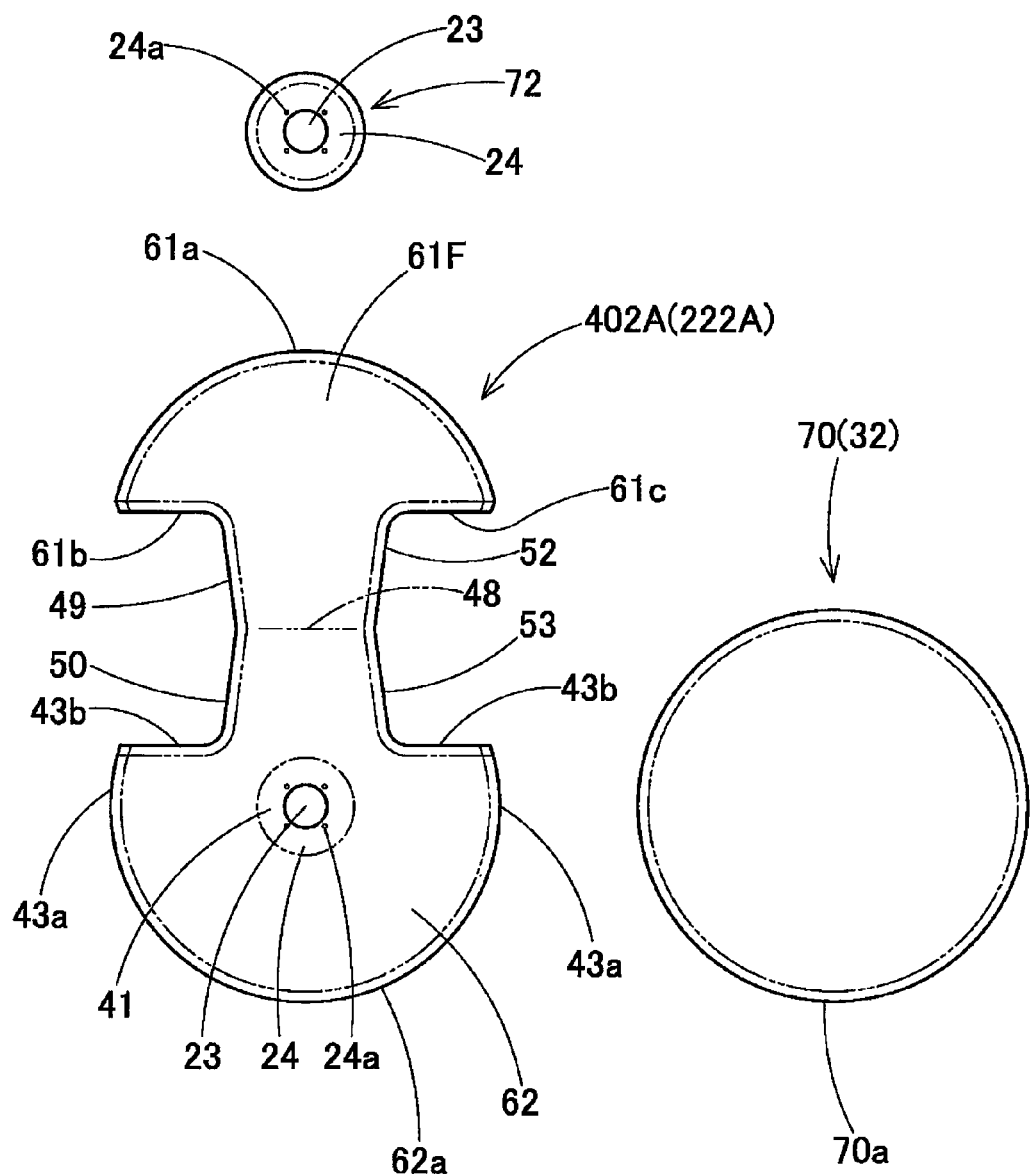
FIG. 41 is a plan view illustrating a bag material which forms the airbag shown in FIG. 40.

In a case of forming only the front support inflation portion 28F, as an airbag 202A shown in FIG. 40, the rear support inflation portion 28B of the airbag 20 according to the first embodiment is omitted, and only the front support inflation portion 28F is arranged. In the airbag 202A, as a bag material 402A forming as a steering wheel side portion 222A, as shown in FIG. 41, a bag material in which the protrusion section part 45B is excluded and the semi-disc rear side portion 62 is provided on the rear portion side of the attaching seat part 41 of the bag material 40 according to the first embodiment may be used.

Figure 42:
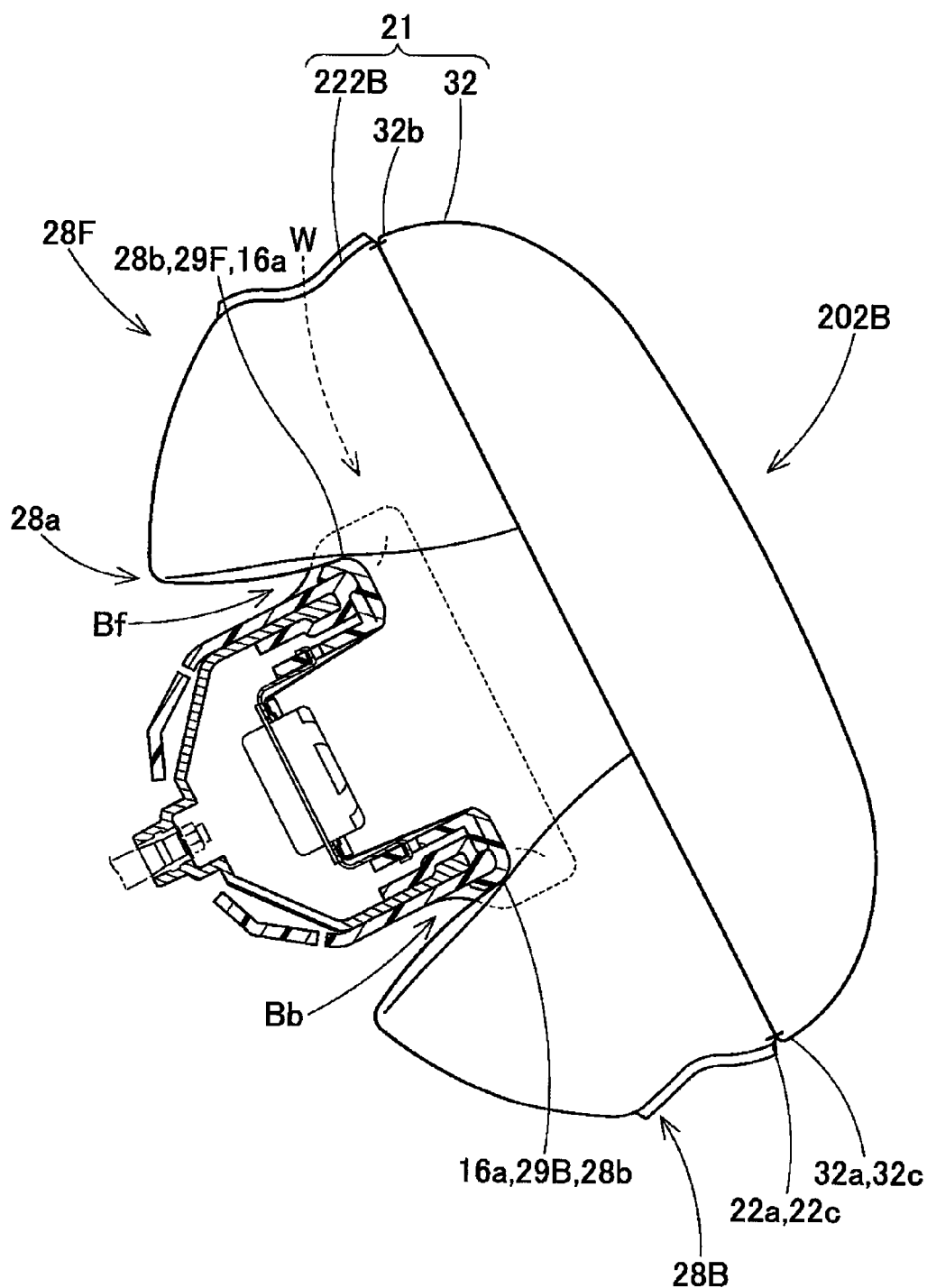
FIG. 42 is a schematic longitudinal sectional view of an airbag according to another modification example of the fourth embodiment at the time of completion of inflation.
Figure 43:
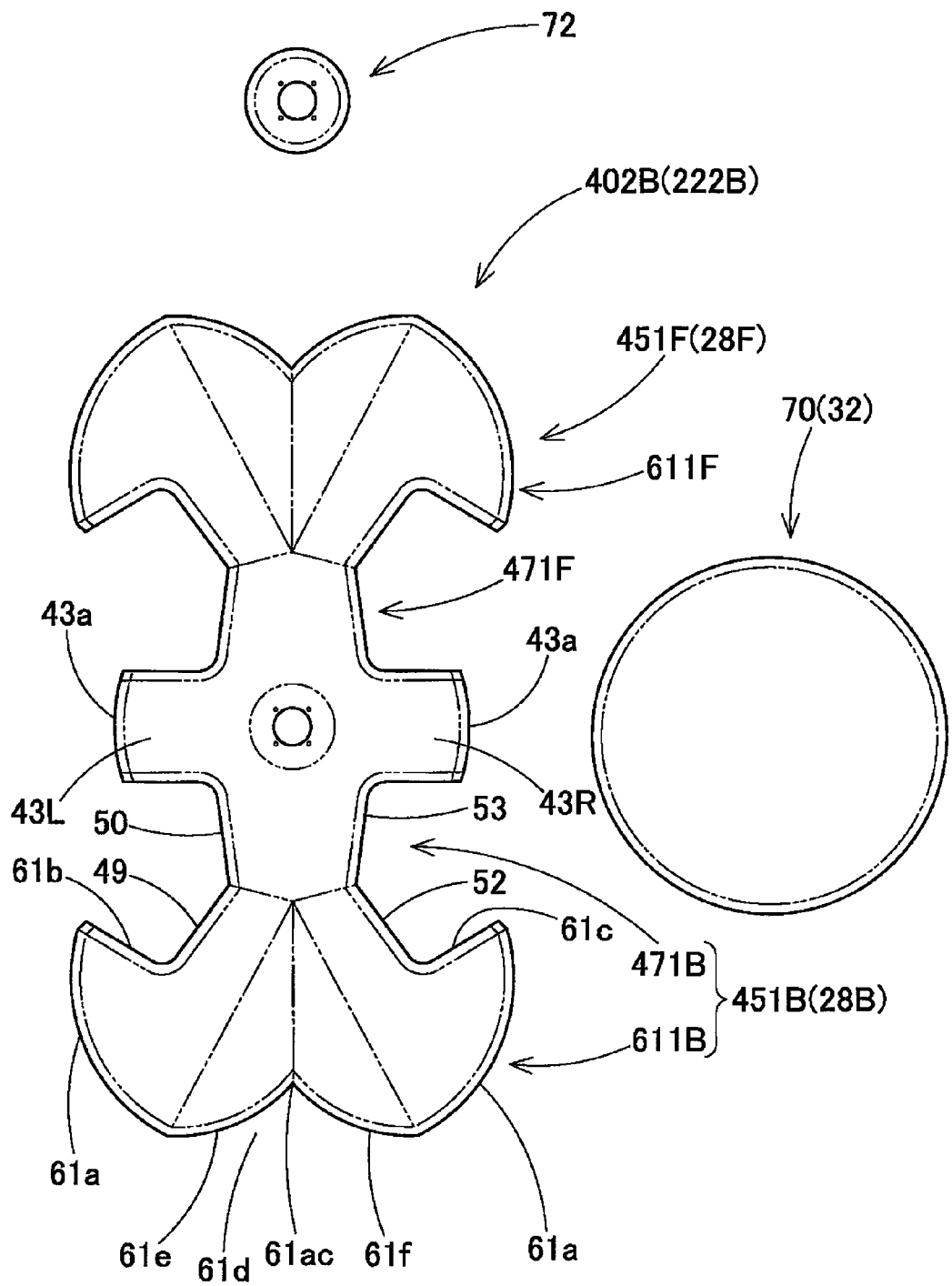
FIG. 43 is a plan view illustrating a bag material which forms the airbag shown in FIG. 42.

As shown in FIG. 42, the support inflation portion having a large volume according to the fourth embodiment may be arranged on the rear side. In a case where the protrusion section part 451F on the front portion side is arranged on the rear side symmetrically in the forward and backward direction from the inflow opening 23 as a center, and the protrusion section part 451B is provided as a configuration of a steering wheel side portion 222B, as a bag material 402B shown in FIG. 43, an airbag 202B including the front and rear support inflation portions 28F and 28B having a large volume can be manufactured.

When the support inflation portion is formed, as an airbag 203 according to a fifth embodiment shown in FIGS. 44 to 48B, the support inflation portion may be constituted of a primary inflation portion 80 which first allows inflation gas to flow in to be inflated and a secondary inflation portion 90 which completes inflation by allowing inflation gas G to flow in from a supply port 83 of the primary inflation portion 80, the front support inflation portion 28F abutted to and supported by the front surface Bf side of the steering wheel WA, and may be constituted of parts of the primary inflation portion 80.

The primary inflation portion 80 of the airbag 203 can be inflated by flowing in inflation gas from the inflow opening 23, and includes a base portion 81 provided with the supply port 83, and a tip end portion 82 which forms the front support inflation portion 28F by extending from the base portion 81. The secondary inflation portion 90 of the airbag 203 forms an outer peripheral wall 213 of the airbag 203 excluding an outer peripheral wall of the support inflation portion 28F. In other words, the secondary inflation portion 90 constitutes an outer bag 91, and the primary inflation portion 80 includes the front support inflation portion 28F and is used as an inner bag 84 storing the base portion 81 in the outer bag 91.

Figure 44:
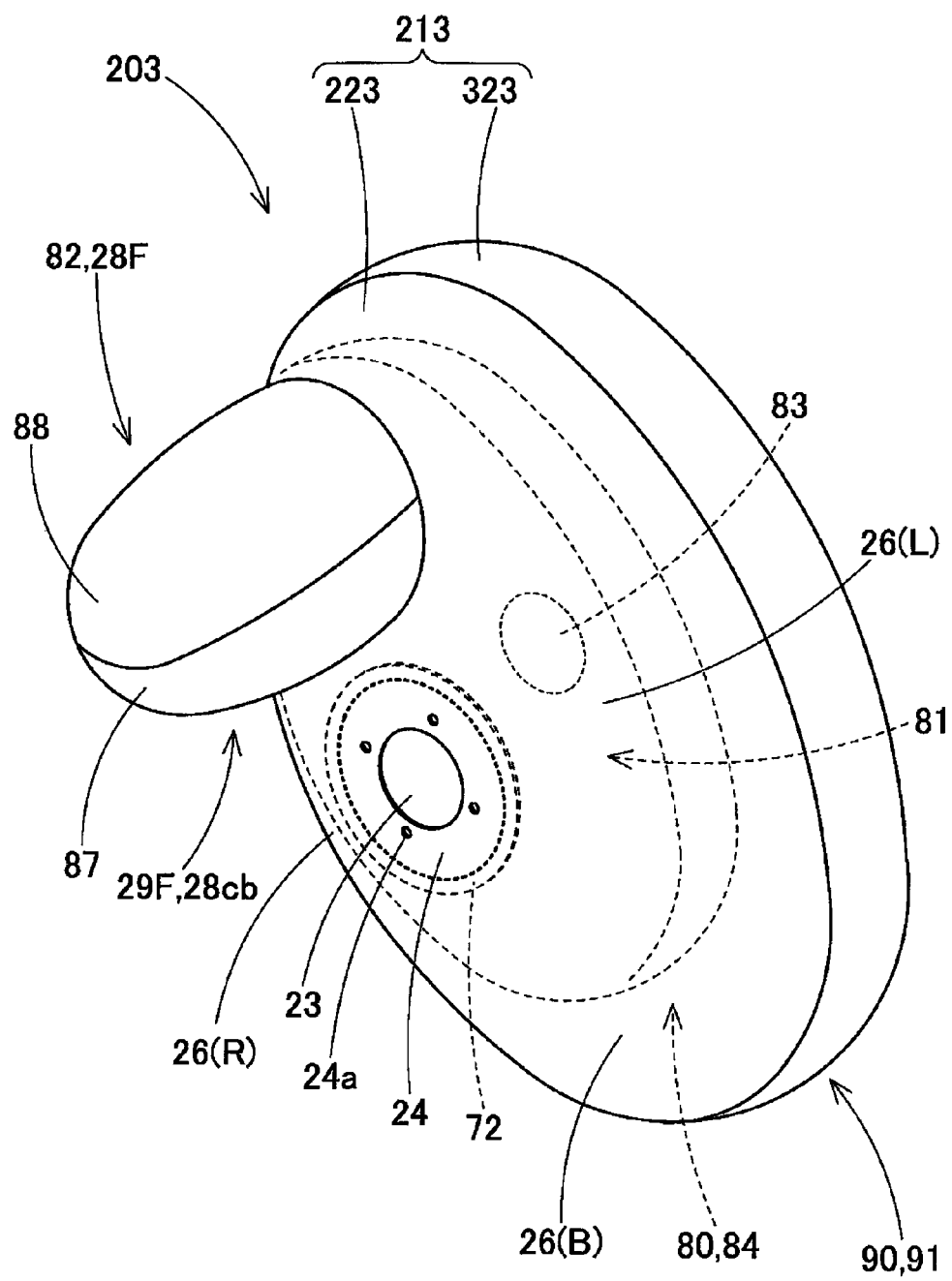
FIG. 44 is a schematic perspective view of an airbag according to a fifth embodiment at the time of inflation.
Figure 45:
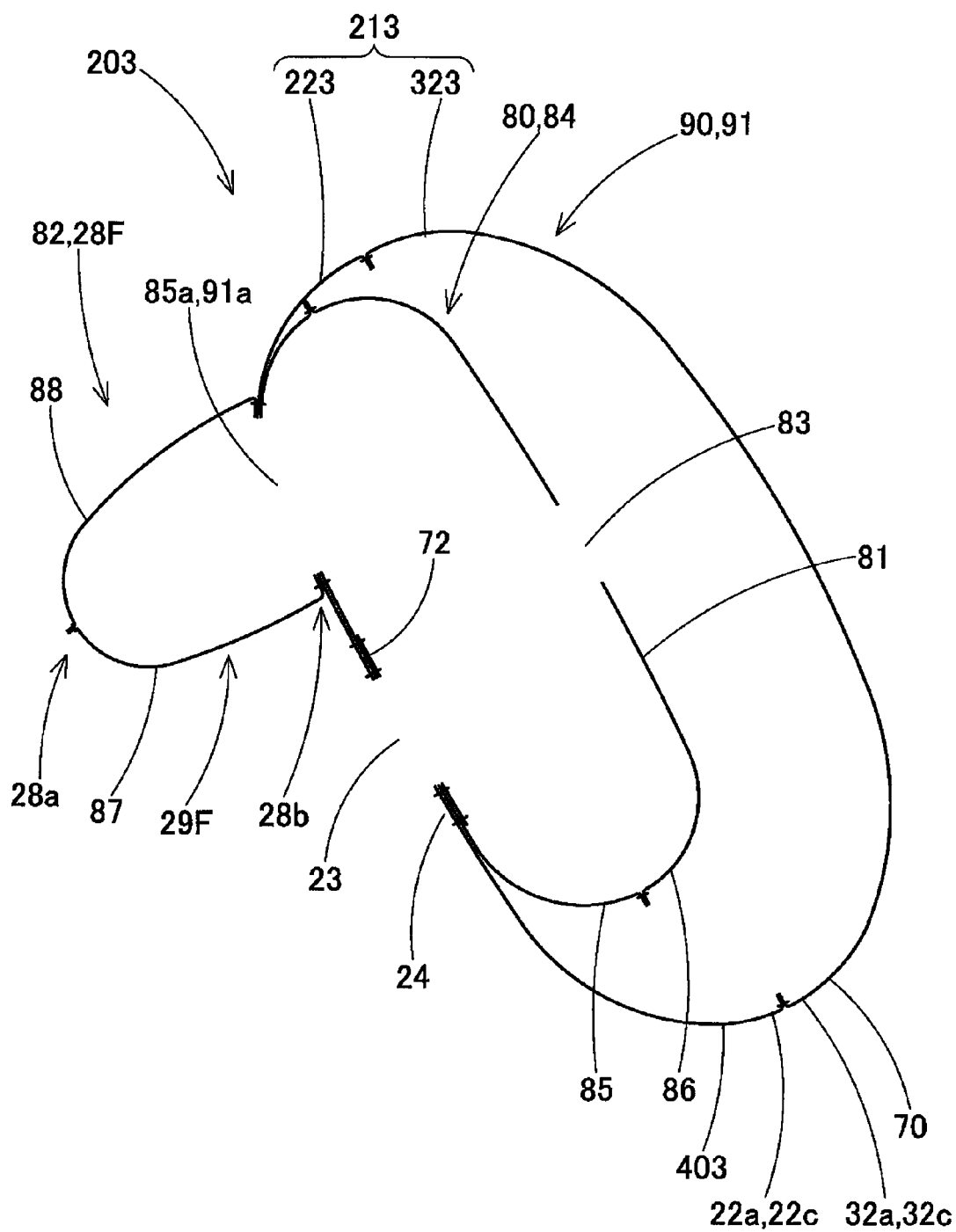
FIG. 45 is a schematic central longitudinal sectional view of the airbag according to the fifth embodiment at the time of inflation.
Figure 46:
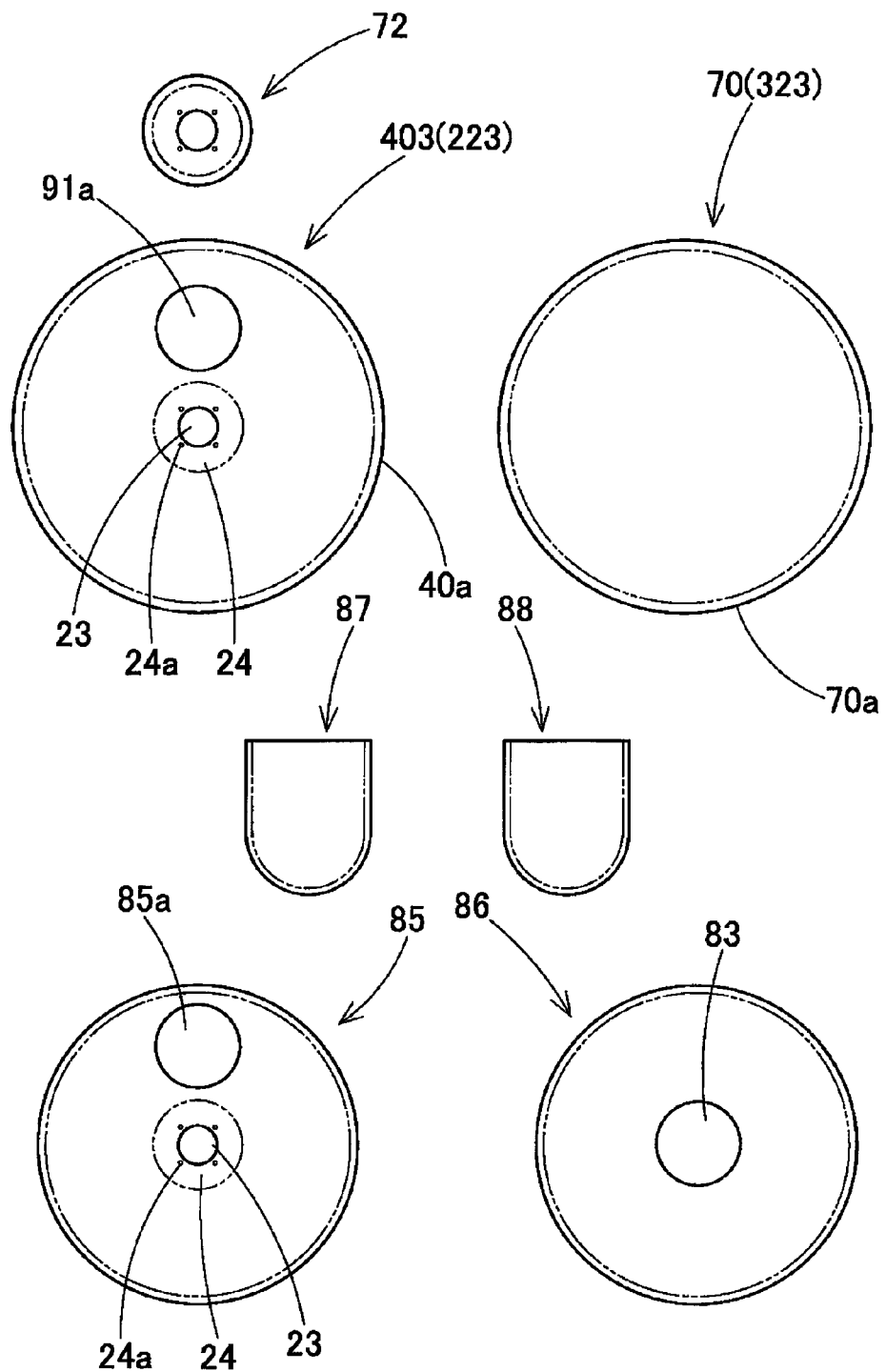
FIG. 46 is a plan view of a bag material for manufacturing the airbag according to the fifth embodiment.

As shown in FIGS. 44 to 46, the inner bag 84 includes an approximately disc opening side portion 85 and a lid side portion 86, in addition to approximately rectangular supporting members 87 and 88 forming the front support inflation portion 28F. The attaching seat 24 including the inflow opening 23 or the attaching hole 24a is arranged in the opening side portion 85, an insertion hole 85a for flowing inflation gas G into the front support inflation portion 28F is formed, and the supply port 83 for supplying the inflation gas G to the outer bag 91 (secondary inflation portion 90) side is opened in the lid side portion 86. The outer bag 91 includes the steering wheel side portion 223 and the driver side portion 323 which have an approximately disc shape, the attaching seat 24 including the inflow opening 23 or the attaching hole 24a is arranged in the steering wheel side portion 223, and an insertion hole 91a for flowing the inflation gas G into the front support inflation portion 28F is formed. The front support inflation portion 28F constituting the primary inflation portion 80 is formed by sewing the outer peripheral edges of the approximately rectangular supporting members 87 and 88 to each other, and sewing the base portion 28b side to peripheral edges of the insertion holes 85a and 91a.

Before drilling process, the opening side portion 85 provided with the supply port 83 of the inner bag 84 is overlapped with an inner peripheral surface side of a bag material 403 constituting the steering wheel side portion 223 of the outer bag 91 by coinciding parts of peripheral edges of the inflow opening 23, the parts of peripheral edges of the inflow opening 23 are sewn to each other, then the inflow opening 23, the attaching hole 24a, the insertion holes 85a and 91a are subjected to the drilling process, and thus the airbag 203 is formed. The opening side portion 85 is sewn and the base portion 28b side of the supporting members 87 and 88 is sewn to the peripheral edges of the insertion holes 91a and 85a in the outer peripheral surface side of the bag material 403 on a side opposite to the opening side portion 85, then outer peripheral edges of the supporting members 87 and 88 are sewn with the tip end portion 28a side, and thus the front support inflation portion 28F is formed.

Then, the lid side portion 86 is overlapped with the opening side portion 85, the outer peripheral edges are sewn to each other, and thus the inner bag 84 is formed. Thereafter, the bag material 70 constituting the driver side portion 323 is overlapped with a side opposite to the base portion 81 of the inner bag 84 in the bag material 403 constituting the steering wheel side portion 223, outer peripheral edges 40a and 70a are sewn to each other, a front face and a rear face are inverted using the inflow opening 23, and thus the airbag 203 can be manufactured. Similar to the first embodiment or the like, the manufactured airbag 203 thus manufactured may be assembled to the airbag device MA and mounted on the steering wheel WA.

Figure 47A:
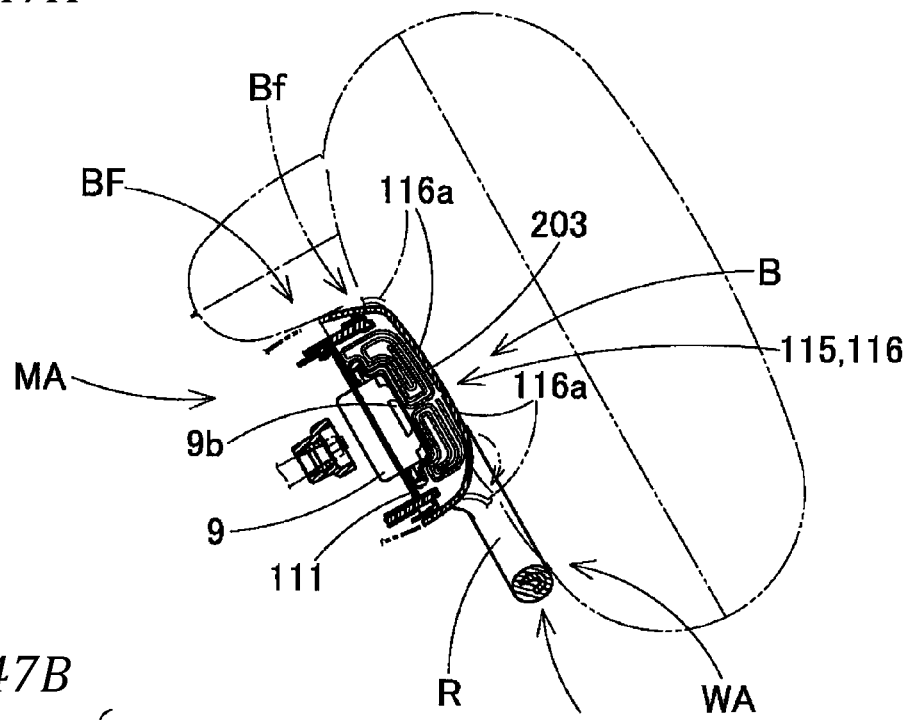
FIGS. 47A and 47B are schematic longitudinal sectional views illustrating a state where the airbag according to the fifth embodiment is inflated.
Figure 47B:
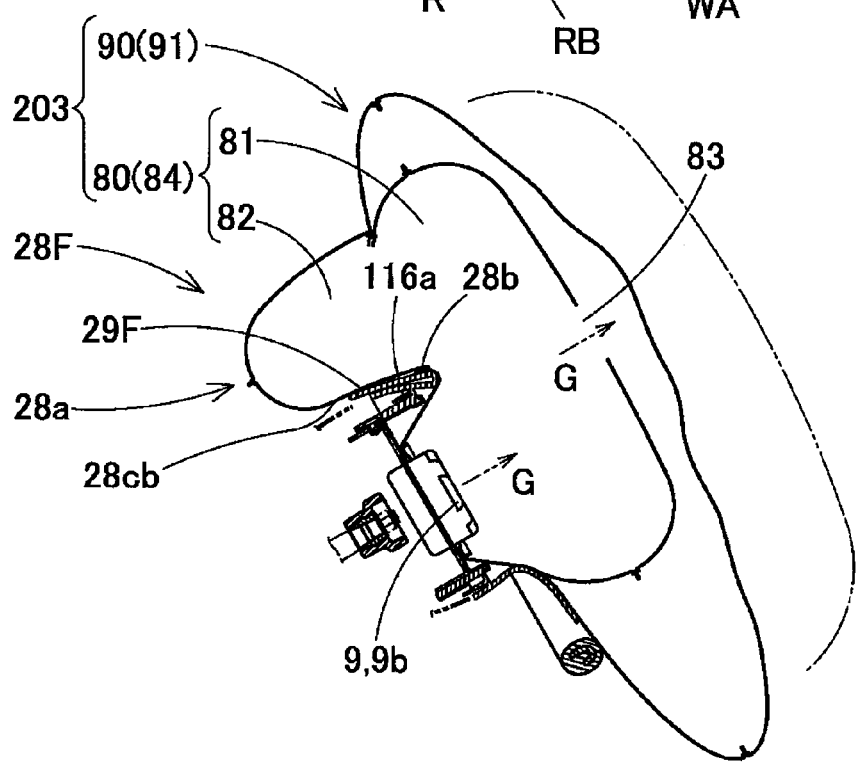
Figure 48A:
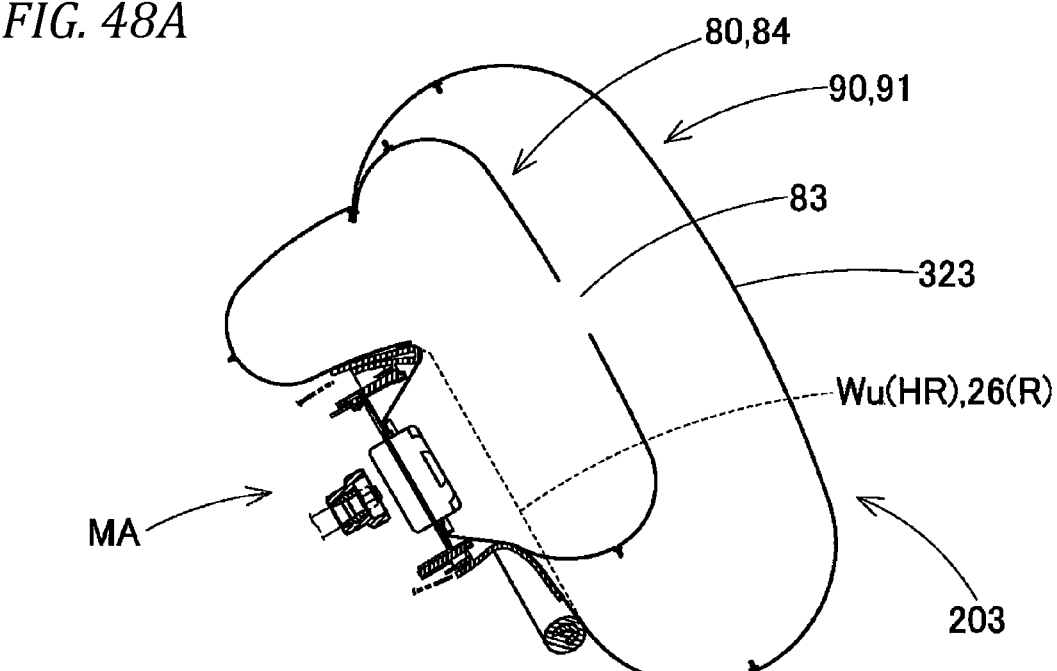
FIGS. 48A and 48B are schematic longitudinal sectional views illustrating a time of completion of inflation and a time of reception of a driver of the airbag according to the fifth embodiment.

At the time of operating the driver seat airbag device MA using the airbag 203 according to the fifth embodiment, in a case where the inflation gas G flows into the airbag 203 through the inflow opening 23 and the airbag 203 is inflated, the door portions 116a and 116a of the airbag cover 115 are pushed to open, and as shown in FIGS. 47A, 47B, and 48A, inflation is completed so that the airbag 203 protrudes from the case 111 as a storage part, covers the upper surface Wu side of the steering wheel WA, and is supported by the upper surface Wu side.

Figure 48B:
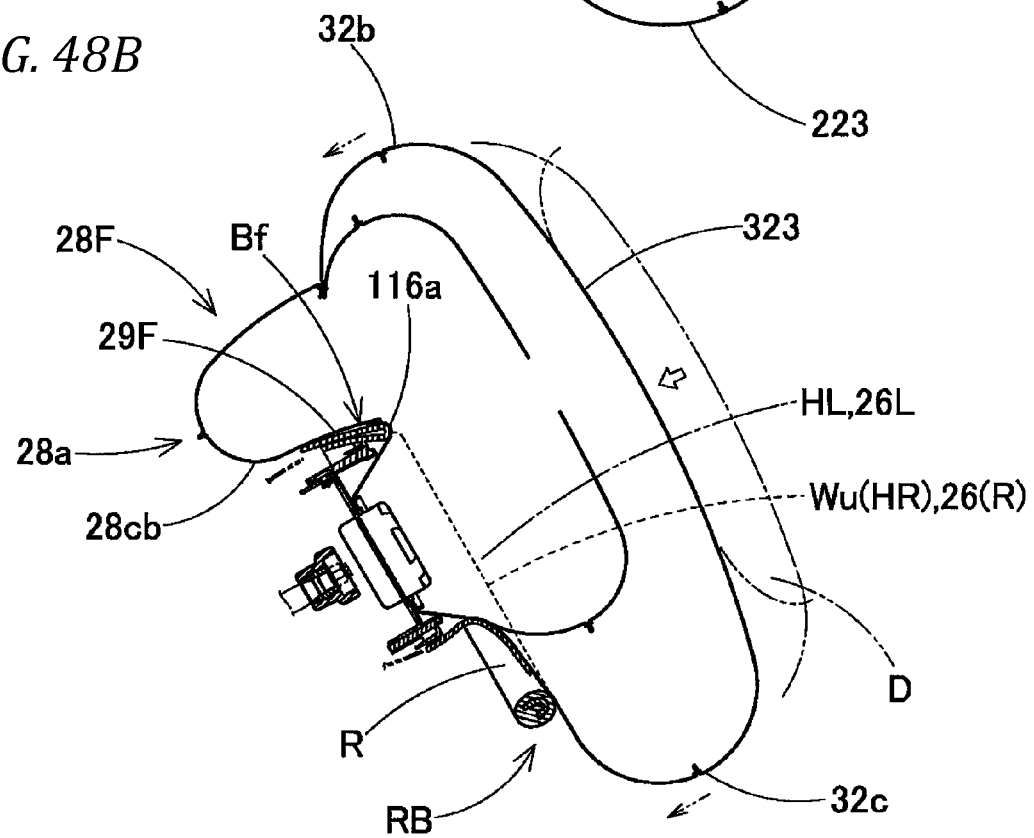
Figure 49:
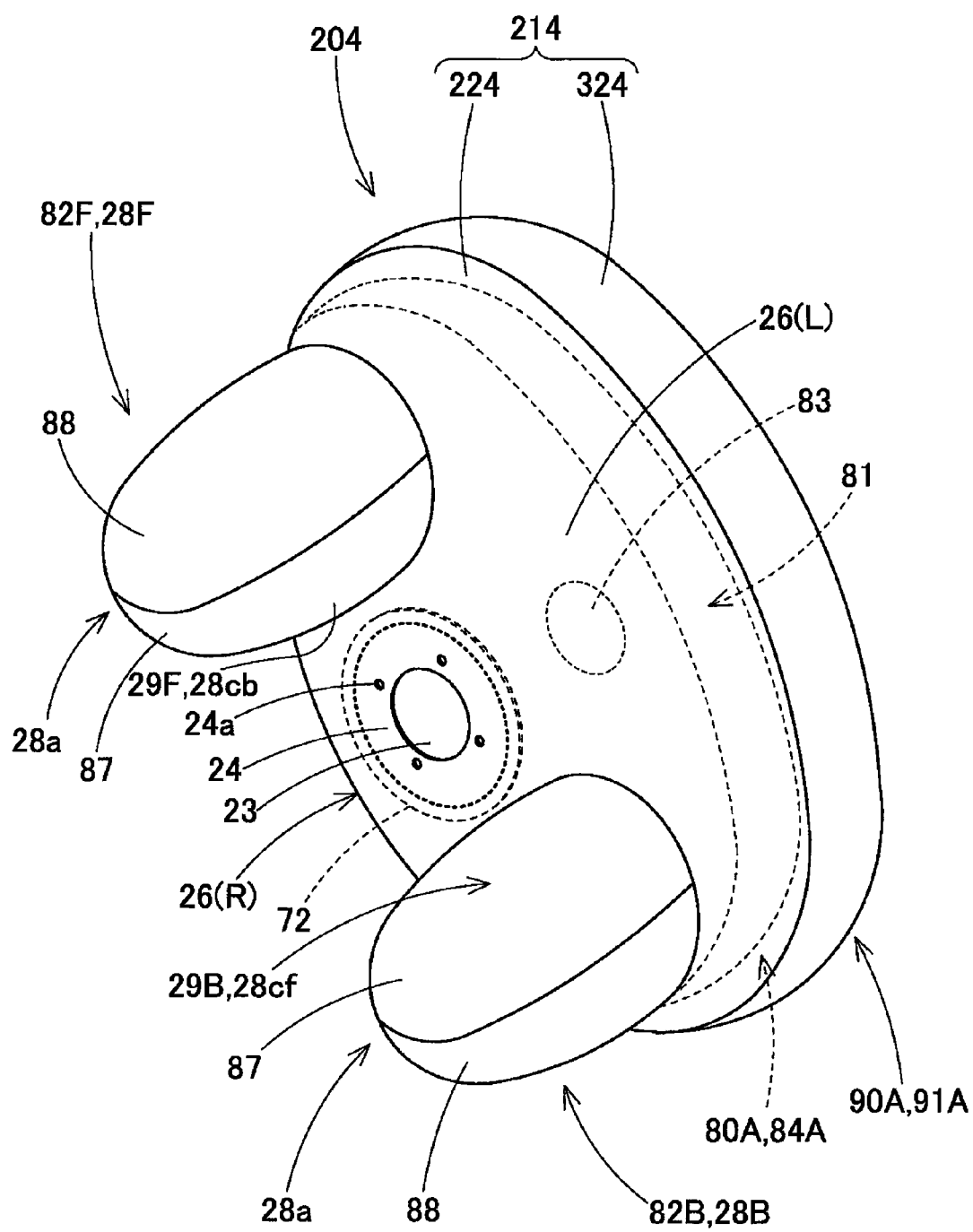
FIG. 49 is a schematic perspective view of an airbag according to a sixth embodiment at the time of inflation.
Figure 50:
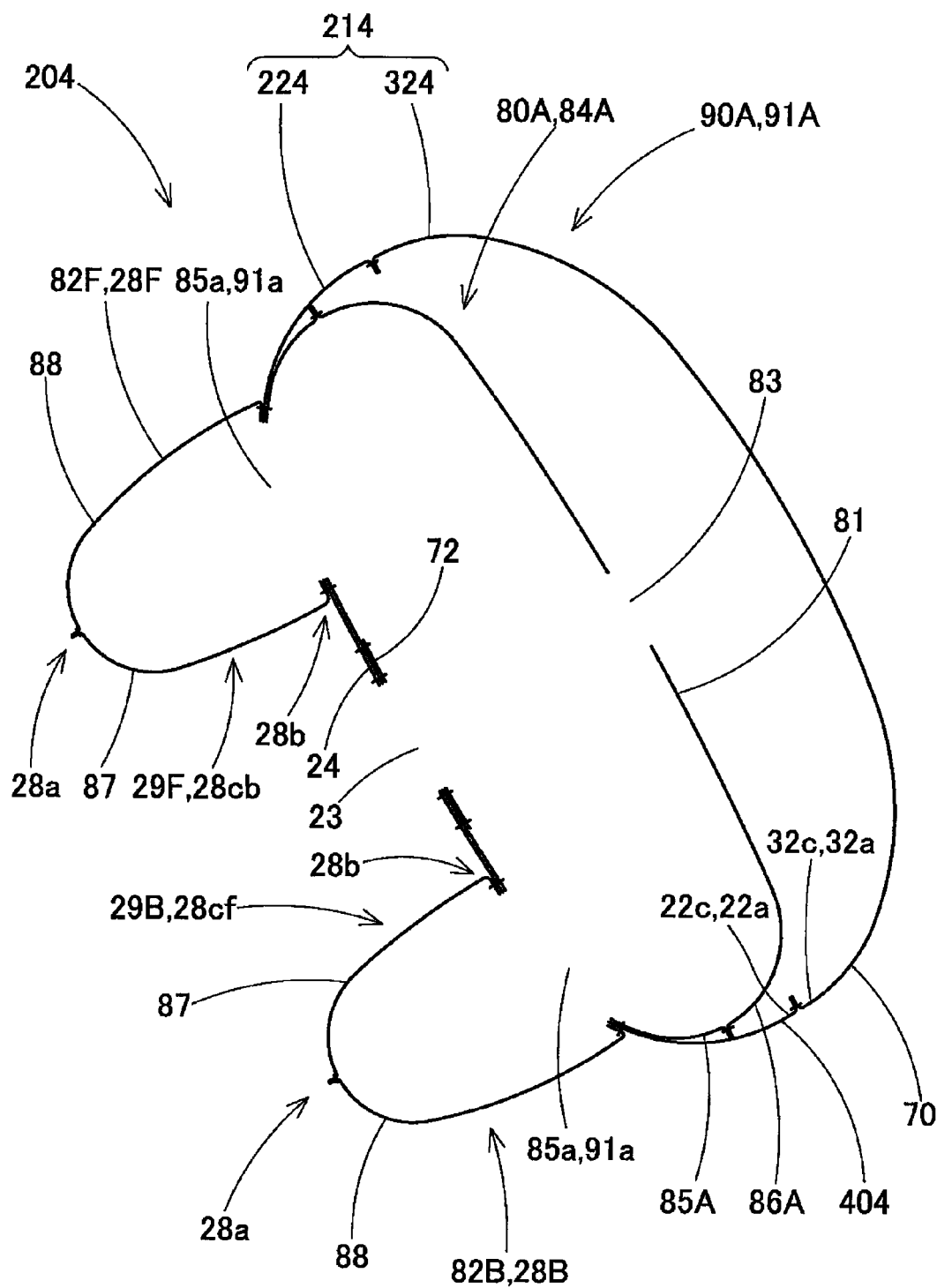
FIG. 50 is a schematic central longitudinal sectional view of the airbag according to the sixth embodiment at the time of inflation.
Figure 51:
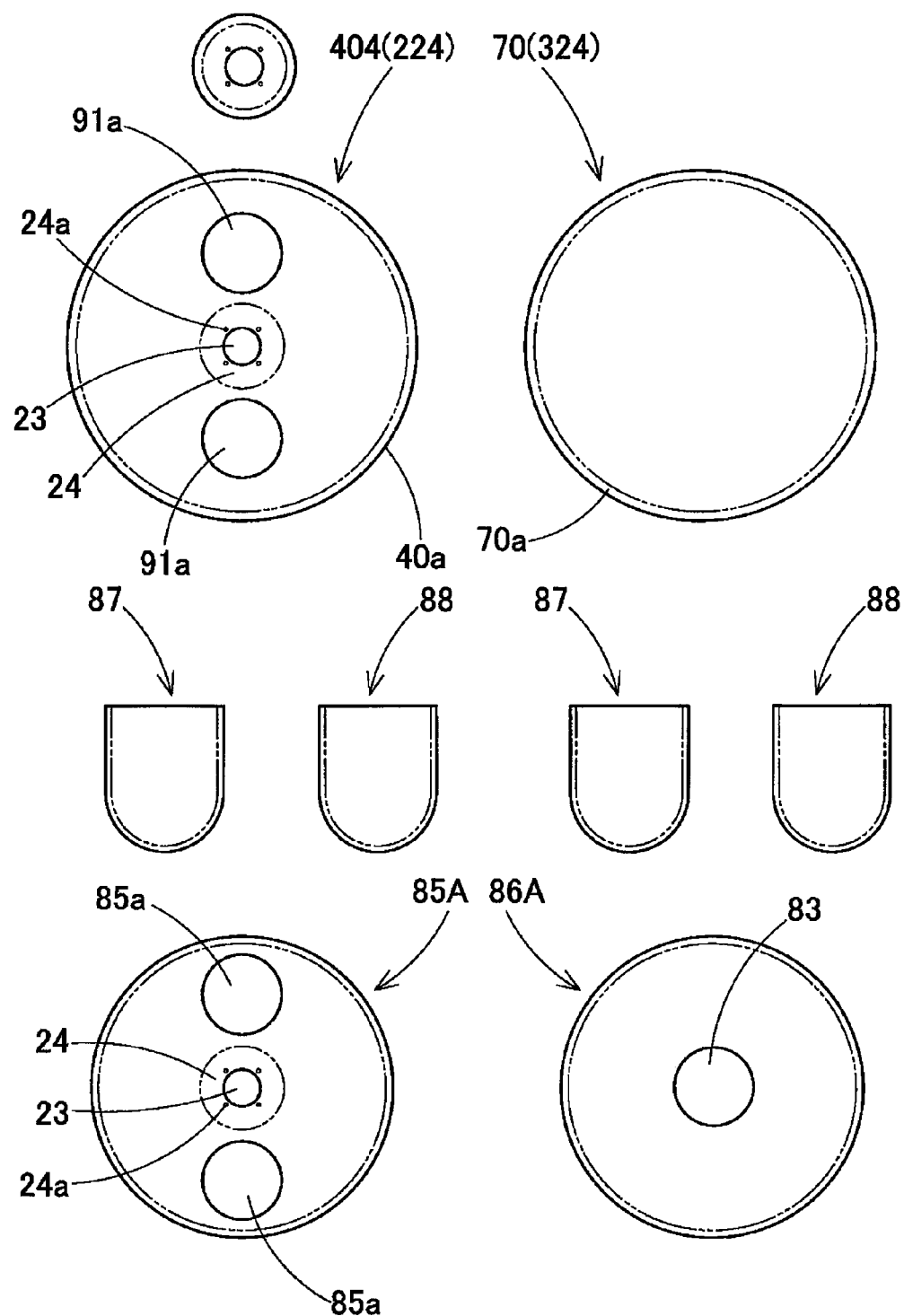
FIG. 51 is a plan view of a bag material for manufacturing the airbag according to the sixth embodiment.

In the driver seat airbag 203 according to the fifth embodiment, when inflation is completed and the driver D is received, the front support inflation portions 28F is disposed on the front side (front surface Bf side) of the central portion B of the steering wheel WA, and thus as shown in FIG. 48B, even if the front edge 32b side of the driver side portion 323 is inclined so as to be deflated downward, the front support inflation portion 28F allows the support surface portion 29F to be abutted to the front surface Bf side of the central portion B of the steering wheel (specifically, the base portion 28b side of the support surface portion 29F on the rear surface 28cb side is pressure-welded to the opened door portion 116a or the front surface Bf and is supported by the central portion B), and it is possible to prevent the front edge 32b side of the airbag 203 from being deflated downward. For the reason, the airbag 203 can accurately receive the driver D heading for the steering wheel WA by the driver side portion 323 disposed so as to face the driver D without inclining. In a part other than the front edge 32b side of the airbag 203, the general sections 26L and 26R extending from the attaching seat 24 of the steering wheel side portion 223 to the right and left sides are abutted to and supported by the upper surface Wu side in the vicinity of the operating grip portions HL and HR of the steering wheel WA, and in the rear edge 32c side, a general section 26B of the rear side of the attaching seat 24 is abutted to and supported by the upper surface Wu of the rear portion RB of the ring portion R, inclination of the driver side portion 323 is prevented, and the airbag 203 can accurately receive the driver by the driver side portion 323 disposed so as to face the driver D.

In particular, in the airbag 203 according to the fifth embodiment, in a case where the inflation gas G flows into the airbag 203, the primary inflation portion 80 is inflated as shown in FIGS. 47A and 47B, and the secondary inflation portion 90 is inflated by the inflation gas G supplied through the supply port 83 of the primary inflation portion 80 as shown in FIG. 48A. Since the front support inflation portion 28F also completes the inflation at the time of completion of inflation of the primary inflation portion 80, before completing inflation of the secondary inflation portion 90, the support surface portion 29F of the front support inflation portion 28F is rapidly disposed in a predetermined position opposing to the front surface Bf side of the steering wheel WA. For the reason, even if the secondary inflation portion 90 completes inflation and then the driver D is received, the support surface portion 29F of the front support inflation portion 28F is already disposed in an appropriate position, the front support inflation portion 28F is rapidly abutted to and supported by the front surface Bf side of the steering wheel WA, the front edge 32b side of the driver side portion 323 is accurately and stably prevented from being deflated. As a result, the airbag 203 can receive and protect the driver D heading for the steering wheel WA in a more stable state.

In a case where the primary inflation portion constitutes the support inflation portion, as an airbag 204 according to a sixth embodiment shown in FIGS. 49 to 53B, the front and rear support inflation portions 28F and 28B may be formed using front and rear tip end portions 82F and 82B of a primary inflation portion 80A. In the airbag 204, the support inflation portions 28F and 28B protrude from the insertion holes 91a and 91a of an outer bag 91A constituting an outer peripheral wall 214 of the airbag 204 on both of front and rear sides of the base portion 81 of the primary inflation portion 80A. The airbag 204 can be formed by disposing the support inflation portion 28F according to the fifth embodiment symmetrically in the forward and backward direction from the inflow opening 23 as a center and providing the rear support inflation portion 28B. In a secondary inflation portion 90A constituting the outer bag 91A, the insertion hole 91a for inserting the front and rear tip end portions 82F and 82B extending from the base portion 81 of the primary inflation portion 80A is arranged on both of front and rear sides of the inflow opening 23 (see FIG. 51).

Before drilling process, an opening side portion 85A provided with the supply port 83 of an inner bag 84A is overlapped with an inner peripheral surface side of a bag material 404 (see FIG. 51) constituting an steering wheel side portion 224 of the outer bag 91A by coinciding parts of peripheral edges of the inflow opening 23, the parts of the peripheral edges of the inflow opening 23 are sewn to each other, then the inflow opening 23, the attaching hole 24a, the insertion holes 85a and 91a are subjected to the drilling process, and thus the airbag 204 is formed. The opening side portion 85A and the base portion 28b side of the supporting members 87 and 88 are respectively sewn to the peripheral edges of the two front and rear insertion holes 91a in the outer peripheral surface side of the bag material 404 on a side opposite to the opening side portion 85A, then the outer peripheral edges of the supporting members 87 and 88 are sewn with the tip end portion 28a side, and thus the front and rear support inflation portion 28F and 28B are formed.

Then, a lid side portion 86A is overlapped with the opening side portion 85A, the outer peripheral edges are sewn to each other, and thus the inner bag 84A is formed. Thereafter, the bag material 70 constituting the driver side portion 324 is overlapped with a side opposite to the inner bag 84A in the bag material 404 constituting the steering wheel side portion 224, the outer peripheral edges 40a and 70a are sewn to each other, a front face and a rear face are inverted using the inflow opening 23, and thus the airbag 204 can be manufactured. Similar to the first embodiment or the like, the manufactured airbag 204 thus may be assembled to the airbag device M and mounted on the steering wheel W.

Figure 52A:
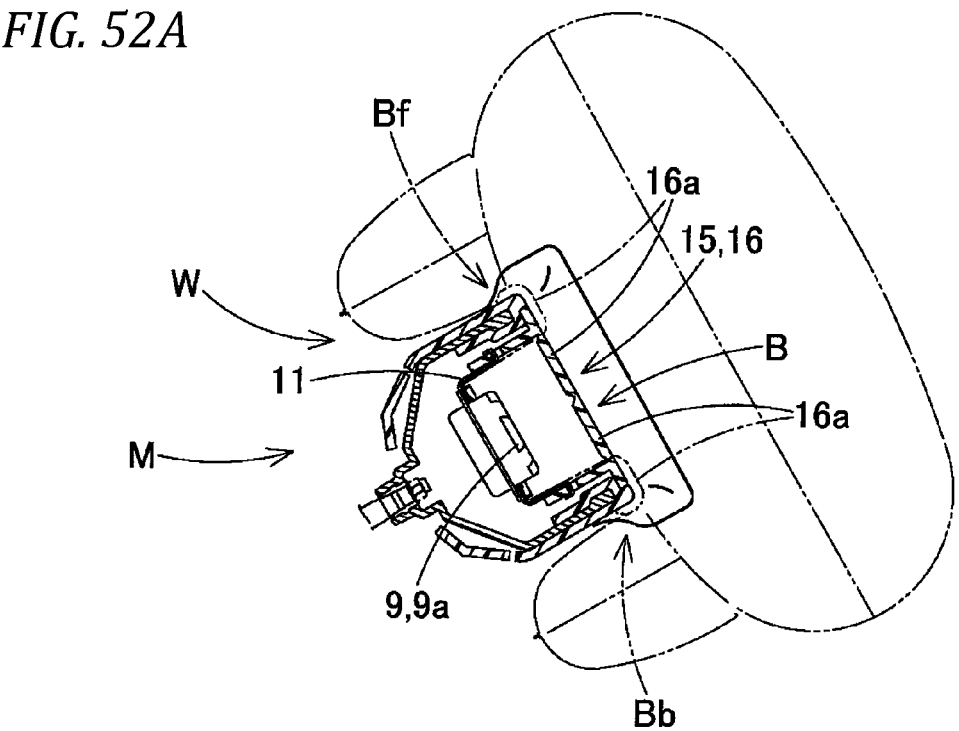
FIGS. 52A and 52B are schematic longitudinal sectional views illustrating a state where the airbag according to the sixth embodiment is inflated.
Figure 52B:
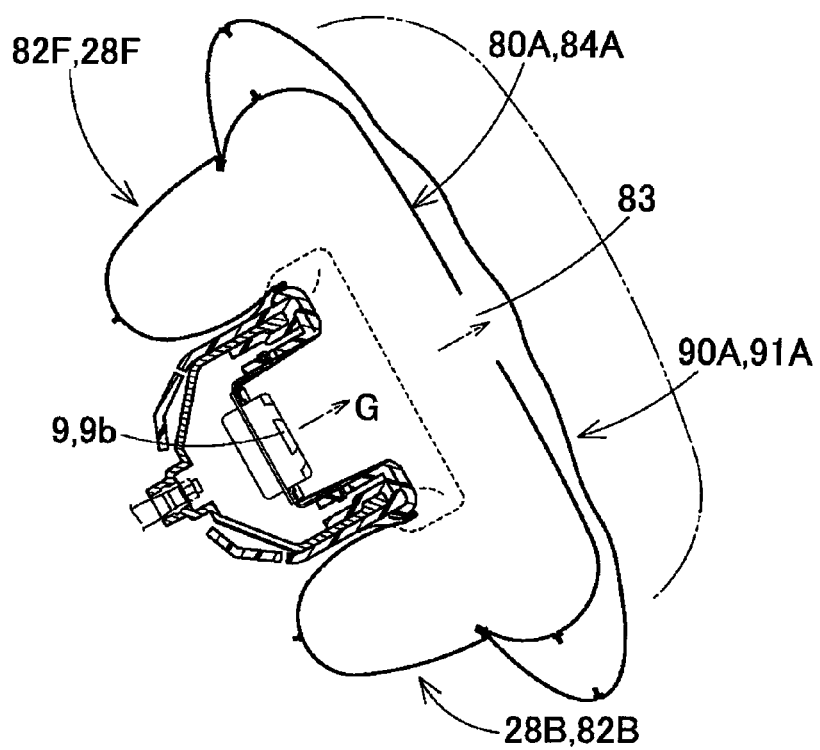
Figure 53A:
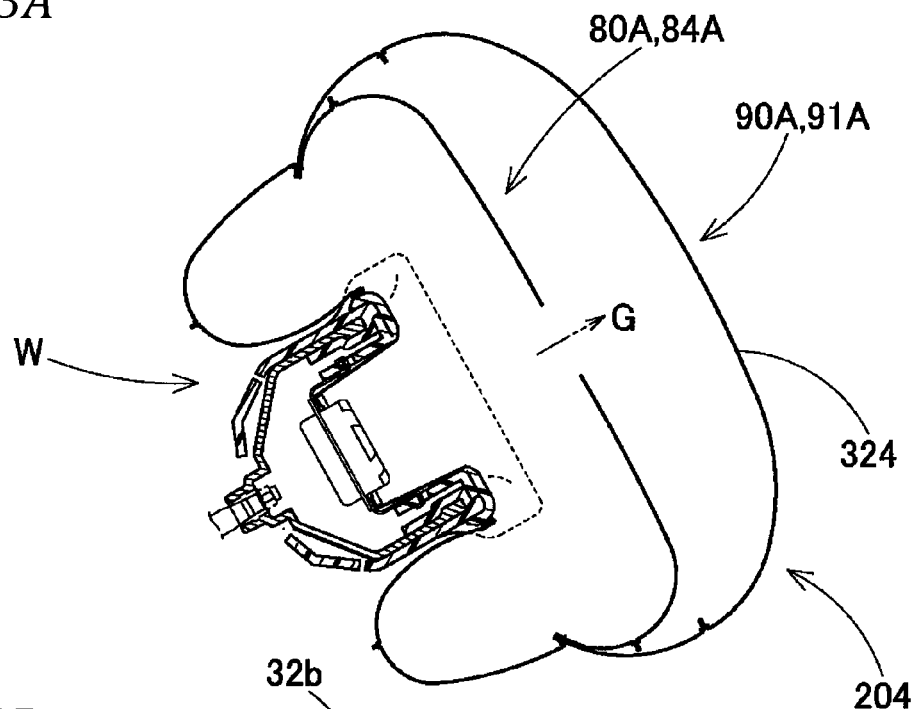
FIGS. 53A and 53B are schematic longitudinal sectional views illustrating a time of completion of inflation and a time of reception of a driver of the airbag according to the sixth embodiment.

At the time of operating the driver seat airbag device M using the airbag 204 according to the sixth embodiment, in a case where the inflation gas G flows into the airbag 204 through the inflow opening 23 and the airbag 204 is inflated, the door portions 16a and 16a of the airbag cover 15 are pushed to open, and as shown in FIGS. 52A, 52B, and 53A, inflation is completed so that the airbag 204 protrudes from the case 11 as a storage part, covers the upper surface Wu side of the steering wheel W, and is supported by the upper surface Wu side.

Figure 53B:
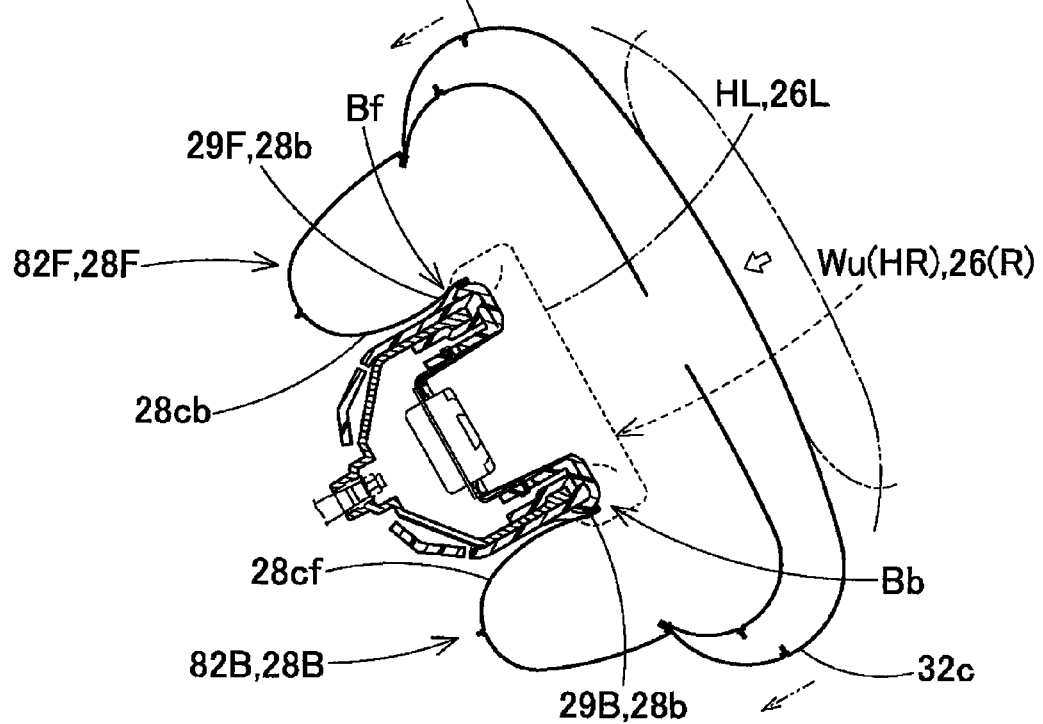

In a case where the inflation gas G flows into the airbag 204, the primary inflation portion 80A is inflated, and the secondary inflation portion 90A is inflated by the inflation gas G supplied through the supply port 83 of the primary inflation portion 80A. Since the support inflation portions 28F and 28B also completes the inflation at the time of completion of inflation of the primary inflation portion 80A, before completing inflation of the secondary inflation portion 90A, the support surface portions 29F and 29B of the front support inflation portions 28F and 28B are rapidly disposed in a predetermined position opposing to the front surface Bf side or the rear surface Bb side of the steering wheel W. For the reason, even if the secondary inflation portion 90A completes inflation and the driver D is received as shown in FIG. 53B, the support surface portions 29F and 29B of the support inflation portions 28F and 28B is already disposed in an appropriate position, the support inflation portions 28F and 28B is rapidly abutted to and supported by the front surface Bf side or the rear surface Bb side of the steering wheel W, the front edge 32b side or the rear edge 32c side of the driver side portion 324 is accurately and stably prevented from being deflated. As a result, the airbag 204 can receive and protect the driver D heading for the steering wheel W in a more stable state. Falling off of the airbag 204 in the right and left direction is prevented by abutting and supporting the vicinity of the general sections 26L and 26R extending from the attaching seat 24 of the steering wheel side portion 224 to and by the upper surface Wu of the vicinity of the operating grip portion HL and HR of the steering wheel W.

The support surface portion of the support inflation portion may be actively abutted to and supported by the front side of the steering wheel. For example, as an airbag 205 according to a seventh embodiment shown in FIG. 54 and FIGS. 58A and 58B, a boundary part with the attaching seat 24 in the support inflation portion 28F on the front side, that is, a bent section 25 with the support inflation portion 28F swelling from the front edge side of the attaching seat 24 in the airbag 205 at the time of completion of inflation is arranged in the vicinity (specifically, the front surface Bf side in the vicinity of a crossing part Bc) of a crossing part (corner section) Bc of the front surface Bf and the upper surface Bu on the front portion BF side of the steering wheel WA, and the support surface portion 29F which has an approximately rectangular planar plate shape and extends downward from the bent section 25 in the support inflation portion 28F is abutted to and supported by the front surface Bf of the steering wheel WA, in the vicinity of a central portion 29a in the vertical direction or the vicinity of a tip end 29c as well as the base portion 28b side. A plan view in a state of completing inflation of the airbag 205 used as the airbag device MA is similar to the airbag 202 shown in a two-dot chain line in FIG. 32.

Figure 55:
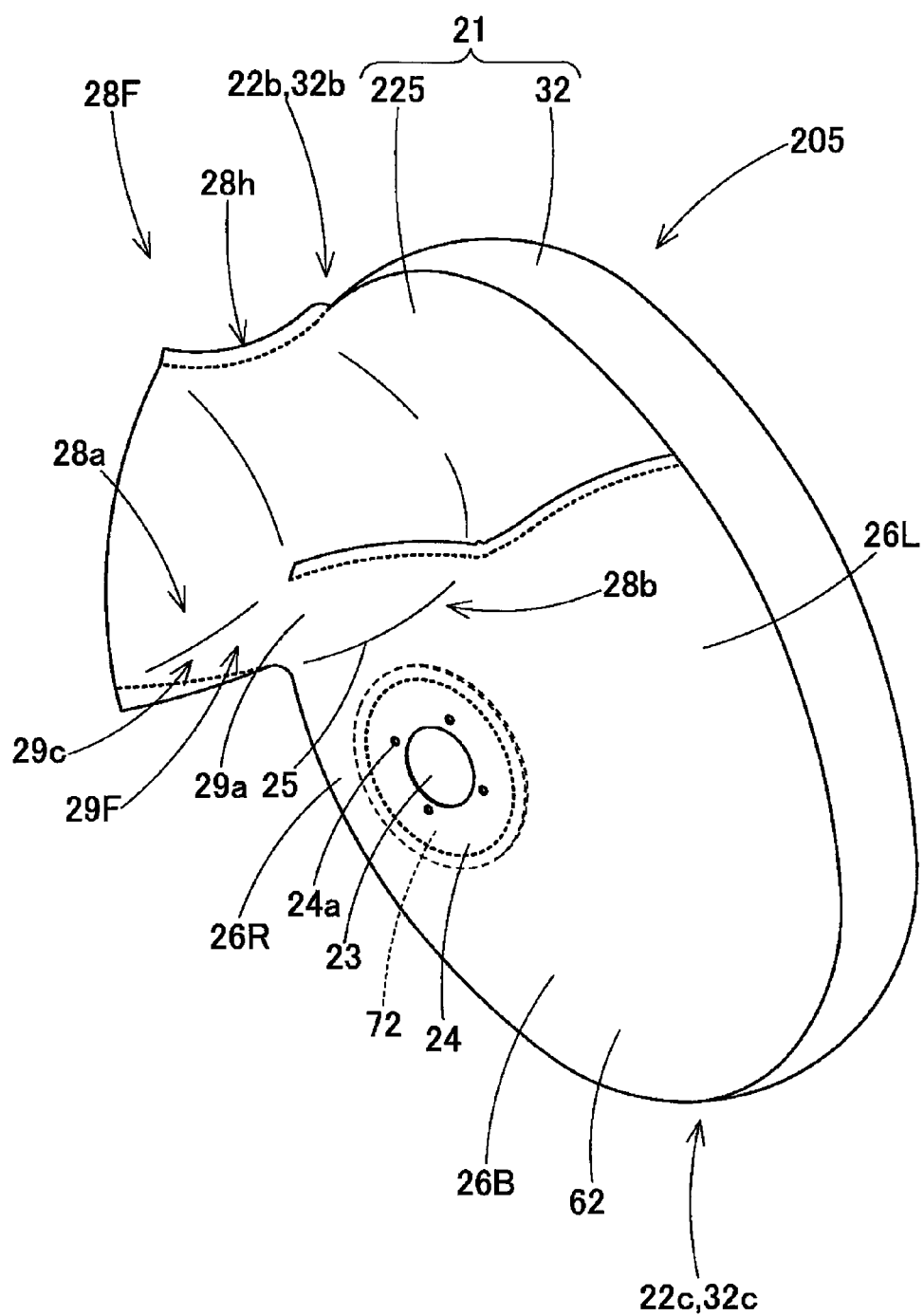
FIG. 55 is a schematic perspective view of an airbag according to the seventh embodiment at the time of inflation.

As shown in FIG. 55, the airbag 205 according to the seventh embodiment is approximate to the airbag 202 according to the fourth embodiment (see FIGS. 32 to 39B), and the support inflation portion 28F protrudes downward from the front edge 22b of a steering wheel side portion 225. A bag material 405 forming the steering wheel side portion 225 is approximate to the bag material 402 (see FIG. 35 and Sections A, B, C, D and E of FIG. 38) of the airbag 202 according to the fourth embodiment as shown in FIG. 56 and Sections A, B, C, D and E of FIG. 57.

That is, similar to the steering wheel side portion 222 according to the fourth embodiment, the steering wheel side portion 225 of the airbag 205 according to the seventh embodiment includes the general sections 26L, 26R, and 26B disposed on both right and left sides and a rear side of the attaching seat 24 including the inflow opening 23 and supported on a front surface Bu side of the steering wheel WA, and the support inflation portion 28F on the front side, and the support inflation portion 28F connects a front surface 28h side to the front edge 22b side the steering wheel side portion 222, that is, protrudes downward from the front edge 22b.

Figure 56:
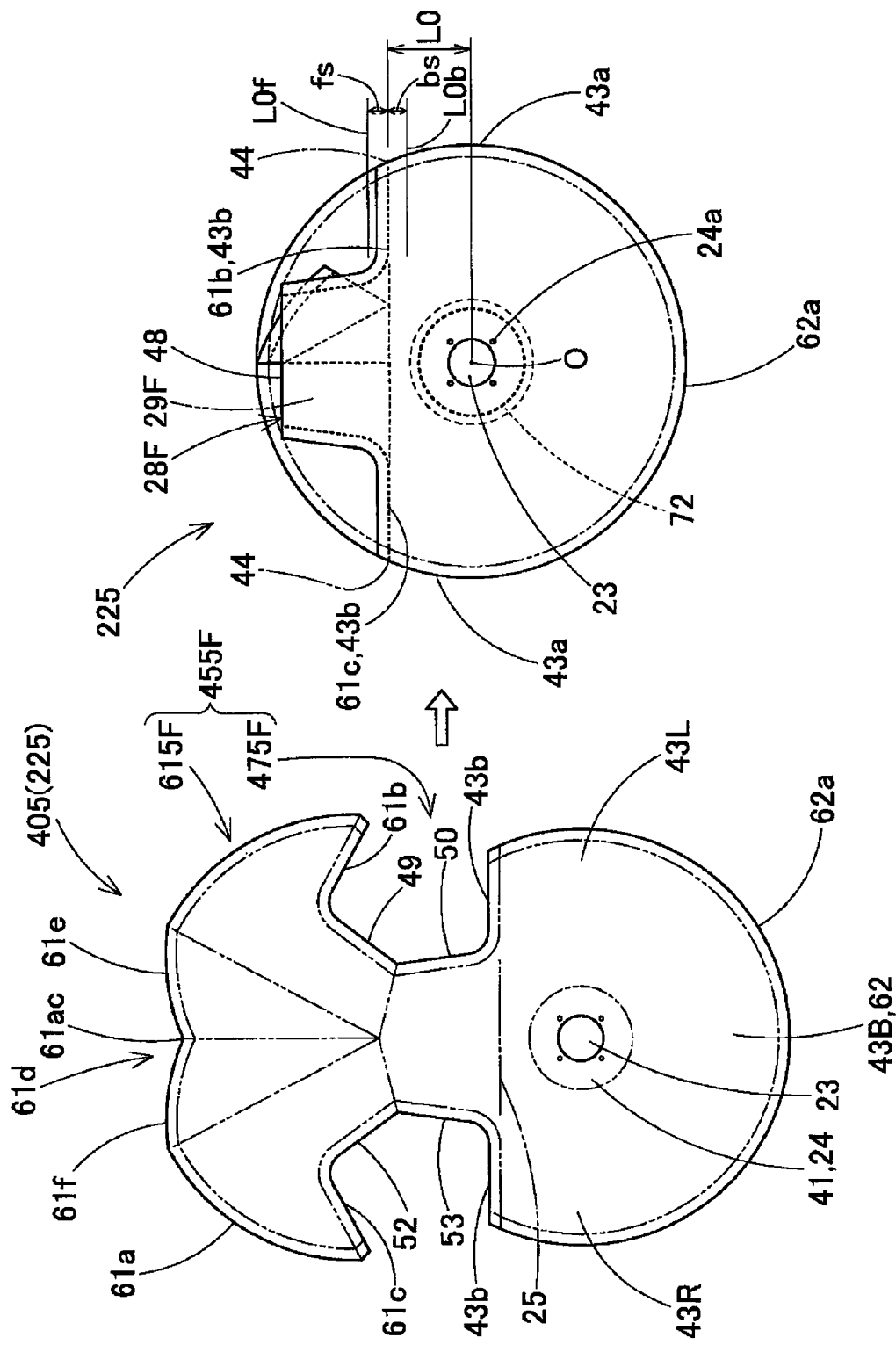
FIG. 56 is a plan view of a bag material of a steering wheel side portion of the airbag according to the seventh embodiment and a steering wheel side portion manufactured from the bag material.
Figure 57:
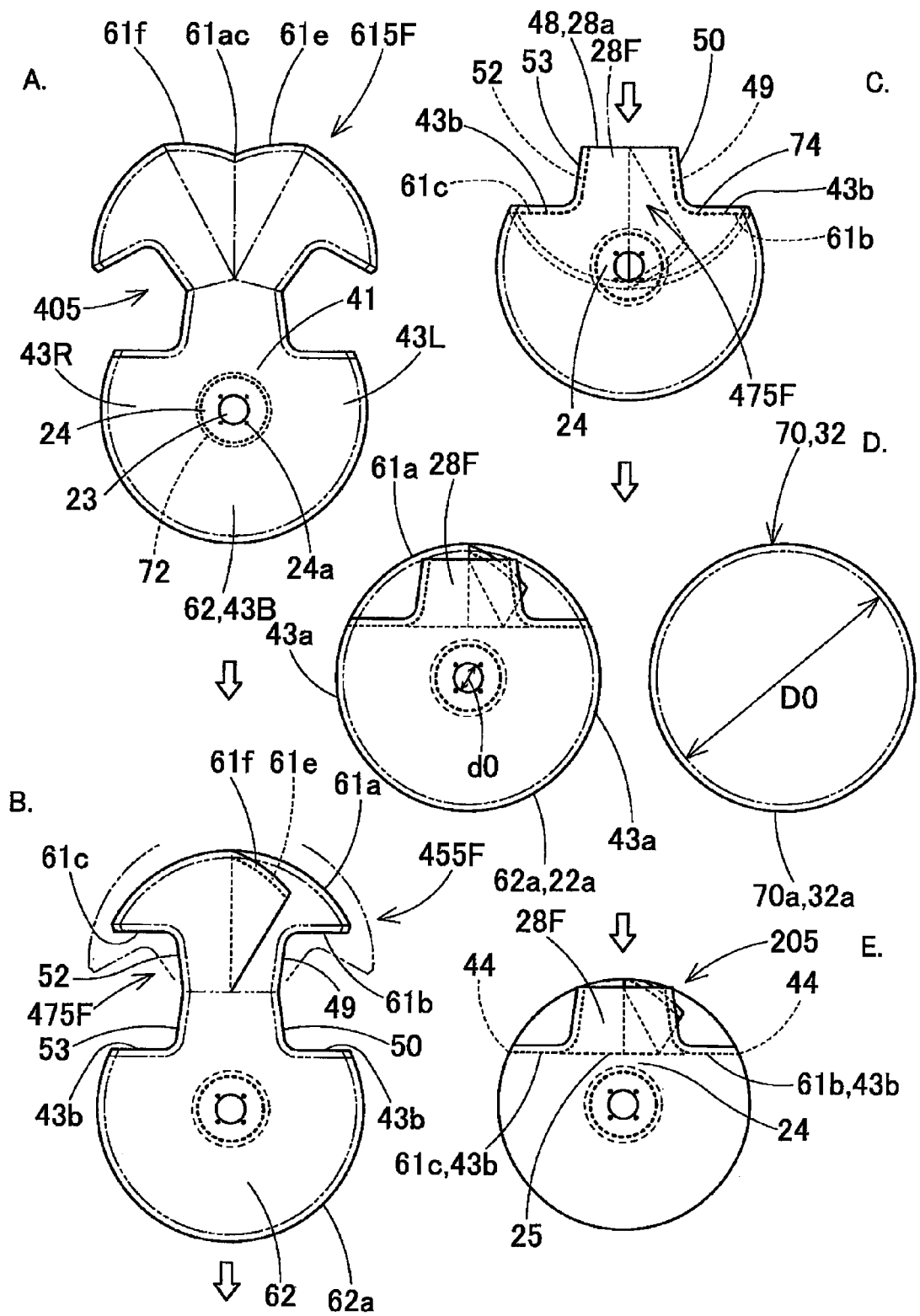
FIG. 57 is a view illustrating a time of manufacturing the airbag according to the seventh embodiment.

Similar to the bag material 402 according to the fourth embodiment, as shown in FIG. 56 and Sections A, B, C, D and E of FIG. 57, the bag material 405 forming the steering wheel side portion 224 is made of a cloth material obtained by weaving yarn such as polyamide, has flexibility, and includes the attaching seat part 41 for forming the attaching seat 24, the general section parts 43 (L, R, and B) extending from the attaching seat part 41 to the both of right and left sides and the rear side and can form the general sections 26L, 26R, and 26B (rear side portion 62), and a protrusion section part 455F extending from the attaching seat part 41 to the front side and can form the support inflation portion 28F. The support inflation portion 28F has the folding section 48 along the right and left direction on the tip end portion 28a and is formed of a sheet-shaped part 475F joining overlapped right and left edges 49 and 50 and edges 52 and 53 extending from the folding section 48 to each other.

The protrusion section part 455F includes the sheet-shaped part 475F disposed on the attaching seat 24 side, and a tip end part 615F disposed on the tip end side. The tip edge 61a of the tip end part 615F and tip edges 43a of the right and left general section parts 43L and 43R constitute a driver side joining portion joined to the outer peripheral edge 32a of the driver side portion 32, parts opposing in front and rear of right and left side edges 61b and 61c extending from both ends of the tip edge 61a to the sheet-shaped part 475F on an inner side and the front edges 43b on the front sides of the general section parts 43L and 43R, in outer peripheral edges of the tip end part 615F, constitute joining sections for forming a steering wheel side portion joining to each other.

To make the support inflation portion 28F protrude from the front edge 22b of the steering wheel side portion 225 to increase the volume, similar to the bag material 402 according to the fourth embodiment, in the tip edge 61a of the tip end part 615F, the recessed groove 61d joining edges 61e and 61f opposed in the right and left direction is arranged at the center 61ac in the right and left direction, and parts of the front edges 61a extending from the recessed groove 61d in the right and left direction constitute the driver side joining portion 61a. Similar to the bag material 402 according to the fourth embodiment, the edges 61e and 61f opposed in the right and left direction have a shape of swelling to the front side so as to approach to each other.

Figure 58A:
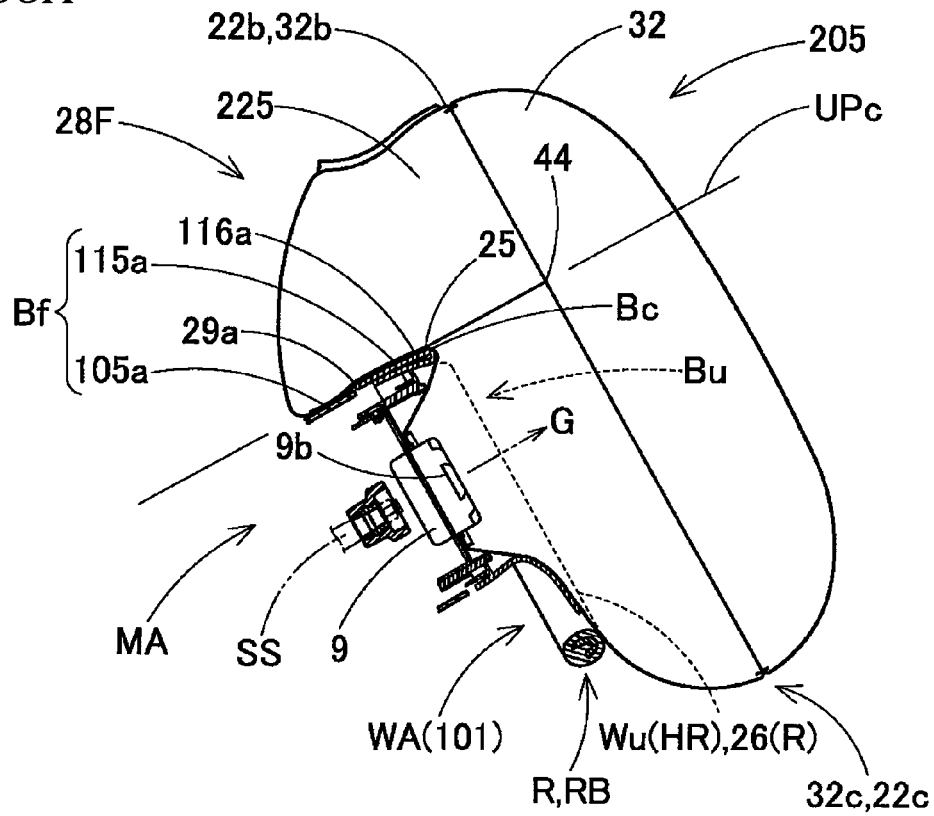
FIGS. 58A and 58B are a schematic central longitudinal sectional view and a schematic side view of a time of inflation of the airbag in the airbag device according to the seventh embodiment.
Figure 58B:
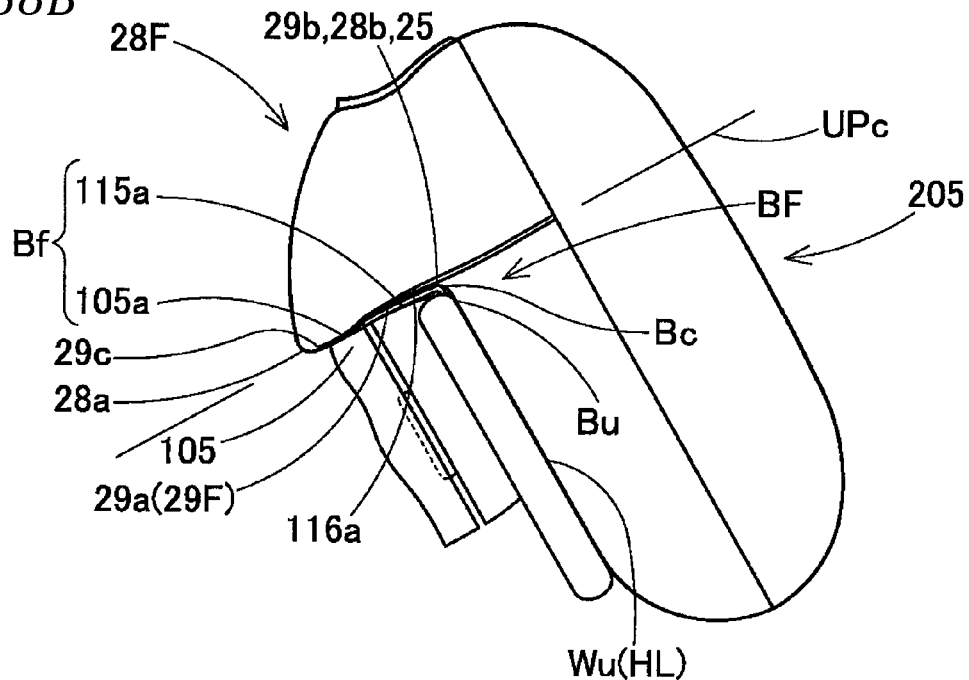

In particular, in the steering wheel side portion 225 (bag material 405), a joining site 44 to the driver side portion 32 in the joining section 43b, 61b, and 61c for forming a steering wheel side portion is arranged in the vicinity of an upper part of a direction along the steering shaft SS of the steering wheel WA on the front surface Bf side of the steering wheel WA, in a side view observed from the right and left direction at the time of completion of inflation, that is, in vicinity of a straight line UPc along the steering shaft SS on the front surface Bf side of the steering wheel WA (see FIGS. 58A and 58B). In the front surface Bf side of the steering wheel WA passing through the straight line UPc, the most forwardly protruding part in the front portion BF of the central B is used as a reference.

According to the above configuration, a part constituting the support surface portion 29F of the support inflation portion 28F in the bag material 405 is an approximately rectangular planar area on a front side of a boundary part 25 with the attaching seat part 41 (attaching seat 24) in the sheet-shaped part 475F of the protrusion section part 455F. Since the support inflation portion 28F protrudes downward on the front side of the attaching seat 24 at the time of inflation of the airbag 205, the boundary part 25 constitutes the bent section 25 extending in an approximately linear shape along the right and left direction in the steering wheel side portion 225. In the seventh embodiment, the bent section 25 is arranged on the front surface Bf side in the vicinity of a crossing part (corner section) Bc of the front surface Bf and the upper surface Bu on the front portion BF side in the central portion B of the steering wheel WA.

That is, from the viewpoint of the dimension shape of the bag material 405, the boundary part 25 of the sheet-shaped part 475F of the protrusion section part 455F and the attaching seat part 41 extends in a linear shape along the right and left direction and is continued to the side edge 43b extending in a linear shape along the right and left direction in the right and left general section parts 43L and 43R of the attaching seat part 41. The side edge 43b is joined to the side edges 61b and 61c of the tip end part 615F to form a joining section for forming a steering wheel side portion, and the right and left tip end sides are joining sites joining to the outer peripheral edge 32a of the driver side portion 32(the outer peripheral edge 70a the bag material 70 of the driver side portion 32), together with the driver side joining portions 43a and 61a. In the seventh embodiment, the joining site 44 is arranged in the vicinity of the straight line (reference line) UPc along the steering shaft SS on the front surface Bf side of the steering wheel WA, as shown in FIGS. 58A and 58B, at the time of completion of inflation of the airbag 205. For the reason, in the seventh embodiment a distance L0 (see FIG. 56) from a center O of the inflow opening 23 to the joining sections 43b, 61b, and 61c for forming a steering wheel side portion is set to be a length dimension in which the bent section 25 is arranged on the front surface Bf side in the vicinity of a crossing part (corner section) Bc of the front surface Bf on the front portion BF side and the upper surface Bu in the central portion B of the steering wheel WA when inflation is completed in a state of being mounted on the steering wheel WA as the airbag device MA.

In manufacturing the airbag 205 according to the seventh embodiment, similar to the airbag 202 according to the fourth embodiment, the recessed grooves 61d of the tip end part 615F are joined so as to be closed in the protrusion section part 455F of the bag material 405 constituting the steering wheel side portion 22S, the tip edge 61a of the tip end part 615F has an arc shape corresponding to the front edge 32b of the driver side portion 32, as shown in Sections A and B of FIG. 57, and in the sheet-shaped part 475F of the protrusion section part 455F, the folding section 48 is folded, and overlapped right and left edges 49 and 50 and edges 52 and 53 are sewn (joined) to form the support inflation portion 28F having a large volume on a front side, as shown in Section C of FIG. 57. Then, joining portions opposing in front and rear of right and left side edges 61b and 61c extending from both ends of the tip edge 61a to the sheet-shaped part 475F on an inner side and the side edges 43b and 43b of the general section parts 43L and 43R, in an outer peripheral edge of the tip end part 615F of the protrusion section part 455F, are joined to each other, and thus the steering wheel side portion 22S can be formed. Thereafter, in the steering wheel side portion 22S, the driver side joining portion including the tip edge 61a of the tip end part 615F on the front side and the tip edges 43a of the right and left general section parts 43L and 43R is joined to the outer peripheral edge 32a of the driver side portion 32, a front face and a rear face are inverted using the inflow opening 23 so as not to expose a seam allowance, and thus the airbag 205 can be manufactured.

In the airbag 205 according to the seventh embodiment, similar to the fourth embodiment, even if the airbag includes the support inflation portion 28F protruding from the front edge 22b of the steering wheel side portion 22S to increase the volume, the airbag can be easily manufactured by planar sewing.

Similar to the airbag 202 according to the fourth embodiment, the airbag 205 thus manufactured may be assembled to the airbag device MA and mounted on the steering wheel WA.

Figure 54:
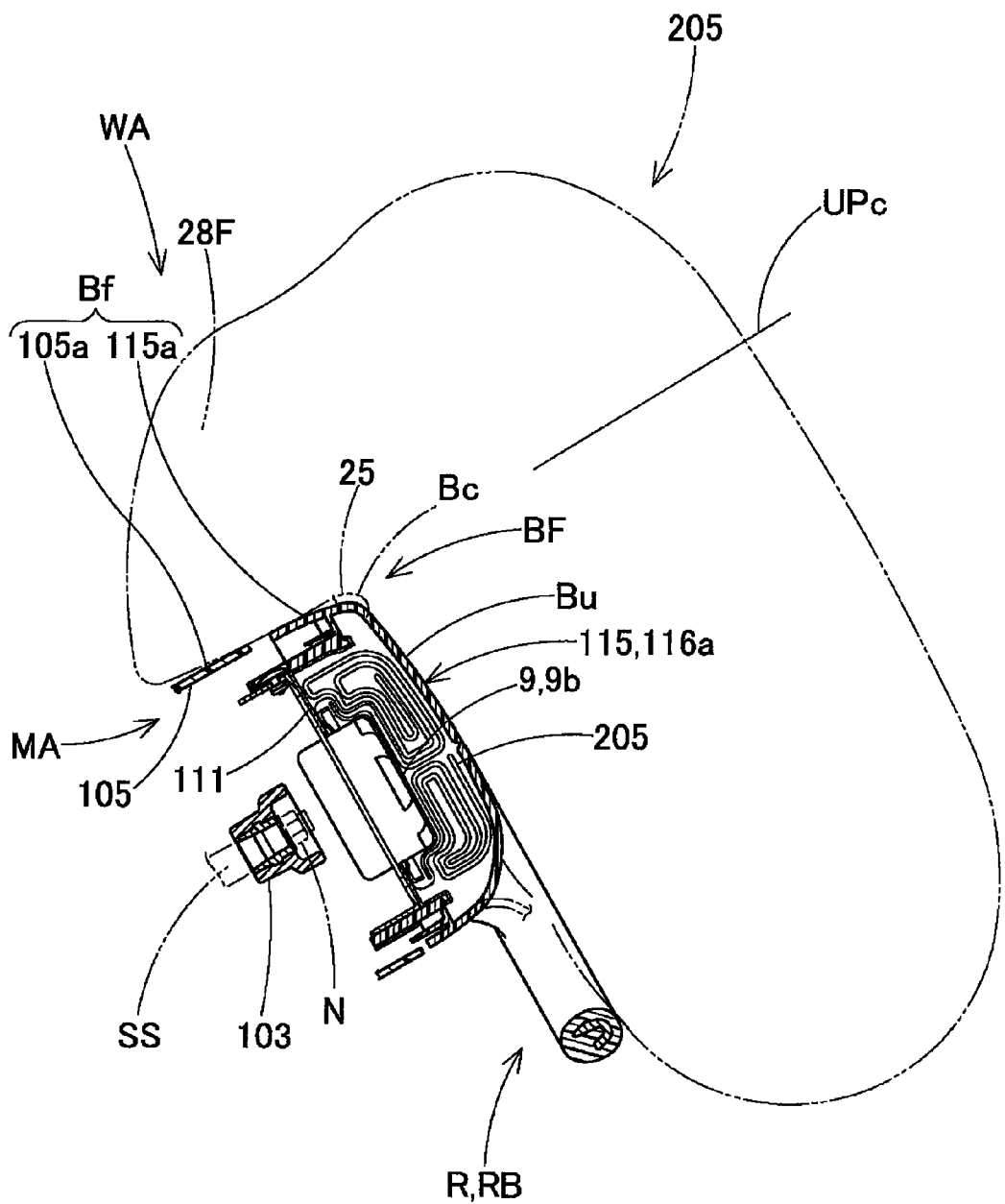
FIG. 54 is a schematic longitudinal sectional view of a driver seat airbag device according to a seventh embodiment.

At the time of operating the driver seat airbag device MA according to the seventh embodiment, in a case where the inflation gas G from the inflator 9 flows into the airbag 205 through the inflow opening 23 and the airbag 205 is inflated, the door portions 116a and 116a of the airbag cover 115 are pushed to open, and as shown in a two-dot chain line in FIG. 54 or FIG. 58A, inflation is completed so that the airbag 205 protrudes from the case 111 as a storage part, covers the upper surface Wu side of the steering wheel WA, and is supported by the upper surface Wu side. In particular, in the seventh embodiment, the support surface portion 29 of the support inflation portion 28F and the joining sections 43b, 61b, and 61c forming a steering wheel side portion are arranged so that the steering wheel side portion 22S of the airbag 205 at the time of completion of inflation is along the front surface Bf side of the steering wheel WA, in a direction along the steering shaft SS of the steering wheel WA. For the reason, since the support surface portion 29F of the support inflation portion 28F of the steering wheel side portion 22S can be abutted to and supported by the front surface Bf side of the steering wheel WA having a wide area, even if the front edge 32b side of the driver side portion 32 is inclined so as to be deflated downward when inflation is completed in a state of mounting on the steering wheel WA and a driver is received, the support inflation portion 28F causes the support surface portion 29 to be abutted to the front surface Bf side of the steering wheel WA, and the airbag 205 can immediately secure counterforce. As a result, the airbag 205 can rapidly and accurately receive a driver heading for the steering wheel WA having a short front portion side by the driver side portion 32 disposed so as to face a driver without inclining.

In the seventh embodiment, in the airbag 205 after completing inflation, the support surface portion 29F of the support inflation portion 28F is abutted to and supported by not only the vicinity of a central portion 29a in the vertical direction but also the front side 115a of the airbag cover 115 including a back surface side the opened door portion 116a on the front surface Bf side of the steering wheel WA or the front surface 105a of the lower cover 105, in a wide area from the vicinity of base portion 29b in the vicinity of the bent section 25 to the vicinity of the tip end 29c.

As the airbag 205 at the time of completion of inflation, in a case where a surface including the vicinity of a central portion 29a of the support surface portion 29F at least in the vertical direction is abutted to and supported by the front surface Bf side of the steering wheel WA, in a side view observed from the right and left direction at the time of completion of inflation, the joining site 44 of the joining sections 43b, 61b, and 61c forming a steering wheel side portion to the driver side portion 32 may be caused to coincide with the reference line UPc of a direction along the steering shaft SS of the steering wheel WA on the front surface Bf side of the steering wheel WA, or the joining site and the reference line may be shifted forward or backward.

Figure 59A:
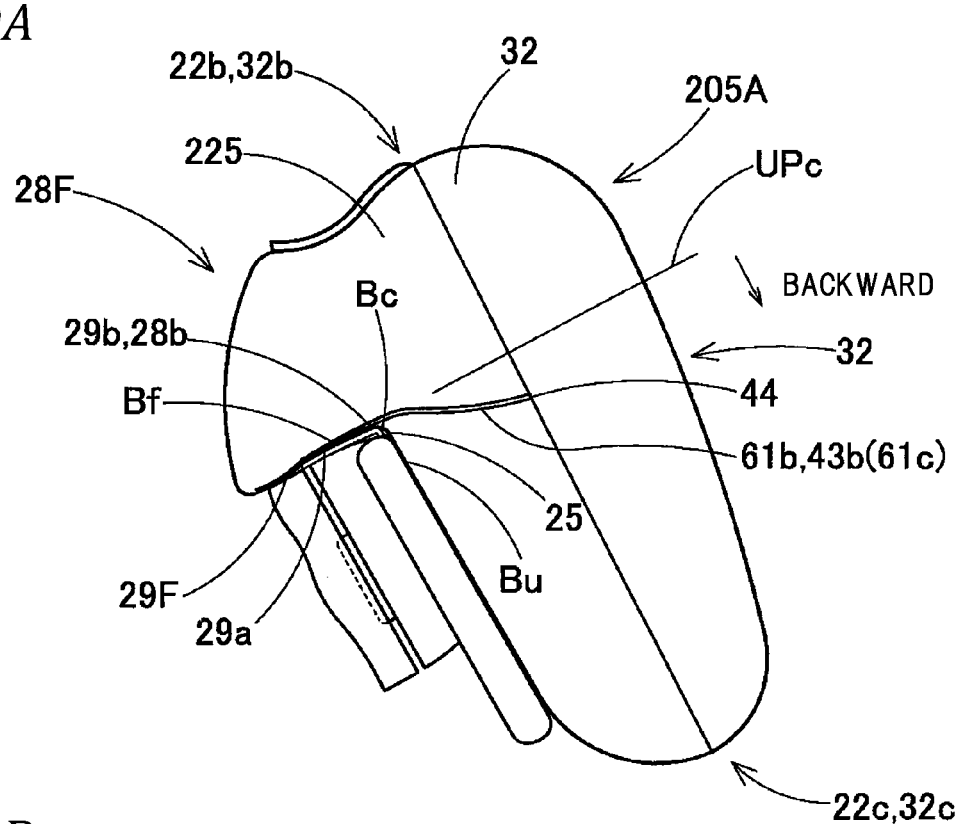
FIGS. 59A and 59B are views illustrating a modification of the airbag according to the seventh embodiment, and schematic side views of a time of inflation of airbags in which bent sections (boundary position) of the steering wheel side portion are shifted to a front side and a rear side respectively.
Figure 59B:
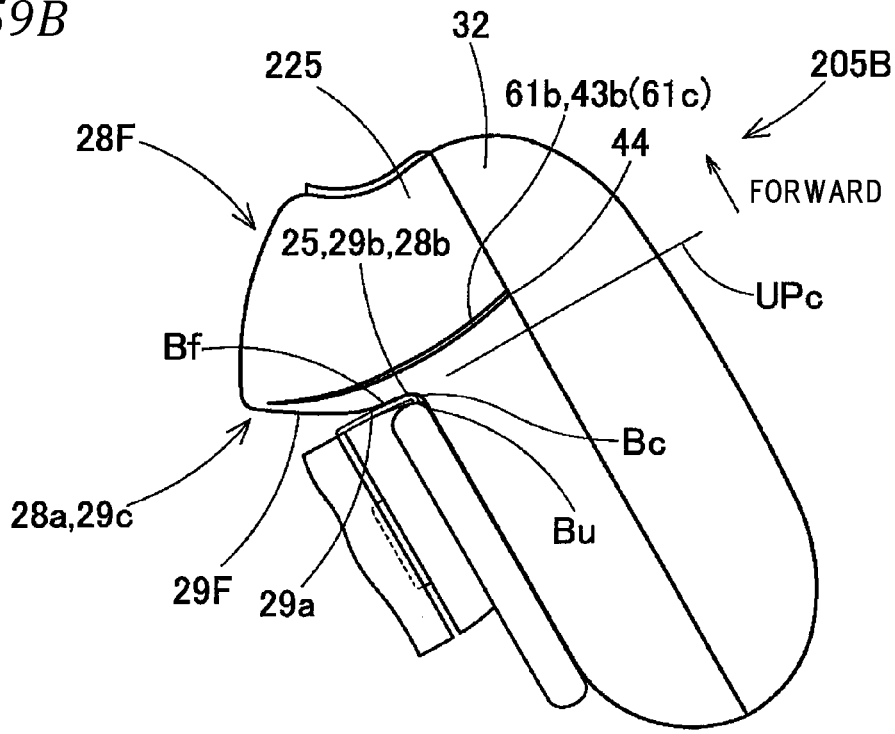

That is, the airbag 205 may adopt the same configuration as airbags 205A and 205B shown in FIGS. 59A and 59B.

In the airbag 205A, in a side view observed from the right and left direction at the time of completion of inflation, the joining site 44 of the joining sections 43b, 61b, and 61c forming a steering wheel side portion to the driver side portion 32 is arranged on a rear side from the reference line UPc of a direction along the steering shaft SS of the steering wheel WA on the front surface Bf side of the steering wheel WA. In other words, the distance L0 from the center O of the inflow opening 23 of the steering wheel side portion 22S to the joining sections 43b, 61b, and 61c or the boundary part 25 becomes a distance L0b shown in a two-dot chain line in FIG. 56.

In the airbag 205B, in a side view observed from the right and left direction at the time of completion of inflation, the joining site 44 of the joining sections 43b, 61b, and 61c forming a steering wheel side portion to the driver side portion 32 is arranged on a front side from the reference line UPc of a direction along the steering shaft SS of the steering wheel WA on the front surface Bf side of the steering wheel WA. In other words, the distance L0 from the center O of the inflow opening 23 of the steering wheel side portion 22S to the joining sections 43b, 61b, and 61c or the boundary part 25 becomes a distance L0f shown in a two-dot chain line in FIG. 56.

In the airbag 205A in which the joining site 44 is arranged on a rear side from the reference line UPc, at the time of completion of inflation, the boundary part (bent section) 25 of the front edge side of the attaching seat 24 with the support inflation portion 28F is in a state of being abutted to and supported by the upper surface Bu side shifted to the rear side from the front surface Bf side of the front portion BF of the steering wheel WA, and counterforce received by the support surface portion 29F of the support inflation portion 28F from the front surface Bf side of the steering wheel WA generates a moment for directing the rear edge 32c of the driver side portion 32 downward by setting the vicinity of the boundary part 25 shifted backward as a rotation center. As a result, as shown in FIGS. 59A and 59B the rear edge 32c side of the driver side portion 32 is shifted downward to lead to inclining the driver side portion 32, and thus it is desirable that backward shifting bs does not exceed 50 mm.

In the airbag 205B in which the joining site 44 is arranged on a front side from the reference line UPc, the boundary part (bent section) 25 of the front edge side of the attaching seat 24 with the support inflation portion 28F is in a state of being abutted to and supported by the front surface Bf side distant from the upper surface Bu side of the front portion BF side of the steering wheel WA, and the support surface portion 29F of the support inflation portion 28F causes the vicinity of the base portion 29b to be abutted to the front surface Bf of the steering wheel WA. However, the part of the front edge side of the attaching seat 24 is also abutted to the front surface Bf side of the steering wheel, a force of pushing the base portion 28b side of the support inflation portion 28F against the front side is generated, the tip end 29c side is easily separated from the front surface Bf of the steering wheel WA, and it is difficult for the support inflation portion 28F to rapidly secure counterforce from the front surface Bf of the steering wheel, which is not preferable. Therefore, it is desirable that forward shifting fs does not exceed 50 mm.

That is, as the airbag 205 including the support inflation portion 28F on the front side, in a side view observed from the right and left direction at the time of completion of inflation, it is desirable that the joining site 44 of the joining sections 43b, 61b, and 61c forming a steering wheel side portion to the driver side portion 32 is arranged within the range of being shifted by 50 mm forward and backward when the reference line UPc on the front surface Bf side of the steering wheel WA is set to a center.

In other words, in the airbag 205 at the time of completion of inflation, it is desirable that the bent section 25 is arranged in the vicinity of the crossing part Bc of the front surface Bf and the upper surface Bu on the front portion BF side of the steering wheel WA, and preferably on the front surface Bf side in the vicinity of the crossing part Bc.

An outer diameter dimension D0 of the driver side portion 32 according to each embodiment in a state of being flatly deployed is approximately 700 mm, and an opening diameter d0 of the inflow opening 23 is approximately 65 mm.

Figure 60:
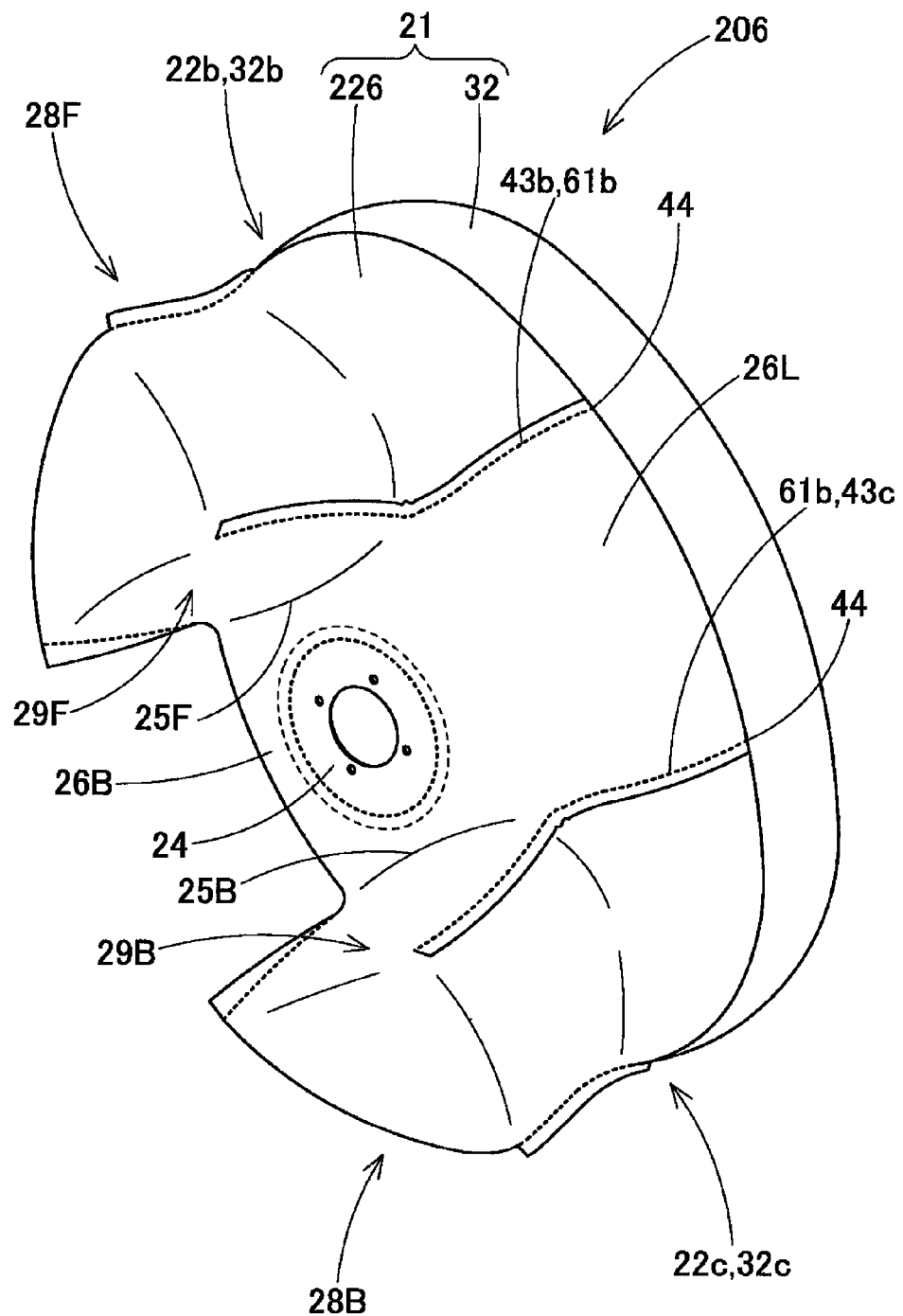
FIG. 60 is a schematic perspective view of an airbag according to an eighth embodiment at the time of inflation.
Figure 61:
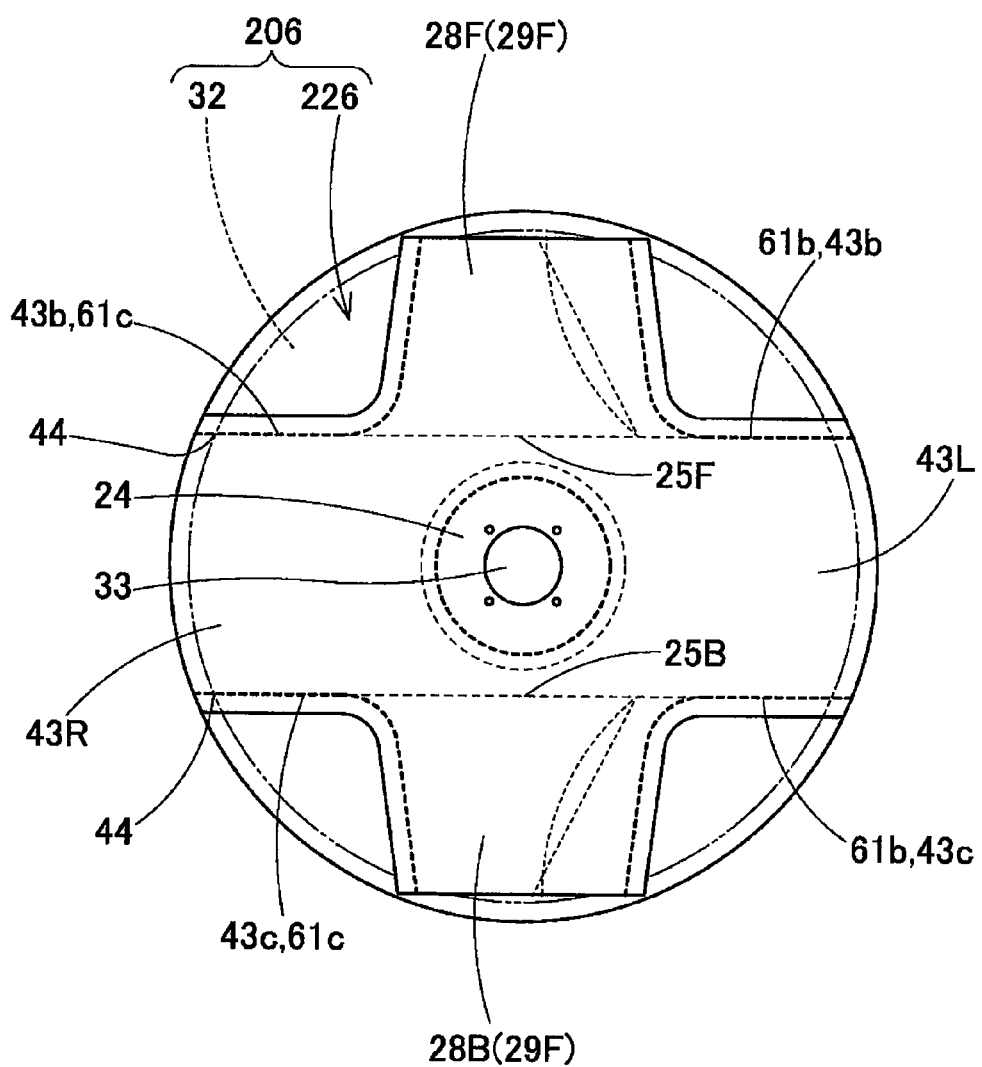
FIG. 61 is a plan view illustrating a steering wheel side portion of the airbag according to the eighth embodiment.
Figure 62:
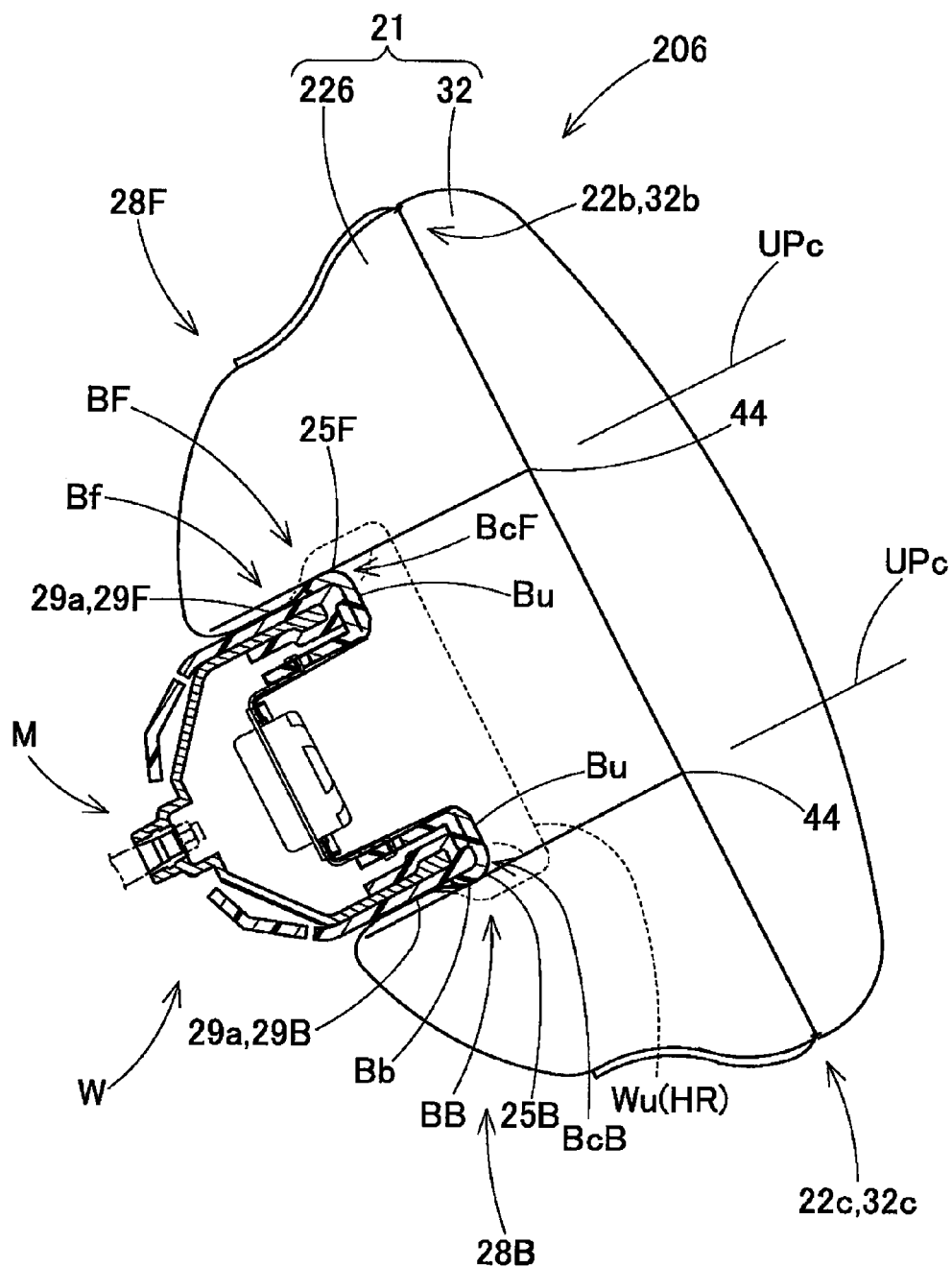
FIG. 62 is a schematic longitudinal sectional view of a time of inflation of the airbag in the airbag device according to the eighth embodiment.
Figure 63:
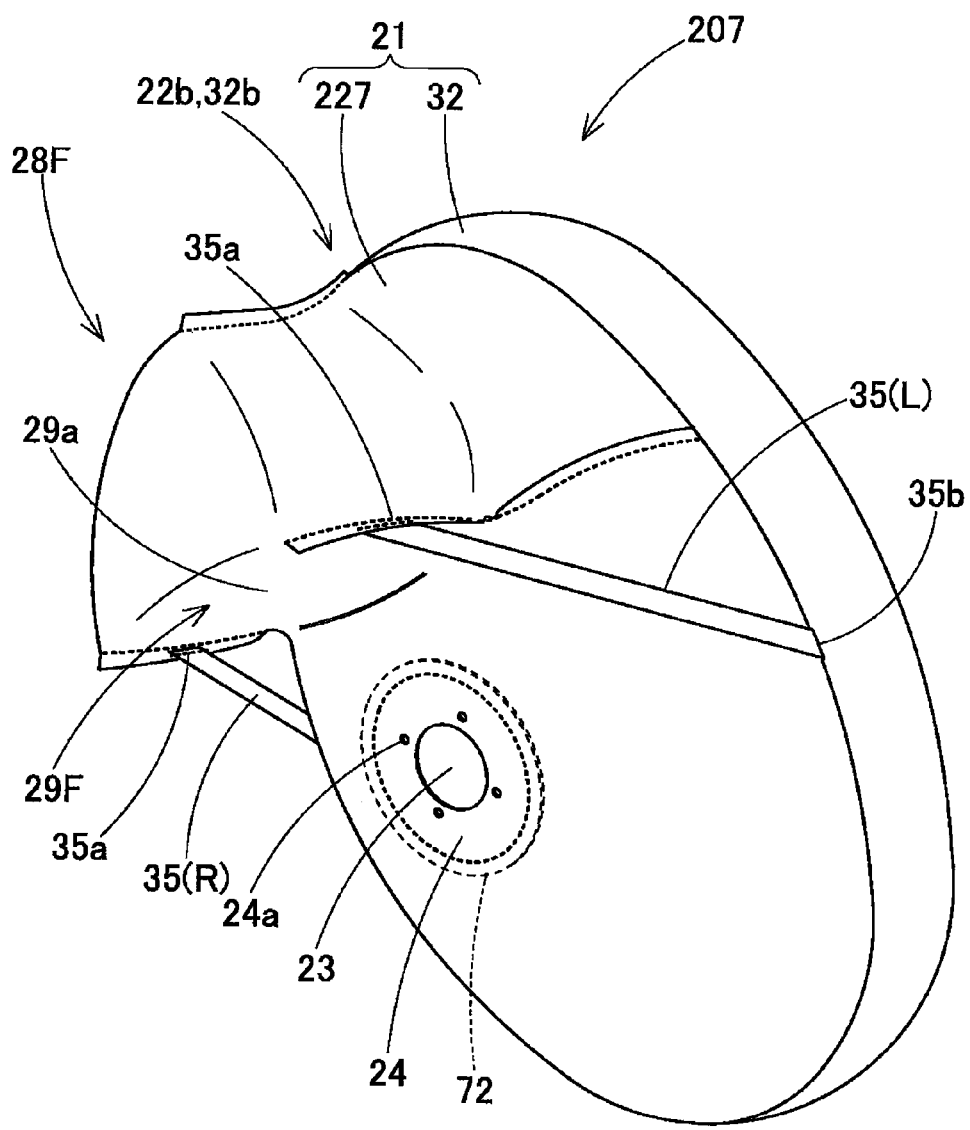
FIG. 63 is a schematic perspective view of an airbag according to a ninth embodiment at the time of inflation.
Figure 64:
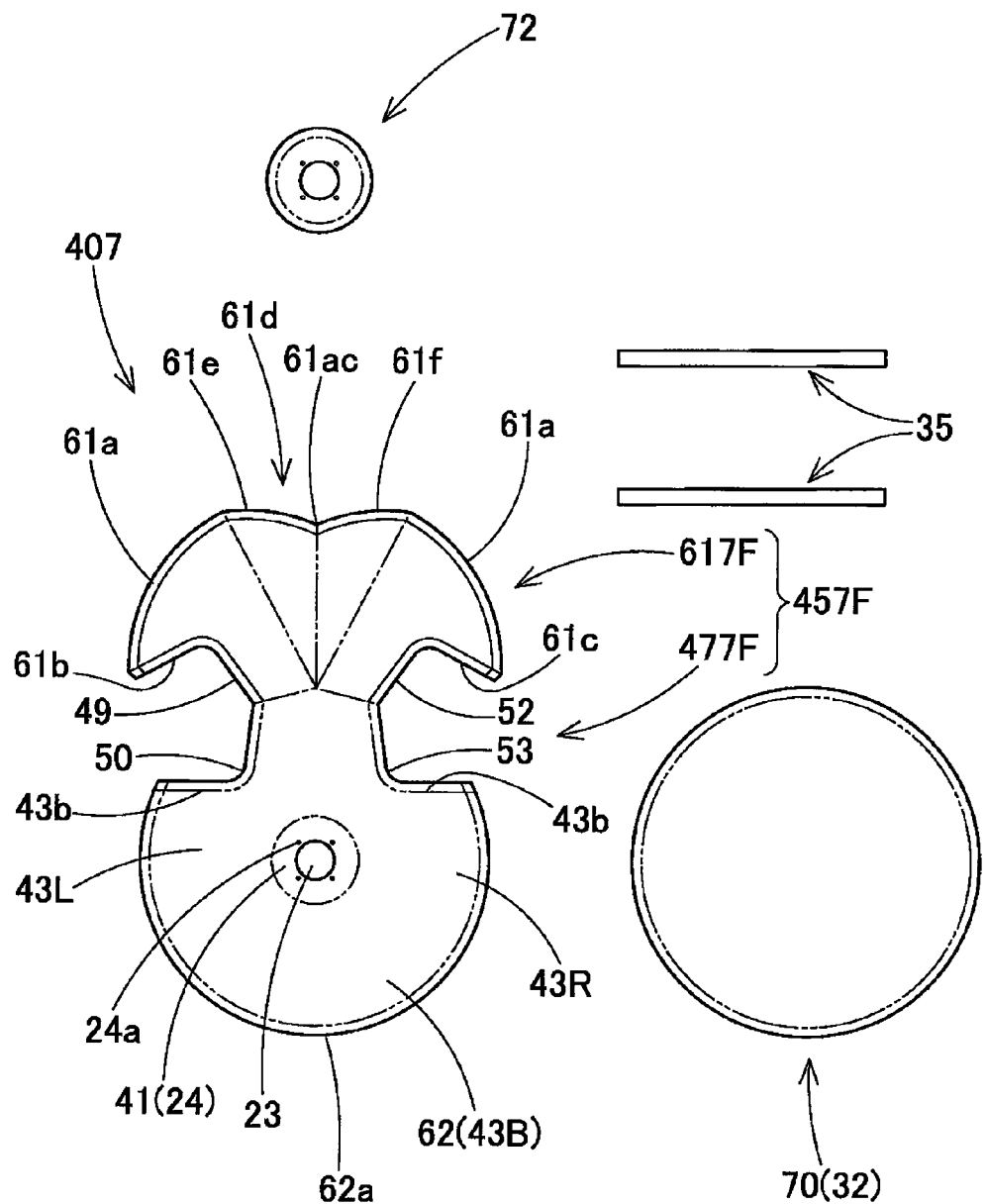
FIG. 64 is a plan view of a bag material for manufacturing the airbag according to the ninth embodiment.
Figure 65:
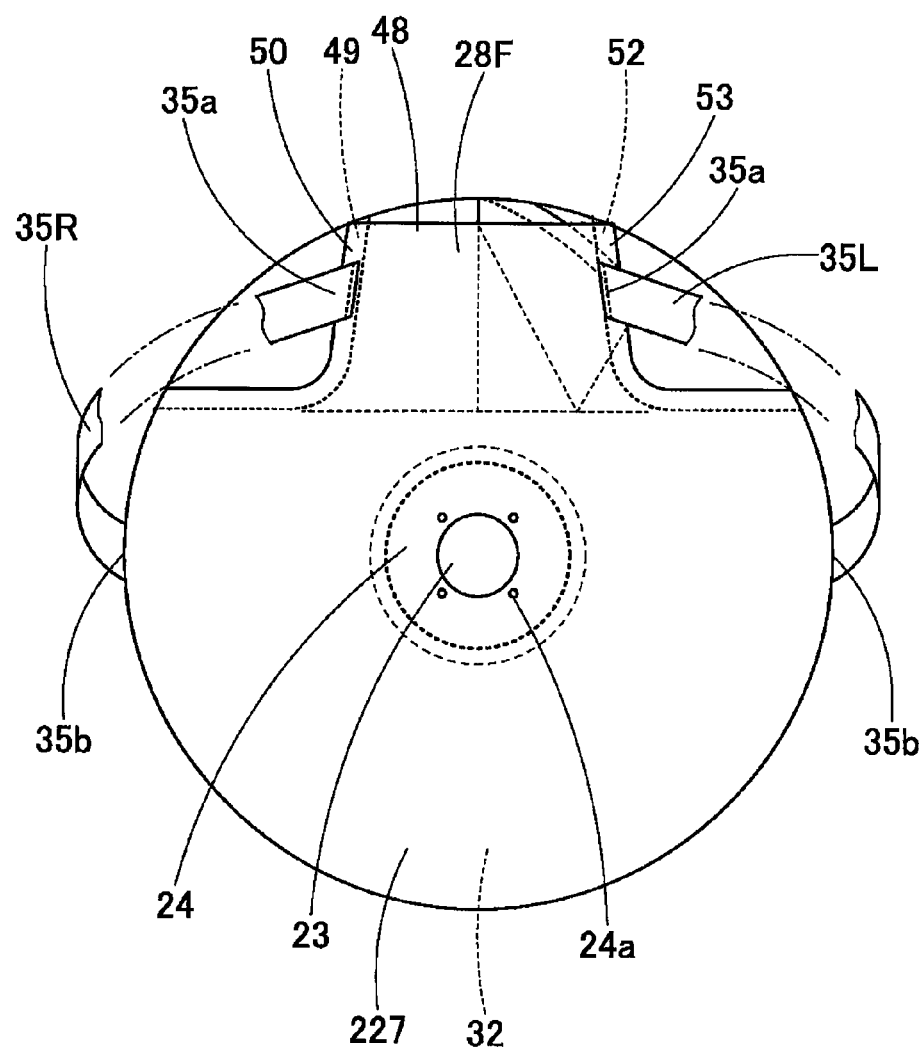
FIG. 65 is a bottom view of the airbag according to the ninth embodiment.

As the airbags 205, 205A, and 205B, the boundary part 25 of the support inflation portion 28F and the attaching seat 24 is disposed in the vicinity of the crossing part Bc of the front surface Bf and the upper surface Bu on the front portion BF side in the central portion B of the steering wheel WA. A configuration in which the support surface portion 29F of the support inflation portion 28F is abutted to and supported by the wide front surface Bf can be also applied to a case where the support inflation portion 28B on the rear side is provided as an airbag 206 according to an eighth embodiment shown in FIGS. 60 to 62.

That is, the airbags 206 according to the eighth embodiment is approximate to the airbags 201 according to the third embodiment shown in FIG. 20, but a boundary part 25F of the front support inflation portion 28F and the attaching seat 24 is arranged on the front surface Bf side (the vicinity of the reference line UPc of the front surface Bf side) in the vicinity of a crossing part BcF of the front surface Bf and the upper surface Bu on the front portion BF side of the central portion B of the steering wheel W, and a boundary part 25B of the rear support inflation portion 28B and the attaching seat 24 is arranged on the rear surface Bb side (the vicinity of the reference line UPc of the rear surface Bb side) in the vicinity of a crossing part BcB of the rear surface Bb and the upper surface Bu on the rear portion BB side of the central portion B of the steering wheel W.

For the reason, in the airbag 206, it is possible to abut and support the support surface portion 29F of the support inflation portion 28F to and by the wide front surface Bf, and to abut and support the support surface portion 29B of the support inflation portion 28B to and by the wide rear surface Bb.

In the airbag 206, similar to the airbags 201 according to the third embodiment, the rear support inflation portion 28B is arranged in a steering wheel side portion 226 (bag material 406) symmetrically to the front support inflation portion 28F in the forward and backward direction, and the same reference numerals are applied to parts which are the same as those in the airbag 201.

In a case where the support surface portion 29F is abutted to and supported by the front surface Bf of the steering wheel W in a wide area, a configuration of an airbag 207 according to a ninth embodiment shown in FIGS. 63 to 67 may be adopted.

In the airbag 207, straps 35 (L and R) having flexibility can be pulled in a direction in which the support surface portion 29F in the support inflation portion 28F at the time of completion of inflation is pressed against the front surface Bf side of the steering wheel WA, and arranged so as to couple the support inflation portion 28F to a part of an outer peripheral wall 21 of the airbag 207 on a rear side of the support inflation portion 28F.

Specifically, in each of the right and left straps 35, a base portion 35b side is joined (sewn) between the driver side portion 32 and a steering wheel side portion 227 in the vicinity of a center in the forward and backward direction on both of right and left sides of the airbag 207, and a tip end portion 35a side is joined to an intermediate part in the vertical direction of the support inflation portion 28F. More specifically, the tip end portion 35a side is formed by carrying out sewing to the vicinity of an intermediate position in the vertical direction of the edges 49 and 50 and the edges 52 and 53 overlapped by folding from the folding section 48 of a sheet-shaped part 477F in a protrusion section part 457F of a bag material 407 forming the steering wheel side portion 227.

Figure 66:
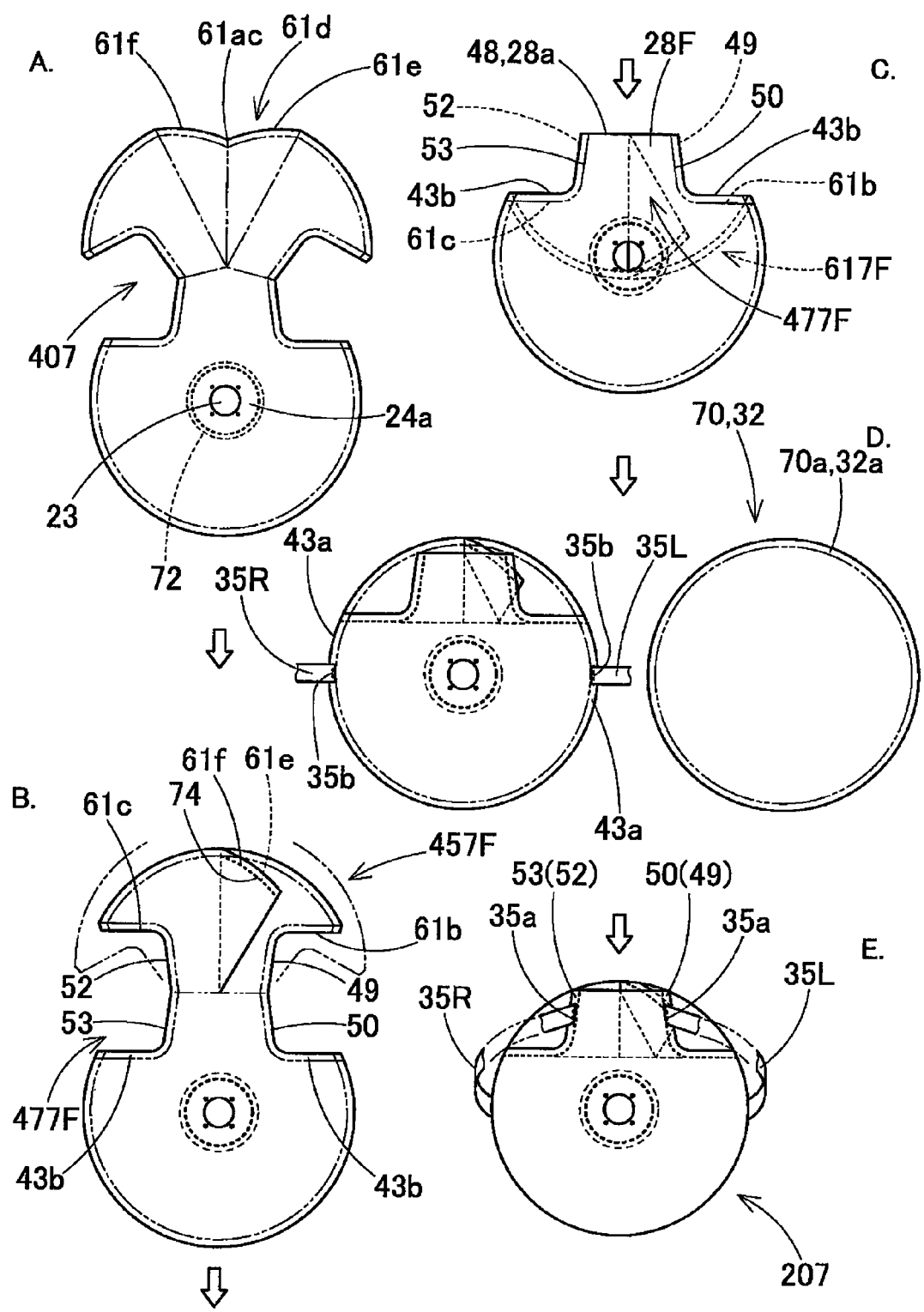
FIG. 66 is a view illustrating a time of manufacturing the airbag according to the ninth embodiment.

That is, in the airbag 207, as shown in Sections A, B and C of FIG. 66, the recessed grooves 61d of a tip end part 617F in the protrusion section part 457F of the bag material 407 constituting the steering wheel side portion 227 are joined so as to be closed, the tip edge 61a of the tip end part 617F has an arc shape corresponding to the front edge 32b of the driver side portion 32, and in the sheet-shaped part 477F of the protrusion section part 457F, the folding section 48 is folded, and overlapped right and left edges 49 and 50 and edges 52 and 53 are sewn (joined) to form the support inflation portion 28F having a large volume on a front side. The joining portions opposing in front and rear of the right and left side edges 61b and 61c extending from both ends of the tip edge 61a to the sheet-shaped part 477F on the inner side in an outer peripheral edge of the tip end part 617F of the protrusion section part 455F, and the side edges 43b and 43b of the general section parts 43L and 43R are joined to each other, and thus the steering wheel side portion 227 can be formed. Thereafter, as shown in Section D of FIG. 66, the base portion 35b side of the right and left straps 35L and 35R is disposed on a predetermined position the tip edge 43a of the general section parts 43L and 43R of the steering wheel side portion 227, and the driver side joining portion of the tip edge 61a of the tip end part 617F on the front side in the steering wheel side portion 227 and the tip edges 43a of the right and left general section parts 43L and 43R is joined to the outer peripheral edge 32a of the driver side portion 32, together with the base portion 35b of the strap 35. Then, a front face and a back face are inverted using the inflow opening 23 so as not to expose a seam allowance, the tip end portions 35a of the right and left straps 35L and 35R is joined to parts of the right and left edges 49 and 50 or edges 52 and 53 of the support inflation portion 28F, and thus the airbag 207 can be manufactured. Similar to the airbag 202 according to the fourth embodiment or the like, the airbag 207 thus manufactured may be assembled to the airbag device MA and mounted on the steering wheel WA.

Figure 67:
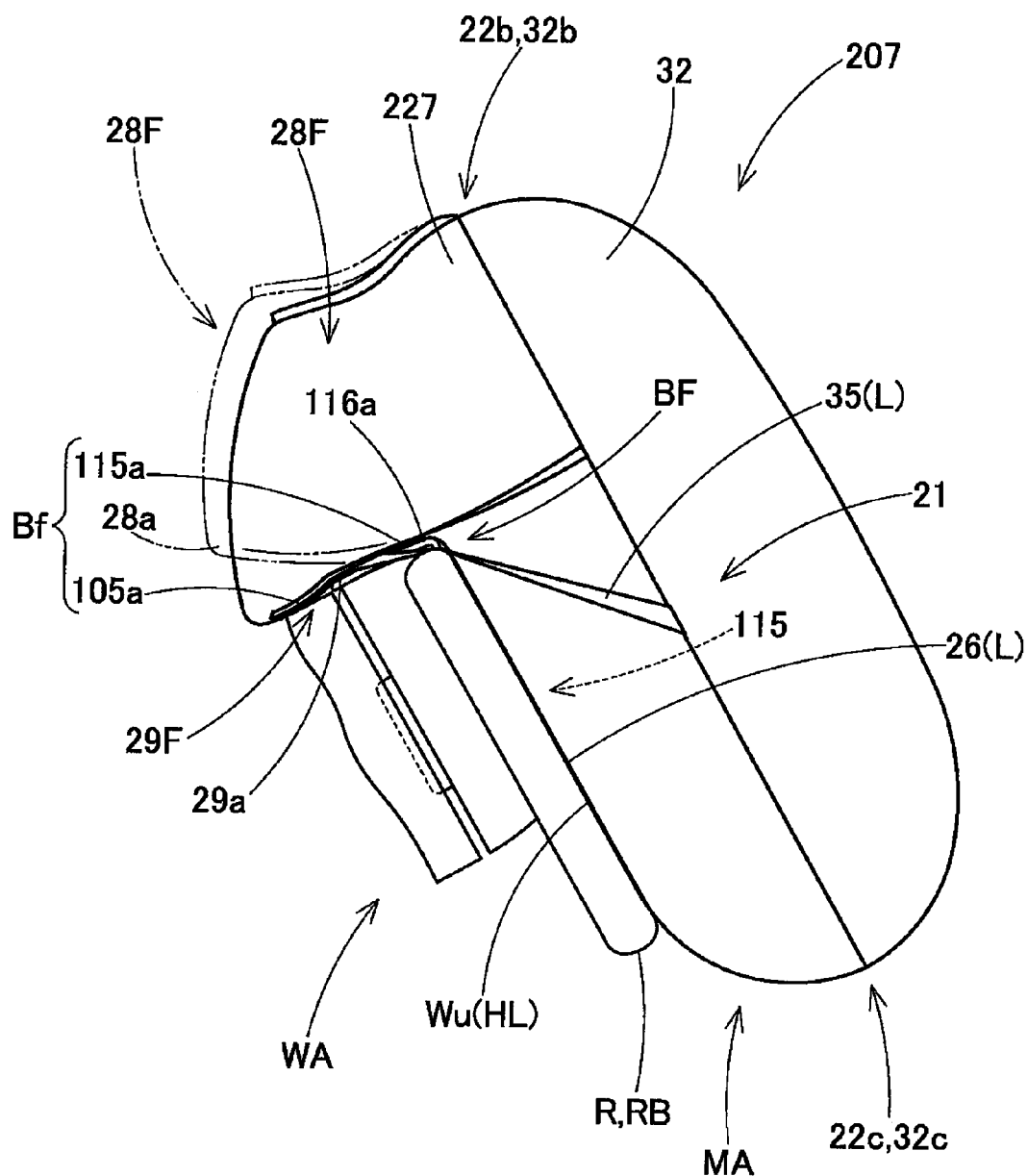
FIG. 67 is a schematic side view of a time of inflation of the airbag in the airbag device according to the ninth embodiment.

At the time of operating the driver seat airbag device MA according to the ninth embodiment, in a case where the inflation gas flows into the airbag 207 through the inflow opening 23 and the airbag 207 is inflated, the door portion 116a of the airbag cover 115 is pushed to open, and as shown in FIG. 67, inflation is completed so that the airbag 207 protrudes from the case 111 (not shown) as a storage part, covers the upper surface Wu side of the steering wheel WA, and is supported by the upper surface Wu side.

In the ninth embodiment, when inflation is completed inflation in a state of mounting on the steering wheel WA and a driver is received, the support surface portion 29F of the support inflation portion 28F is already pressed against the front surface Bf side of the steering wheel WA by the straps 35L and 35R, and the airbag 207 easily receives counterforce from the front surface Bf side of the steering wheel WA. In the airbag inflated in a state where the straps 35L and 35R are not provided, as shown in a two-dot chain line in FIG. 67, the vicinity of the tip end portion 28a of the support inflation portion 28F is in a state of floating from the lower part of the front surface Bf of the steering wheel WA, that is, from the vicinity of the front surface 105a of the lower cover 105 to the front side. For the reason, in the airbag 207 according to the ninth embodiment after completing inflation, not only the vicinity of center 29a of the support surface portion 29F of the support inflation portion 28F but also an approximately whole area from the base portion 29b to the vicinity of the tip end 29c can be abutted to and supported by the front surface Bf of the steering wheel WA including the front surface 105a side of the lower cover 105, and without occurrence of falling off of the front edge 32b side, the airbag can rapidly receive and protect a driver heading for the steering wheel WA having a short front portion side in a stable state. The straps 35L and 35R have flexibility, and thus are folded and stored in a storage part with the airbag 207 without hindrance during the folding storage of the airbag 207.

When the support surface portion of the support inflation portion is pressed against the front surface Bf side of the steering wheel WA by using straps, in a case where the support surface portion can be pressed against the front surface Bf side, the strap may join the tip end portion to the tip end portion side of both of right and left edges of the support inflation portion, and join the base portion side to the outer peripheral wall of the airbag on the rear side of the support inflation portion. In a case where the airbag includes the rear support inflation portion, the strap may be provided on the rear support inflation portion side so as to press the support surface portion of the rear support inflation portion against the rear side of the steering wheel.

Figure 68:
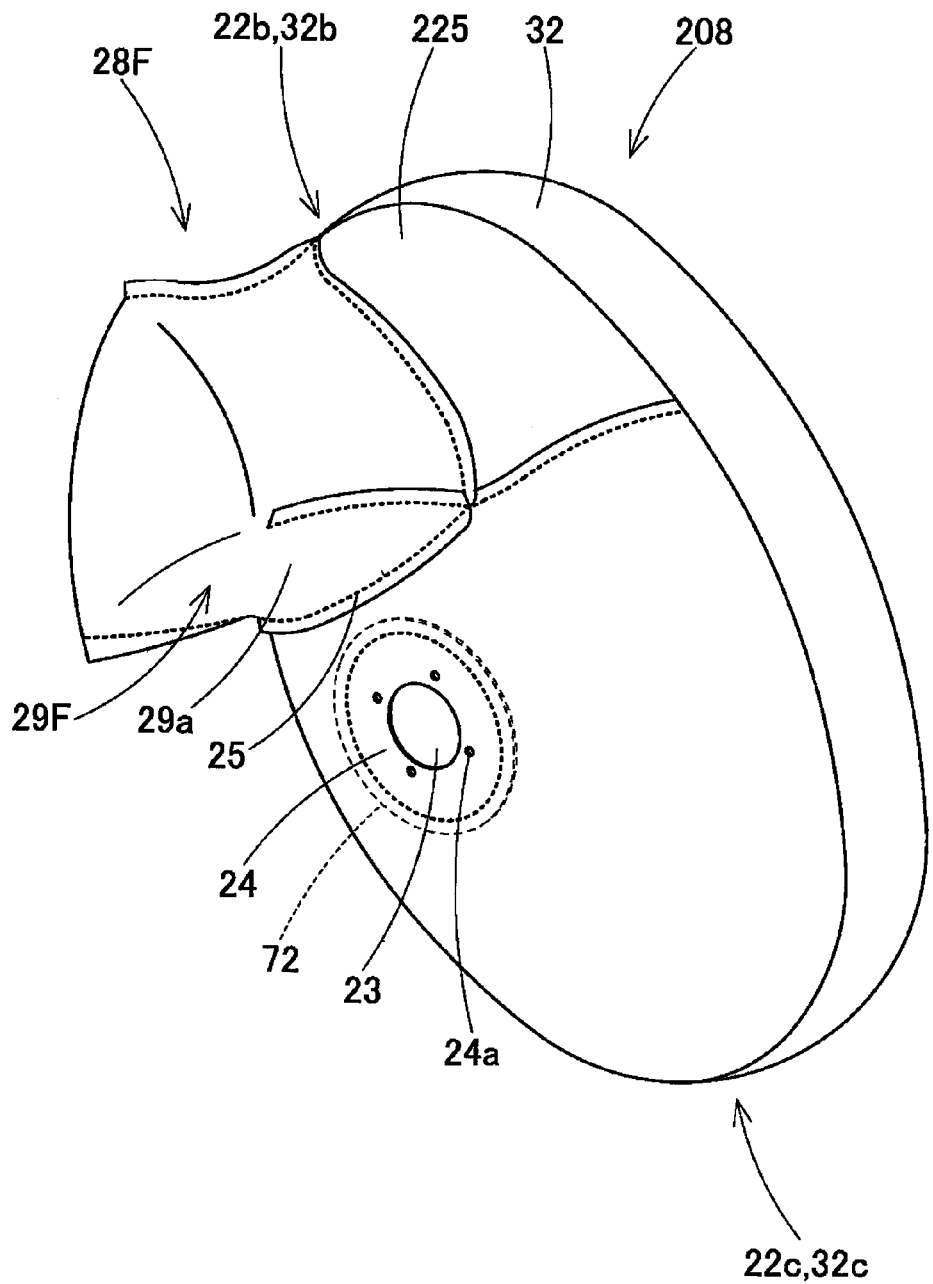
FIG. 68 is a schematic perspective view of an airbag according to a tenth embodiment at the time of inflation.
Figure 69:
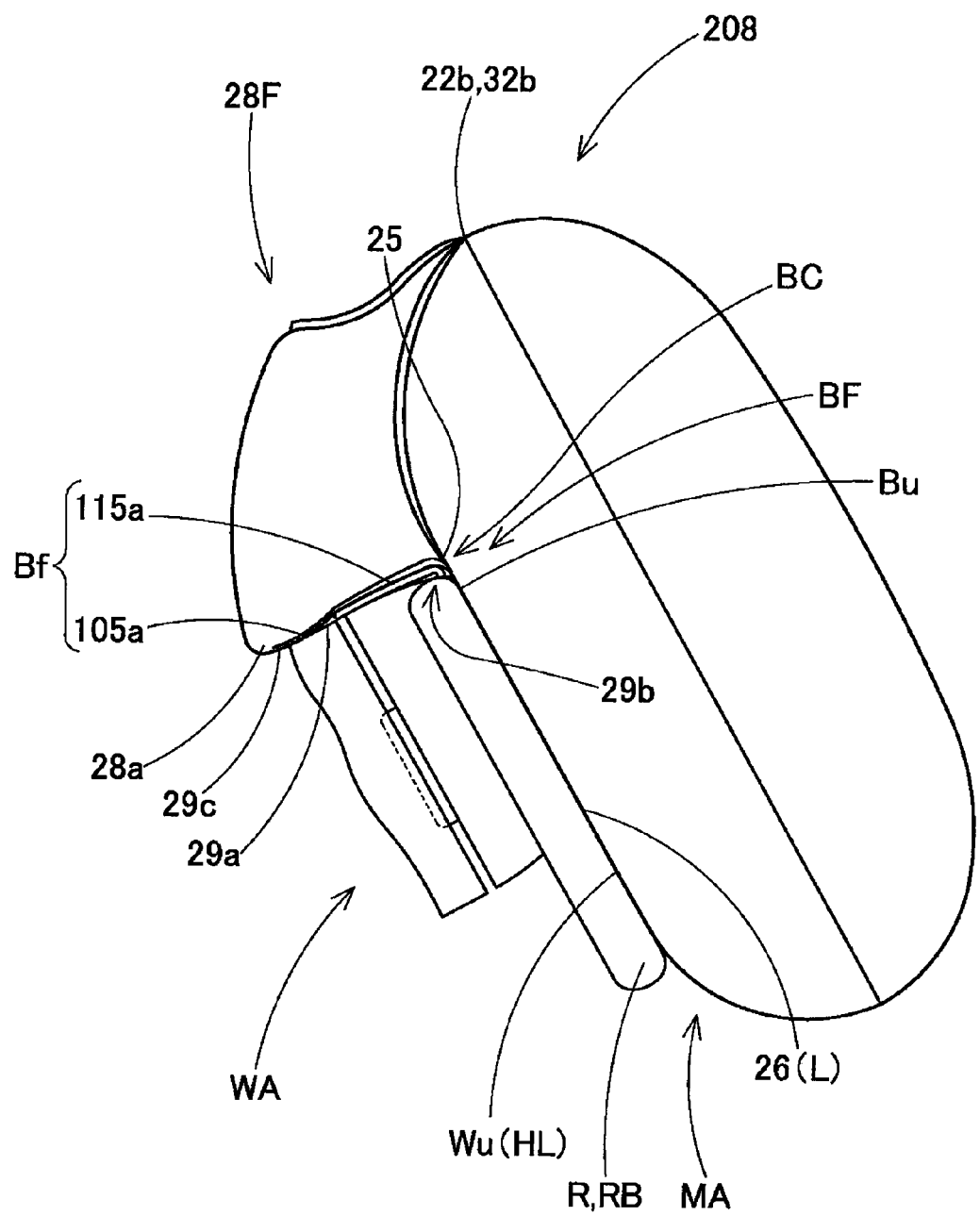
FIG. 69 is a schematic side view of the airbag according to the tenth embodiment at the time of inflation.

In a case where the front support inflation portion abutted and supported in a wide area is provided on the front surface side of the central portion of the steering wheel, the shape is not limited to the shapes of the bag materials 405, 406, and 407 of the airbags 205, 206, and 207 according to the seventh to ninth embodiments, for example, the support inflation portion 28F may be separately joined and arranged on the steering wheel side portion 225 as an airbag 208 according to a tenth embodiment shown in FIGS. 68 and 69. In the airbag 208, as configurations of characteristic parts of the airbag 205 according to the seventh embodiment, the support inflation portion 28F at the time of completion of inflation protrudes downward from the front edge 22b of the steering wheel side portion 225, the support surface portion 29F of the support inflation portion 28F at the time of completion of inflation has the bent section 25 along the right and left direction on the front side of the attaching seat 24 and has an approximately rectangular planar shape extending downward from the front portion side of the attaching seat 24, the bent section 25 at the time of completion of inflation is arranged on the front surface Bf side in the vicinity of a crossing part Bc of the front surface Bf and the upper surface Bu on the front portion BF side of the steering wheel WA, and the support surface portion 29F.

In such a configuration, as shown in FIG. 69, the support inflation portion 28F at the time of completion of inflation is inflated so as to extend downward from the bent section 25 between the support inflation portion and the front and rear of the attaching 24, and in this case, since the bent section 25 is arranged in the vicinity of a crossing part Bc of the front surface Bf and the upper surface Bu on the front portion BF side of the steering wheel WA, the approximately rectangular planar support surface portion 29F extending downward from the bent section 25 is easily arranged so that not only the upper edge (base portion) 29b side on the bent section 25 side but also the vicinity of the intermediate part (central portion) 29a in vertical direction or the tip end 29c side is abutted to and supported by the front surface Bf side of the steering wheel WA. For the reason, even if a driver is received so as to deflate the front edge 32b side of the airbag 208, immediately, the support surface portion 29F of the support inflation portion 28F receives counterforce from the front surface Bf side of the steering wheel WA abutted in a wide area, the front edge side 32b of the airbag 208 is prevented from being deflated, and the airbag can 205 accurately receive and protect a driver heading for the steering wheel WA by the driver side portion 32 facing a driver. Since the support inflation portion 28F protrudes downward from the front edge 22b of the steering wheel side portion 225 and has a large volume, the support inflation portion 28F can secure great counterforce, and even if a driver having great kinetic energy moves so as to be inclined to the front edge 32b side of the airbag 205, the driver side portion 32 of the airbag 208 can accurately receive a driver by facing a driver without inclining.

Figure 70:
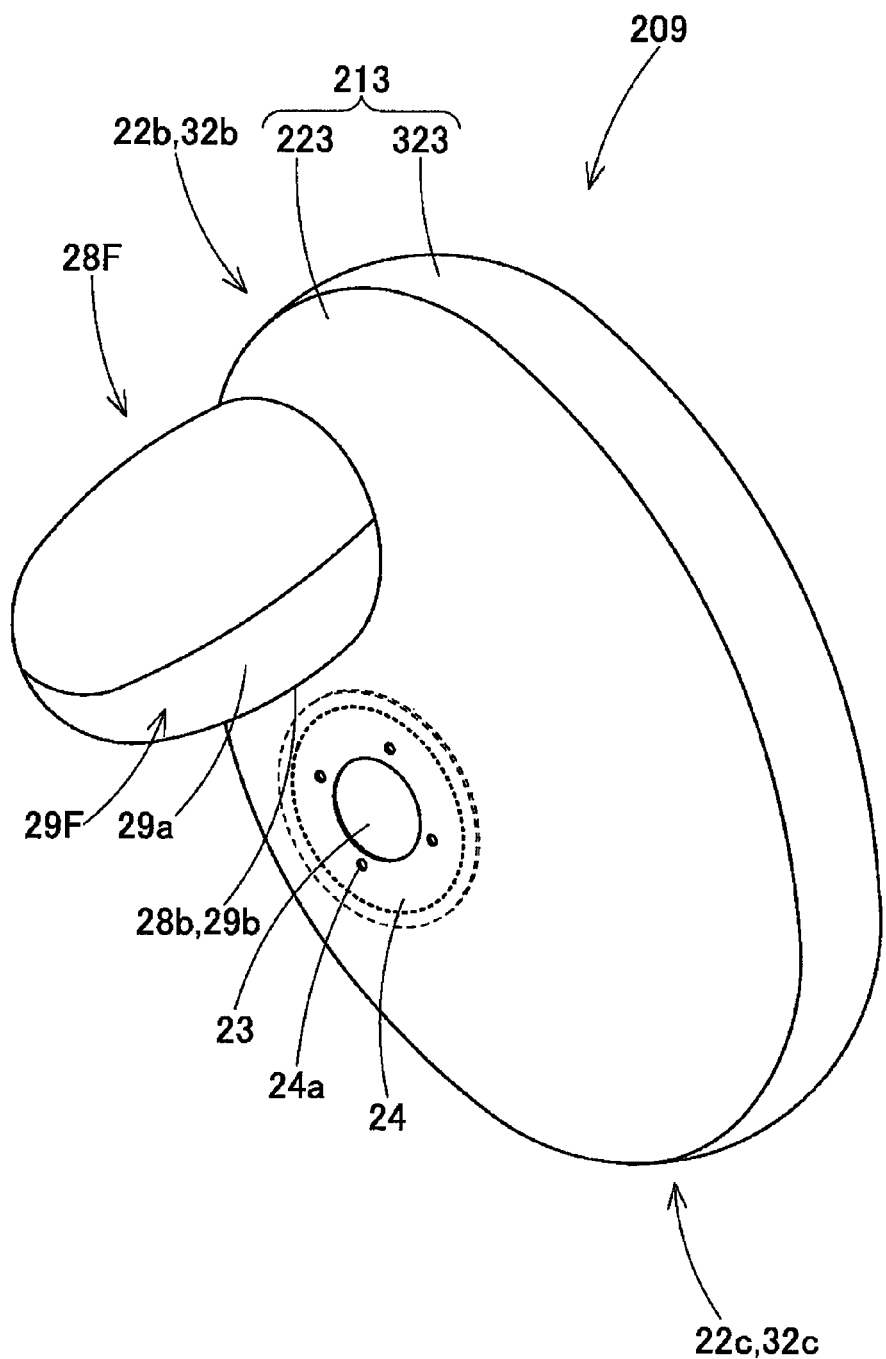
FIG. 70 is a schematic perspective view of an airbag according to an eleventh embodiment at the time of inflation.
Figure 71:
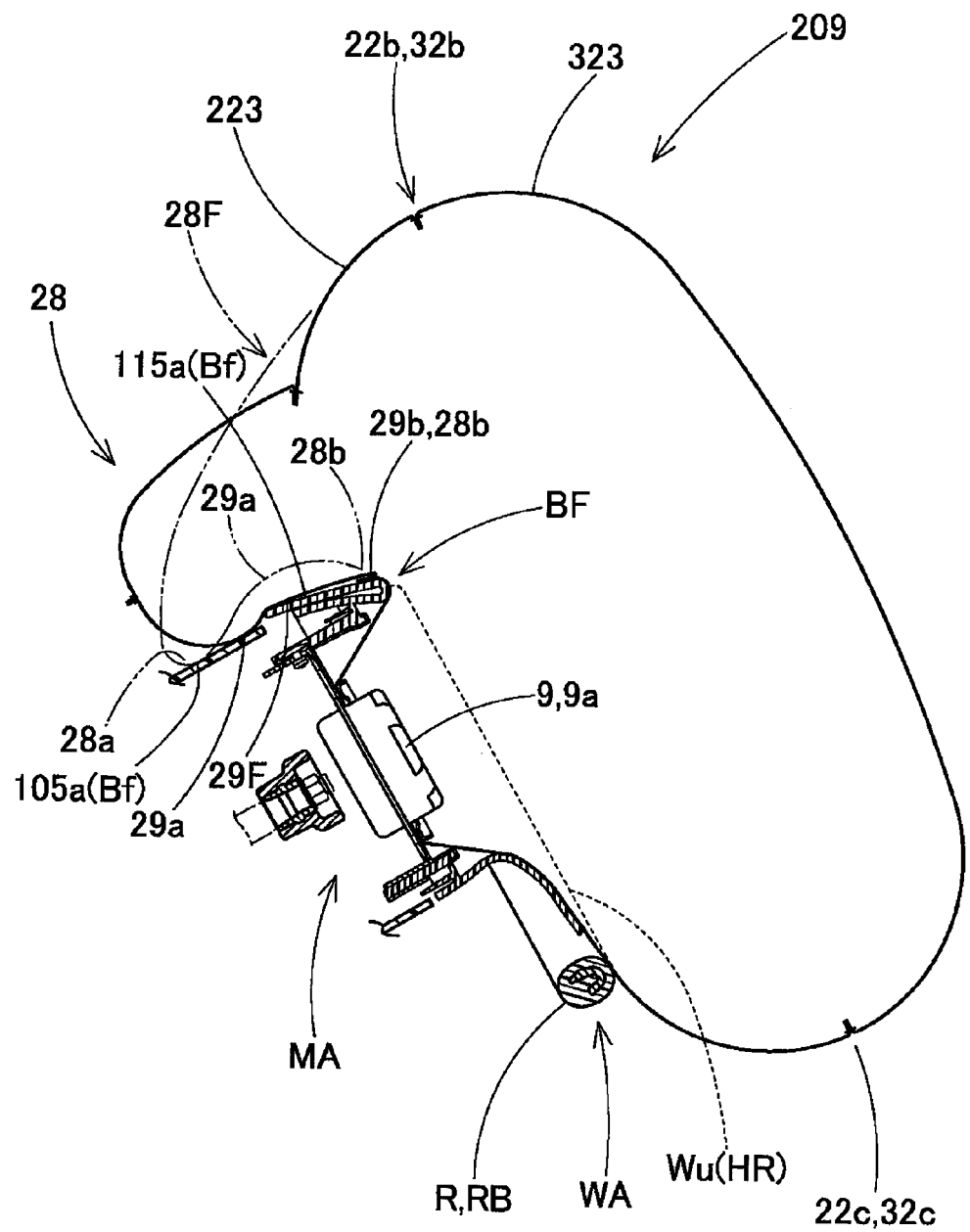
FIG. 71 is a schematic longitudinal sectional view of a time of inflation of the airbag in the airbag device according to the eleventh embodiment.

As an airbag 209 an eleventh embodiment shown in FIGS. 70 and 71, in the support inflation portion 28F at the time of completion of inflation, at least the vicinity of the approximate central portion 29a of the support surface portion 29F in the right and left direction is abutted to and supported by the front surface Bf side of the steering wheel WA. The airbag 209 is approximate to the external shape of the airbags 203 according to the fifth embodiment, but the primary inflation portion 80 is not provided and the support inflation portion 28F protrudes from the steering wheel side portion 223.

In the airbag 209, since the support inflation portion 28F at the time of completion of inflation causes not only the vicinity of the base portion 28b side but also the vicinity of the approximate central portion 29*a* in a vertical direction to be abutted to and supported by the front surface Bf side of the steering wheel WA, it is likely to rapidly receive stable counterforce from the front surface Bf side of the steering wheel WA, and without occurrence of falling off of the front edge 32*b* side of the airbag 209, it is possible to stably and accurately receive and protect a driver heading for the steering wheel WA by the driver side portion 32 facing a driver.

In a case where the support surface portion 29F of the front support inflation portion 28F is abutted to and supported by the front surface Bf side of the steering wheel WA, as shown in a two-dot chain line in FIG. 71, the tip end portion 28*a* rather than the vicinity of the base portion 28*b* or the central portion 29*a* may be abutted to and supported by the lower part side of the front surface Bf side on the front surface 105*a* side of the lower cover 105 or the like.

What is claimed is:

1. An airbag comprising:
a driver side portion which is stored and held in a central portion of a steering wheel for vehicular steering and has an outer peripheral wall configured to receive a driver at the time of completion of inflation; and
a steering wheel side portion which has an outer peripheral edge connected to an outer peripheral edge of the driver side portion and is supported by the steering wheel, wherein:
the steering wheel side portion is provided with an inflow opening to allow inflation gas to flow in, in the vicinity of the center, and an attaching seat which is disposed on a peripheral edge of the inflow opening and attached to the central portion of the steering wheel;
a support inflation portion protruding from a front side of the attaching seat toward a front side of the steering wheel is arranged on the steering wheel side portion at the time of completion of inflation; and
a support surface portion abutted to a front surface side of the steering wheel and supported by the central portion of the steering wheel at the time of tilting the driver side portion in a forward direction when the airbag receives a driver is arranged on a region on a rear surface side of the support inflation portion from a base portion to a tip end portion.

2. The airbag according to claim 1, wherein:
a rear support inflation portion protruding from a rear side of the attaching seat toward a rear side of the steering wheel is arranged on the steering wheel side portion at the time of completion of inflation; and
a rear support surface portion abutted to the rear surface side of the steering wheel and supported by the central portion of the steering wheel at the time of tilting the driver side portion in a backward direction when the airbag receives a driver is arranged on a region on a rear surface side of the rear support inflation portion from a base portion to a tip end portion.

3. The airbag according to claim 2, wherein
the steering wheel side portion at the time of completion of inflation includes: general sections which are disposed on both of right and left sides between the front and rear support inflation portions and supported on an upper surface side of the steering wheel; and extension sections which are extended from the general section to an upper sides of the front and rear support inflation portions.

4. The airbag according to claim 3, wherein
a second support inflation portion configured to support each of the front and rear support inflation portions, at the time of relative approaching to the extension section side when the front and rear support inflation portions are abutted to the corresponding front surface side or rear surface side of the steering wheel, is arranged on the extension section of the steering wheel side portion at the time of completion of inflation.

5. The airbag according to claim 3, wherein:
the steering wheel side portion is formed of a bag material having flexibility;
the bag material includes: an attaching seat part for forming the attaching seat; a general section part extending from the attaching seat part in a right and left direction and forming the general section; and a protrusion section part which extends from the attaching seat part in a forward and backward direction and forms each of the front and rear support inflation portions;
each of the front and rear support inflation portions has a folding section along the right and left direction on the tip end portion and is formed of a sheet-shaped part joining overlapped right and left edges extending from the folding section to each other;
each of the front and rear protrusion section parts has the sheet-shaped part disposed on the attaching seat side and a tip end part disposed on a tip end side;
tip edges of the front and rear tip end parts and tip edges of the right and left general section parts constitute a driver side joining portion joined to the outer peripheral edge of the driver side portion; and
parts opposing in front and rear edges of right and left side edges extending from both ends of the tip edge to the sheet-shaped part on an inner side and the front and rear side edges of the general section part, in outer peripheral edges of the front and rear tip end parts, constitute joining sections for forming a steering wheel side portion joining to each other.

6. The airbag according to claim 5, wherein
each of the front and rear sheet-shaped parts is provided with the two folding sections so that the two support inflation portions are formed.

7. The airbag according to claim 5, wherein:
each of the tip edges of the front and rear tip end parts is provided with a recessed groove joining edges opposed in the right and left direction to each other at the center of the right and left direction; and
parts of the front edges extending from the recessed groove in the right and left direction constitute the driver side joining portion.

8. The airbag according to claim 5, wherein
the bag material which forms the steering wheel side portion and has flexibility is formed from a single sheet including the attaching seat part, the right and left general section parts, and the front and rear protrusion section parts.

9. The airbag according to claim 1, further comprising:
a primary inflation portion which first allows inflation gas to flow in to be inflated; and
a secondary inflation portion which completes inflation by allowing the inflation gas to flow in from a supply port of the primary inflation portion, wherein:
the primary inflation portion includes a base portion which is configured to inflate by allowing inflation gas from the inflow opening to flow in and provided with the supply port, and a tip end portion which forms the support inflation portion by extending from the base portion; and the secondary inflation portion forms an outer peripheral wall of the airbag excluding an outer peripheral wall of the support inflation portion.

10. The airbag according to claim 1, wherein
a strap having flexibility is configured to be pulled in a direction in which the support surface portion in the support inflation portion at the time of completion of inflation is pressed against the front surface side of the steering wheel, and arranged so as to couple the support inflation portion to a part of an outer peripheral wall of the airbag on a rear side of the support inflation portion.

11. The airbag according to claim 1, wherein
in the support inflation portion at the time of completion of inflation, the vicinity of the approximately center of the support surface portion in at least a vertical direction is abutted to and supported by the front surface side of the steering wheel.

12. The airbag according to claim 1, wherein:
the support inflation portion at the time of completion of inflation protrudes downward from a front edge of the steering wheel side portion;
the support surface portion of the support inflation portion at the time of completion of inflation has a bent section along a right and left direction on a front side of the attaching seat, and has an approximately planar shape extending downward from a front portion side of the attaching seat; and
the bent section at the time of completion of inflation is arranged in the vicinity of an intersection part between a front surface and an upper surface of a front portion side of the steering wheel.

13. The airbag according to claim 1, wherein
the steering wheel side portion at the time of completion of inflation includes:
  a general section which is disposed on both of right and left sides and a rear side of the attaching seat and supported by an upper surface side of the steering wheel; and
  the support inflation portion;
the support inflation portion is configured such that the front surface side is connected to a front edge side of the steering wheel side portion;
the steering wheel side portion is formed of a bag material having flexibility;
the bag material includes:
  an attaching seat part for forming the attaching seat;
  a general section part extending from the attaching seat part to the both of right and left sides and the rear side and forming the general section; and
  a protrusion section part extending from the attaching seat part to the front side and forming the support inflation portion;
the support inflation portion has a folding section along the right and left direction on the tip end portion and is formed of a sheet-shaped part joining overlapped right and left edges extending from the folding section to each other;
the protrusion section part has the sheet-shaped part disposed on the attaching seat side and a tip end part disposed on a tip end side;
a tip edge of the tip end part and tip edges of the right and left general section parts constitute a driver side joining portion joined to the outer peripheral edge of the driver side portion;
parts opposing in front and rear of right and left side edges extending from both ends of the tip edge to the sheet-shaped part on an inner side and the front edge on the front side of the general section part, in outer peripheral edges of the tip end part, constitute joining sections for forming the steering wheel side portion joining to each other;
the tip edge of the tip end part is provided with a recessed groove joining edges opposed in the right and left direction to each other at the center of the right and left direction, and parts of the tip edges extending from the recessed groove in the right and left direction constitute the driver side joining portion; and
a joining site of the joining section for forming the steering wheel side portion to the driver side portion is arranged in the vicinity of an upper part of a direction along a steering shaft of the steering wheel on the front surface side of the steering wheel, in a side view observed from the right and left direction at the time of completion of inflation.

14. The airbag according to claim 13, wherein
the joining site of the joining section for forming the steering wheel side portion to the driver side portion is arranged within a range of being shifted by 50 mm in a forward and backward direction when a reference line of a direction along the steering shaft of the steering wheel on the front surface side of the steering wheel is set to a center, in a side view observed from the right and left direction at the time of completion of inflation.

15. The airbag according to claim 1, wherein:
in the support inflation portion at the time of completion of inflation, the vicinity of the approximately center of the support surface portion in at least a vertical direction is abutted to the front surface of the steering wheel and supported by the central portion of the steering wheel.

16. The airbag according to claim 1, wherein:
the steering wheel side portion is formed of a bag material having flexibility;
the bag material includes: an attaching seat part for forming the attaching seat; a general section part extending from the attaching seat part in a right and left direction and forming the general section; and a protrusion section part which extends from the attaching seat part in a forward and backward direction and forms the support inflation portion;
the support inflation portion has a folding section along the right and left direction on the tip end portion and is formed of a sheet-shaped part joining overlapped right and left edges extending from the folding section to each other;
the protrusion section part has the sheet-shaped part disposed on the attaching seat side and a tip end part disposed on a tip end side;
tip edges of the tip end part and tip edges of the right and left general section parts constitute a driver side joining portion joined to the outer peripheral edge of the driver side portion; and
parts opposing in front and rear edges of right and left side edges extending from both ends of the tip edge to the sheet-shaped part on an inner side and the front and rear side edges of the general section part, in outer peripheral edges of the tip end part, constitute joining sections for forming a steering wheel side portion joining to each other.

* * * * *